(12) United States Patent
Kawachi

(10) Patent No.: US 12,065,195 B2
(45) Date of Patent: Aug. 20, 2024

(54) JOINING STRUCTURE, METHOD FOR PRODUCING JOINING STRUCTURE, AND VEHICLE BODY

(71) Applicant: NIPPON STEEL CORPORATION, Tokyo (JP)

(72) Inventor: Takeshi Kawachi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 141 days.

(21) Appl. No.: 17/602,667

(22) PCT Filed: Apr. 10, 2020

(86) PCT No.: PCT/JP2020/016193
§ 371 (c)(1),
(2) Date: Oct. 8, 2021

(87) PCT Pub. No.: WO2020/209381
PCT Pub. Date: Oct. 15, 2020

(65) Prior Publication Data
US 2022/0177048 A1    Jun. 9, 2022

(30) Foreign Application Priority Data

Apr. 12, 2019 (JP) .................................. 2019-076343
Apr. 12, 2019 (JP) .................................. 2019-076344

(51) Int. Cl.
*B62D 27/02* (2006.01)
*B62D 25/02* (2006.01)
(Continued)

(52) U.S. Cl.
CPC ........... *B62D 27/023* (2013.01); *B62D 25/02* (2013.01); *F16B 5/04* (2013.01); *F16B 5/08* (2013.01)

(58) Field of Classification Search
CPC ...... B62D 27/02; B62D 27/023; B62D 25/02; B62D 25/04; B62D 25/06; B62D 25/025; B62D 25/10; F16B 5/08; B60J 5/0416
(Continued)

(56) References Cited

U.S. PATENT DOCUMENTS

| | | | |
|---|---|---|---|
| 6,688,000 B2 * | 2/2004 | Wang | B62D 25/04 |
| | | | 29/897.3 |
| 8,020,906 B2 * | 9/2011 | Schmid | B60R 19/34 |
| | | | 293/133 |

(Continued)

FOREIGN PATENT DOCUMENTS

| | | | | |
|---|---|---|---|---|
| DE | 10048233 A1 * | 4/2002 | ............ | B23K 10/02 |
| DE | 102004032599 A1 * | 2/2006 | ............ | B62D 25/04 |
| EP | 2639141 B1 * | 4/2015 | ............ | B62D 25/06 |
| JP | 63-151375 U * | 10/1988 | | |
| JP | 63-151375 U | 10/1988 | | |
| JP | 1-149063 U | 10/1989 | | |
| JP | 2013-13910 A | 1/2013 | | |
| KR | 10-2011-0001479 A | 1/2011 | | |

(Continued)

OTHER PUBLICATIONS

JP63-151375U Translation, 1988 (Year: 1988).*

*Primary Examiner* — Dennis H Pedder
(74) *Attorney, Agent, or Firm* — Birch, Stewart, Kolasch & Birch, LLP

(57) ABSTRACT

This invention provides a joining structure including a structure joining two flanges together, with which adequate anti-noise performance and anti-vibration performance can be secured even when the sheet thickness is thin. A joining structure includes a first flange, a second flange, a joint portion formed by joining the first flange and the second flange in a state in which at least one of the flanges is collapsed to the side of the other of the flanges, and a contact portion where the first flange and second flange slidably contact at a position separated from the joint portion. A gap is formed between the first flange and the second flange by (Continued)

the first flange, the second flange being separated a position between the joint portion and the contact portion. Energy of vibrations and noise is attenuated by the sliding of a first contact portion and a second contact portion.

10 Claims, 31 Drawing Sheets

(51) Int. Cl.
  *F16B 5/04* (2006.01)
  *F16B 5/08* (2006.01)
(58) Field of Classification Search
  USPC .. 296/191, 29, 30, 203.01–203.4, 193.05, 6, 296/11, 209, 210
  See application file for complete search history.

(56) References Cited

U.S. PATENT DOCUMENTS

| | | | |
|---|---|---|---|
| 8,622,465 B2 * | 1/2014 | Fujita | B62D 25/04 296/203.02 |
| 9,126,551 B2 * | 9/2015 | Impero | F16F 7/12 |
| 9,764,766 B2 * | 9/2017 | Yoshida | B62D 21/157 |
| 2007/0245541 A1 * | 10/2007 | Kanaguchi | F16B 5/08 29/557 |

* cited by examiner

FIRST MODIFICATION OF FIRST EMBODIMENT

SECOND MODIFICATION OF FIRST EMBODIMENT

THIRD MODIFICATION OF FIRST EMBODIMENT

FOURTH MODIFICATION OF FIRST EMBODIMENT

FOURTH MODIFICATION OF FIRST EMBODIMENT

FOURTH MODIFICATION OF FIRST EMBODIMENT

FIFTH MODIFICATION OF FIRST EMBODIMENT

SIXTH MODIFICATION OF FIRST EMBODIMENT

SEVENTH MODIFICATION OF FIRST EMBODIMENT

EIGHTH MODIFICATION OF FIRST EMBODIMENT

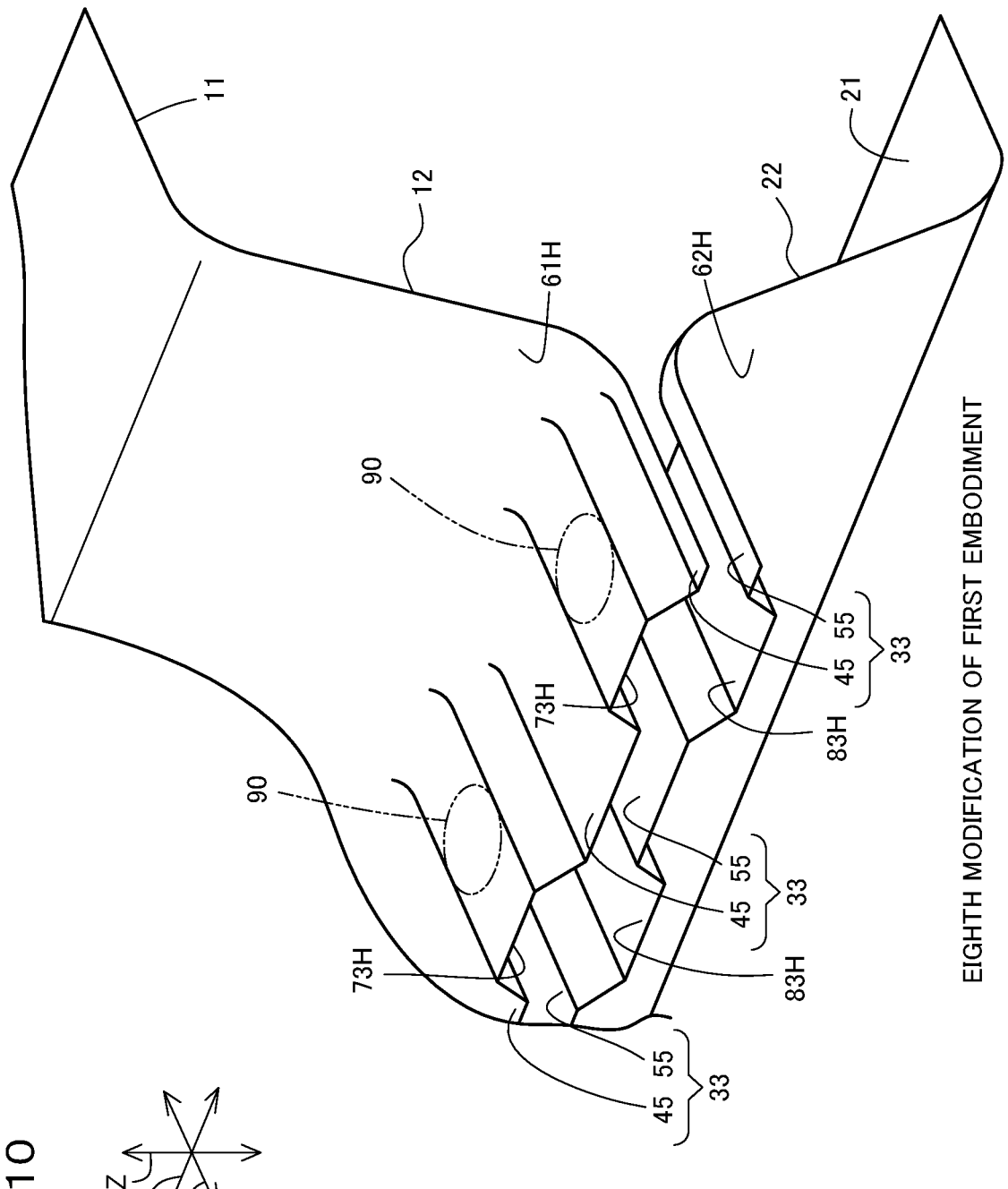

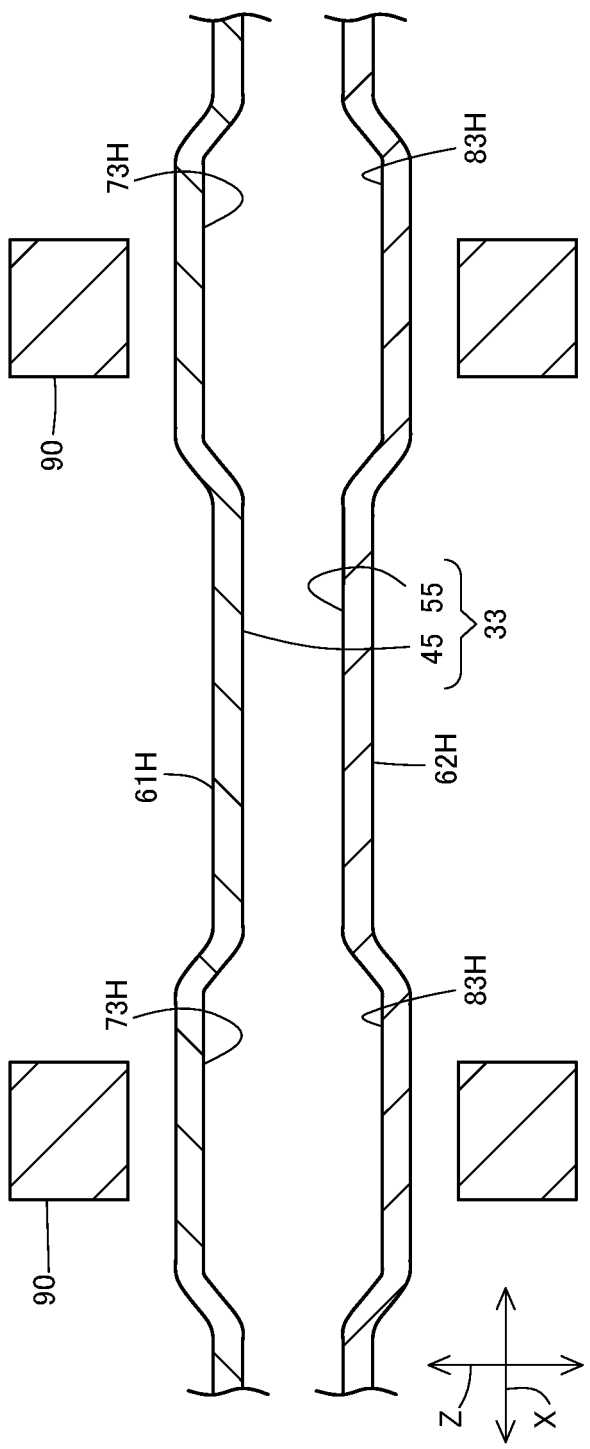
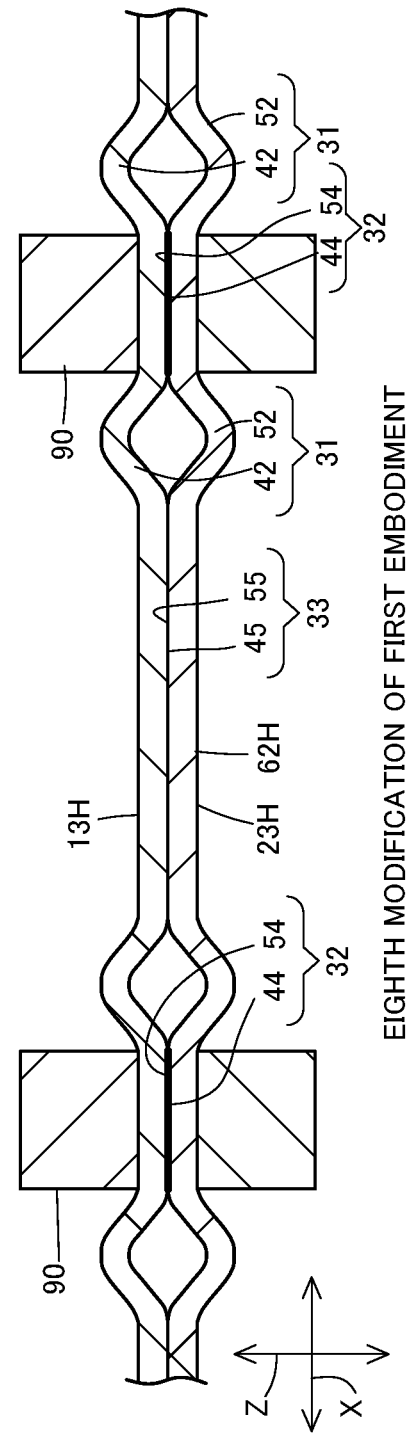
FIG. 11(A)
FIG. 11(B) EIGHTH MODIFICATION OF FIRST EMBODIMENT

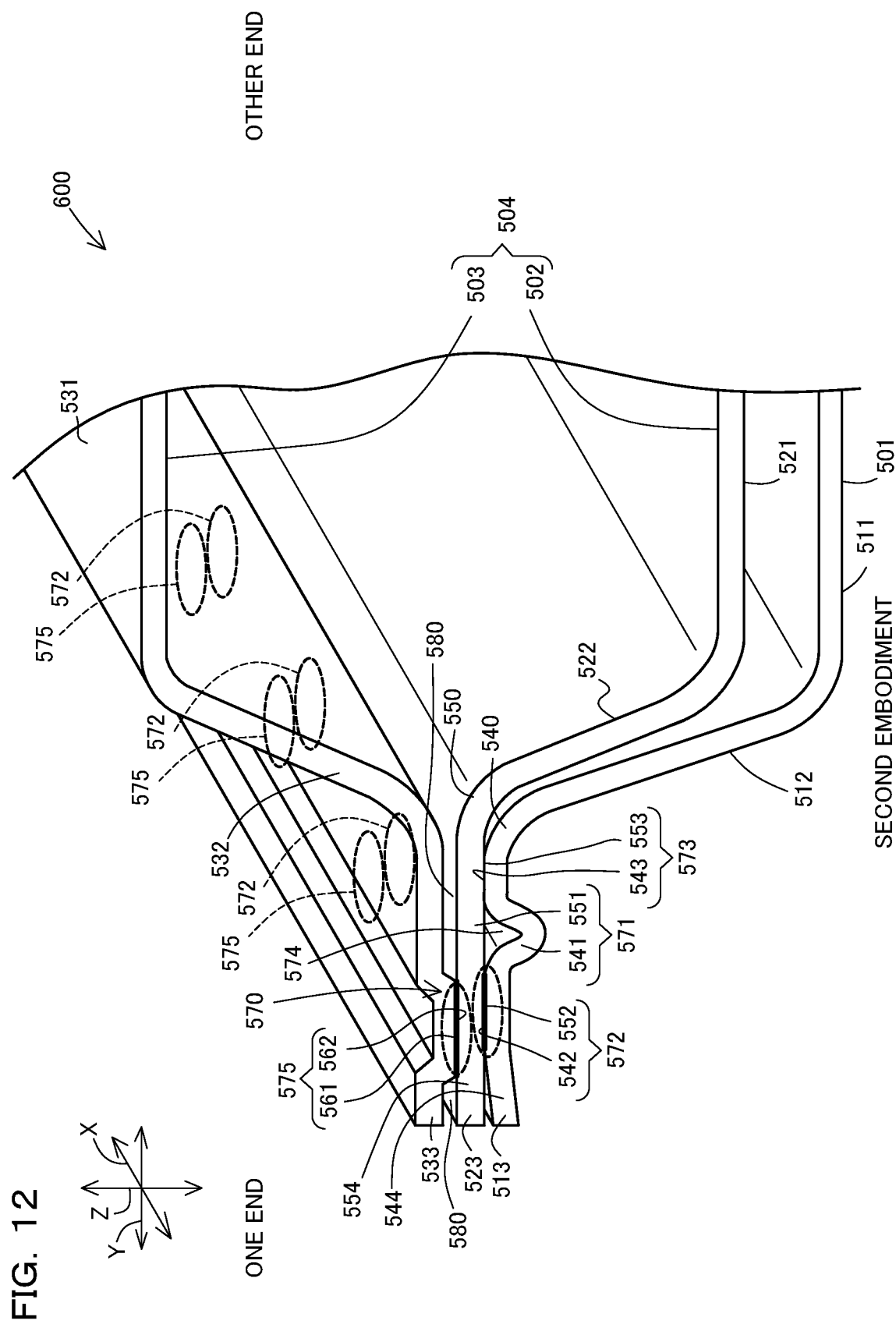

SECOND EMBODIMENT

FIRST MODIFICATION OF SECOND EMBODIMENT

FIRST MODIFICATION OF SECOND EMBODIMENT

SECOND MODIFICATION OF SECOND EMBODIMENT

SECOND MODIFICATION OF SECOND EMBODIMENT

THIRD MODIFICATION OF SECOND EMBODIMENT

THIRD MODIFICATION OF SECOND EMBODIMENT

FOURTH MODIFICATION OF SECOND EMBODIMENT

FIFTH MODIFICATION OF SECOND EMBODIMENT

FIFTH MODIFICATION OF SECOND EMBODIMENT

SIXTH MODIFICATION OF SECOND EMBODIMENT

SIXTH MODIFICATION OF SECOND EMBODIMENT

THIRD EMBODIMENT

THIRD EMBODIMENT

FIRST MODIFICATION OF THIRD EMBODIMENT

SECOND MODIFICATION OF THIRD EMBODIMENT

THIRD MODIFICATION OF THIRD EMBODIMENT

FOURTH MODIFICATION OF THIRD EMBODIMENT

FOURTH MODIFICATION OF THIRD EMBODIMENT

FOURTH MODIFICATION OF THIRD EMBODIMENT

FIFTH MODIFICATION OF THIRD EMBODIMENT

SIXTH MODIFICATION OF THIRD EMBODIMENT

SEVENTH MODIFICATION OF THIRD EMBODIMENT

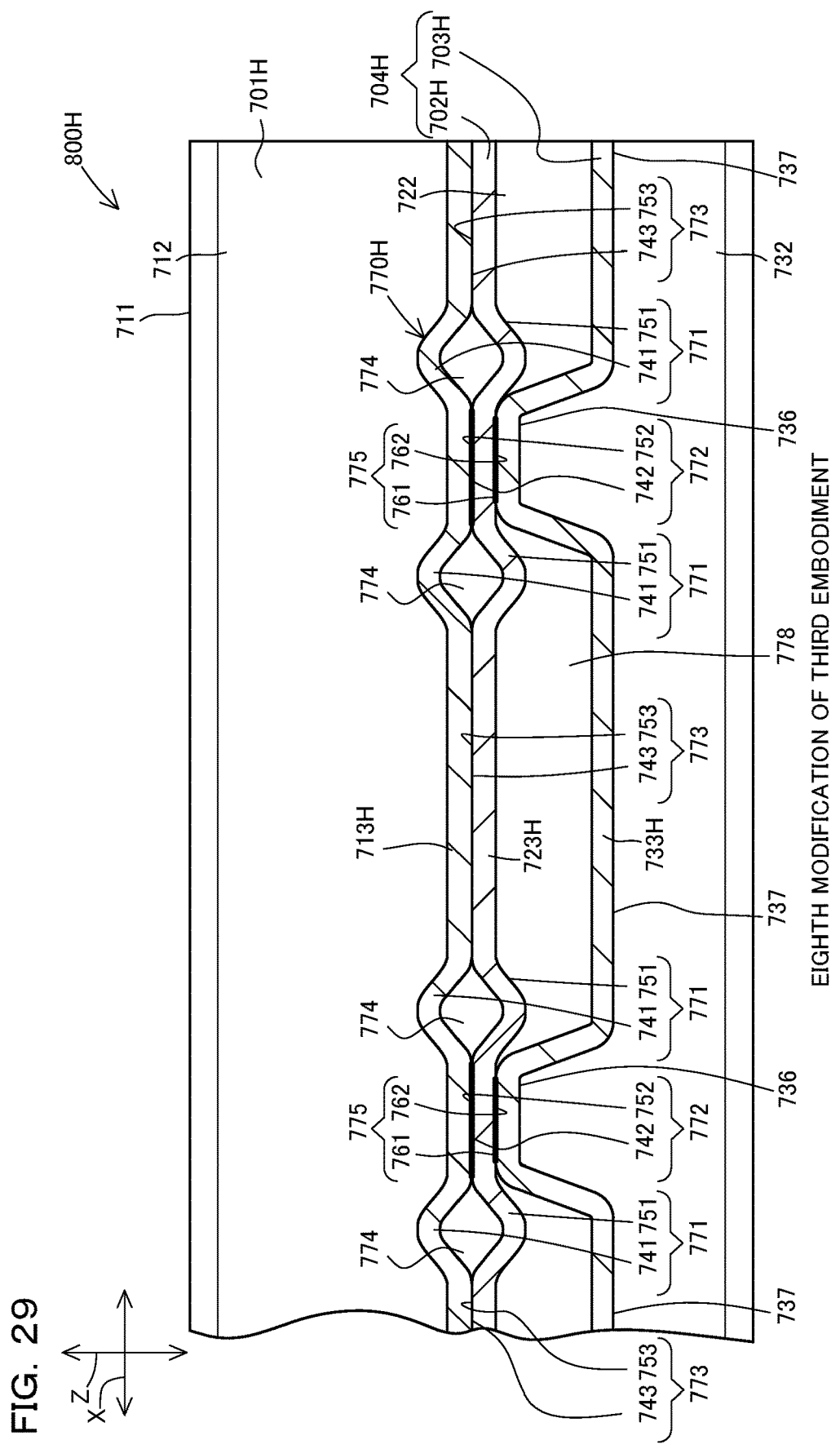
FIG. 29       EIGHTH MODIFICATION OF THIRD EMBODIMENT

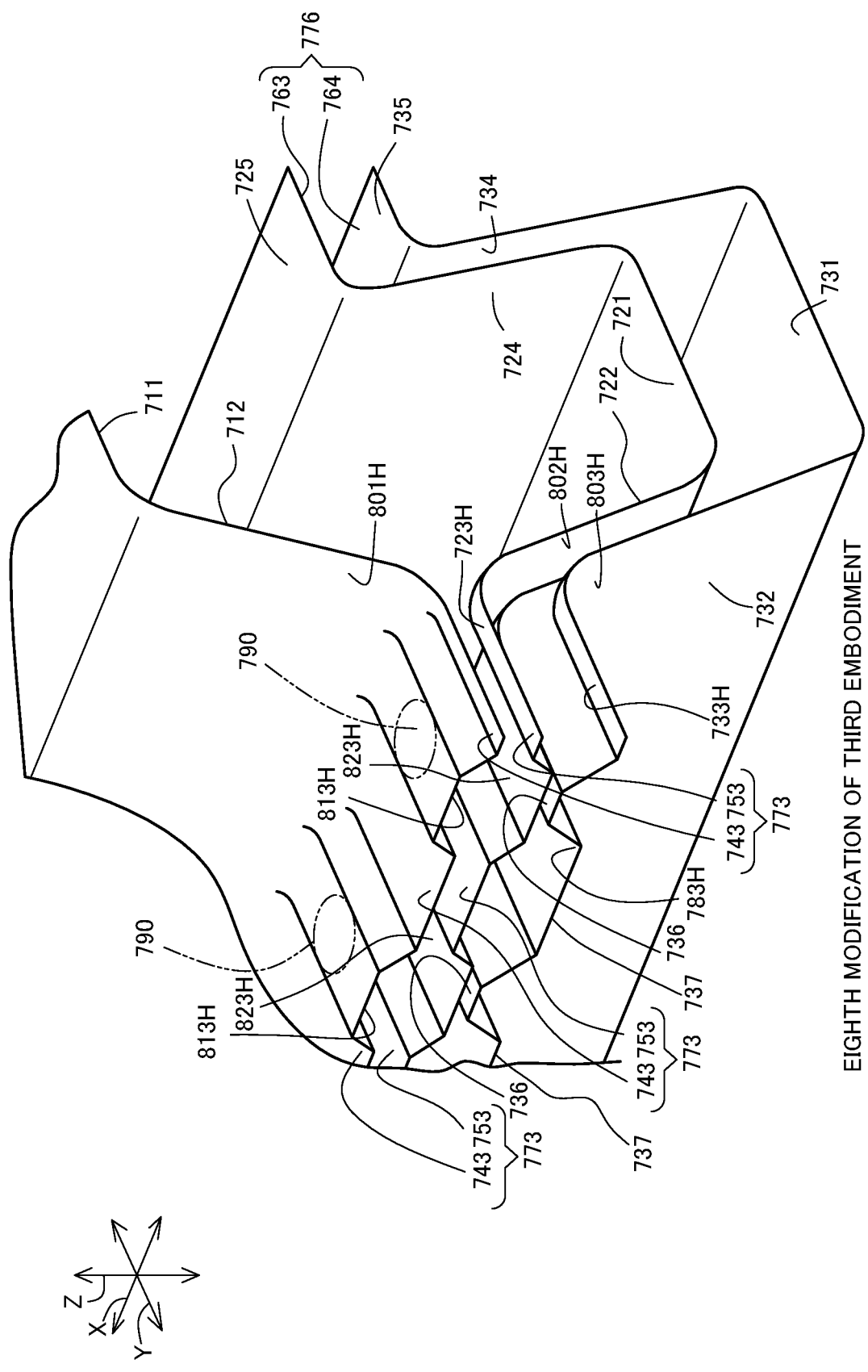
FIG. 30   EIGHTH MODIFICATION OF THIRD EMBODIMENT

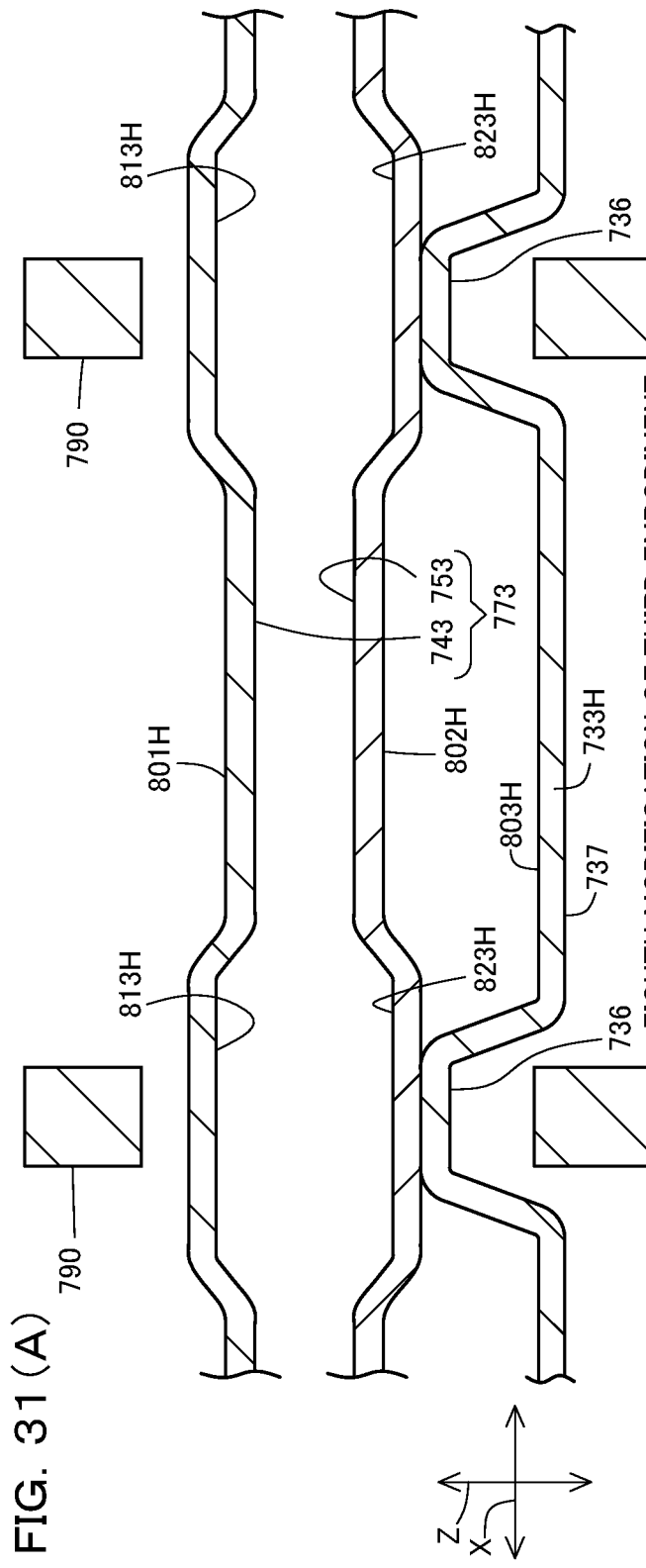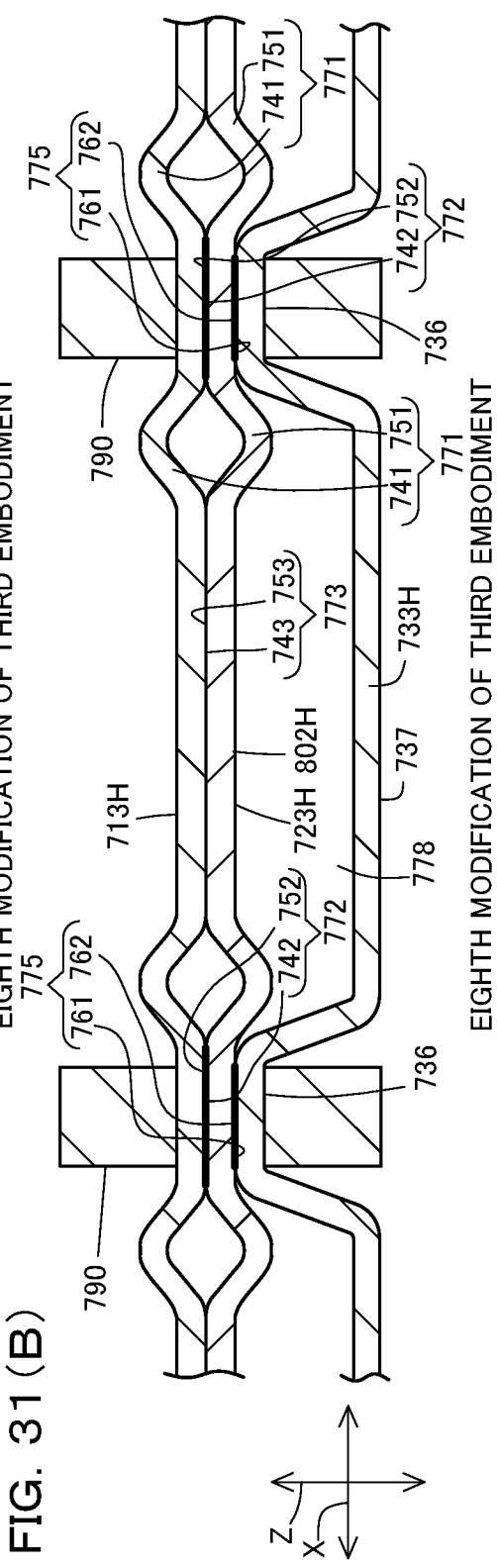

JOINING STRUCTURE, METHOD FOR PRODUCING JOINING STRUCTURE, AND VEHICLE BODY

TECHNICAL FIELD

The present disclosure relates to a joining structure, a method for producing a joining structure, and a vehicle body.

BACKGROUND ART

For example, a body panel of an automobile is attached to a vehicle body member by joining a flange that is provided in the body panel and a flange that is provided in a different vehicle body member which is adjacent to the relevant body panel. These flanges are sometimes joined by being spot-welded to each other in a state in which an adhesive has been applied between the flanges (for example, see Patent Document 1). In the structure disclosed in Patent Document 1, by causing a flange of a vehicle body panel and a flange of a vehicle body member to abut against each other in a state in which an adhesive has been applied between the two flanges, adhesive is interposed between the entire area of the respective surfaces that oppose each other, and the flanges are firmly joined and united using the adhesive.

LIST OF PRIOR ART DOCUMENTS

Patent Document

Patent Document 1: JP2013-13910A

SUMMARY OF INVENTION

Technical Problem

In this connection, with regard to steel sheets that constitute the vehicle bodies of automobiles, development of techniques for compatibly achieving both improvements in collision safety by increasing the tensile strength, and reductions in weight by making the steel sheets thinner is proceeding. However, when the thickness of a steel sheet constituting a vehicle body becomes thinner, NV performance (anti-noise performance and anti-vibration performance) decreases. In other words, if the thickness of a steel sheet constituting a vehicle body member is made thinner, when vibrations are received, the vibrations become large, and the noise in the vehicle cabin also becomes large.

However, in Patent Document 1, no suggestion is made from the viewpoint of improving anti-noise performance and anti-vibration performance. Further, the demand for improving anti-noise performance and anti-vibration performance is not limited to the vehicle body, but also exists with respect to other general joining structures which receive vibrations.

In consideration of the above situation, one objective of the present invention is, with respect to a joining structure including a structure that joins two flanges together as well as a vehicle body that includes the joining structure, to enable securement of sufficient anti-noise performance and anti-vibration performance even when the sheet thickness is made thin.

Solution to Problem

The gist of the present invention is a joining structure, a method for producing a joining structure, and a vehicle body which are described hereunder.

(1) A joining structure, including:
a first flange;
a second flange arranged opposing the first flange;
a joint portion formed by the first flange and the second flange being joined to each other in a state in which at least one of the first flange and the second flange is collapsed to a side of the other of the first flange and the second flange; and
a contact portion where the first flange and the second flange slidably contact each other at a position that is separated from the joint portion;
wherein:
at a position between the joint portion and the contact portion, the first flange and the second flange are separated from each other and a gap is formed between the first flange and the second flange.

(2) The joining structure according to the above (1), wherein:
the first flange includes a curved portion which extends so that a distance from the second flange increases as a distance from the contact portion increases, and
the contact portion is provided at one end of the curved portion.

(3) The joining structure according to the above (1), wherein:
the contact portion is arranged at an edge part of the first flange.

(4) The joining structure according to the above (3), wherein:
the first flange includes a curved portion which extends so that a distance from the second flange increases as a distance from the contact portion increases, and
the joint portion is arranged between the contact portion and the curved portion.

(5) The joining structure according to any one of the above (1) to (4), wherein:
each of the flanges extends in a predetermined longitudinal direction, and
the contact portion is arranged between two of the joint portions.

(6) A method for producing the joining structure according to any one of the above (1) to (5), including:
preparing a first flange starting material as a starting material of the first flange, and a second flange starting material as a starting material of the second flange,
wherein:
in at least one of the first flange starting material and the second flange starting material, a recess is provided which is a portion where the first flange starting material and the second flange starting material are separated when the first flange starting material and the second flange starting material are butted against each other,
the recess is deformed by abutting the first flange starting material and the second flange starting material against each other at the recess, and
the joint portion is formed by joining an abutted portions, and the first flange starting material and the second flange starting material are caused to slidably contact at the contact portion that is at a position which is separated from the joint portion.

(7) A vehicle body including:
the joining structure according to any one of the above (1) to (5),
a panel in which the first flange is provided, and
a framework member in which the second flange is provided.

(8) The vehicle body according to the above (7), wherein the framework member has:
a first half portion in which the second flange is provided;
a second half portion which has a third flange arranged opposing the second flange, and which is combined with the first half portion; and
a half-portion joint portion which is formed by the second flange and the third flange being joined to each other, and which restricts relative sliding of the first flange and the third flange.

(9) The vehicle body according to the above (8), wherein:
by the joint portion and the half-portion joint portion being formed at a place where the first flange, the second flange, and the third flange are superimposed on each other, the joint portion and the half-portion joint portion are arranged overlapping each other in a thickness direction of the panel.

(10) The vehicle body according to the above (8) or the above (9), wherein:
each of the flanges extends in a predetermined longitudinal direction; and
by the second flange and the third flange being separated from each other at a position between two of the half-portion joint portions, a half-portion gap is formed as a gap between the second flange and the third flange.

Advantageous Effects of Invention

According to the present invention, in a joining structure including a structure that joins two flanges together, even in a case where the sheet thickness is made thin, sufficient anti-noise performance and anti-vibration performance can be secured, for example, without reducing the sense of rigidity with respect to the vehicle body when the driver is steering.

BRIEF DESCRIPTION OF DRAWINGS

FIG. 10 is a schematic perspective view for describing a process for joining a first flange to a second flange in the eighth modification of the first embodiment.

FIG. 11(A) and FIG. 11(B) are schematic cross-sectional diagrams for describing the process for joining the first flange to the second flange in the eighth modification of the first embodiment.

FIG. 12 is a schematic perspective view illustrating one part of an automobile vehicle body according to a second embodiment of the present invention.

FIG. 29 is a view illustrating an eighth modification of the third embodiment and shows a cross section as viewed from the width direction.

FIG. 30 is a schematic perspective view for describing a process for joining a first flange to a second flange in the eighth modification of the third embodiment.

FIG. 31(A) and FIG. 31(B) are schematic cross-sectional diagrams for describing a process for joining a first flange to a second flange in the eighth modification of the third embodiment.

DESCRIPTION OF EMBODIMENTS

Hereunder, embodiments of the present invention are described while referring to the accompanying drawings.

First Embodiment

Figure 1:
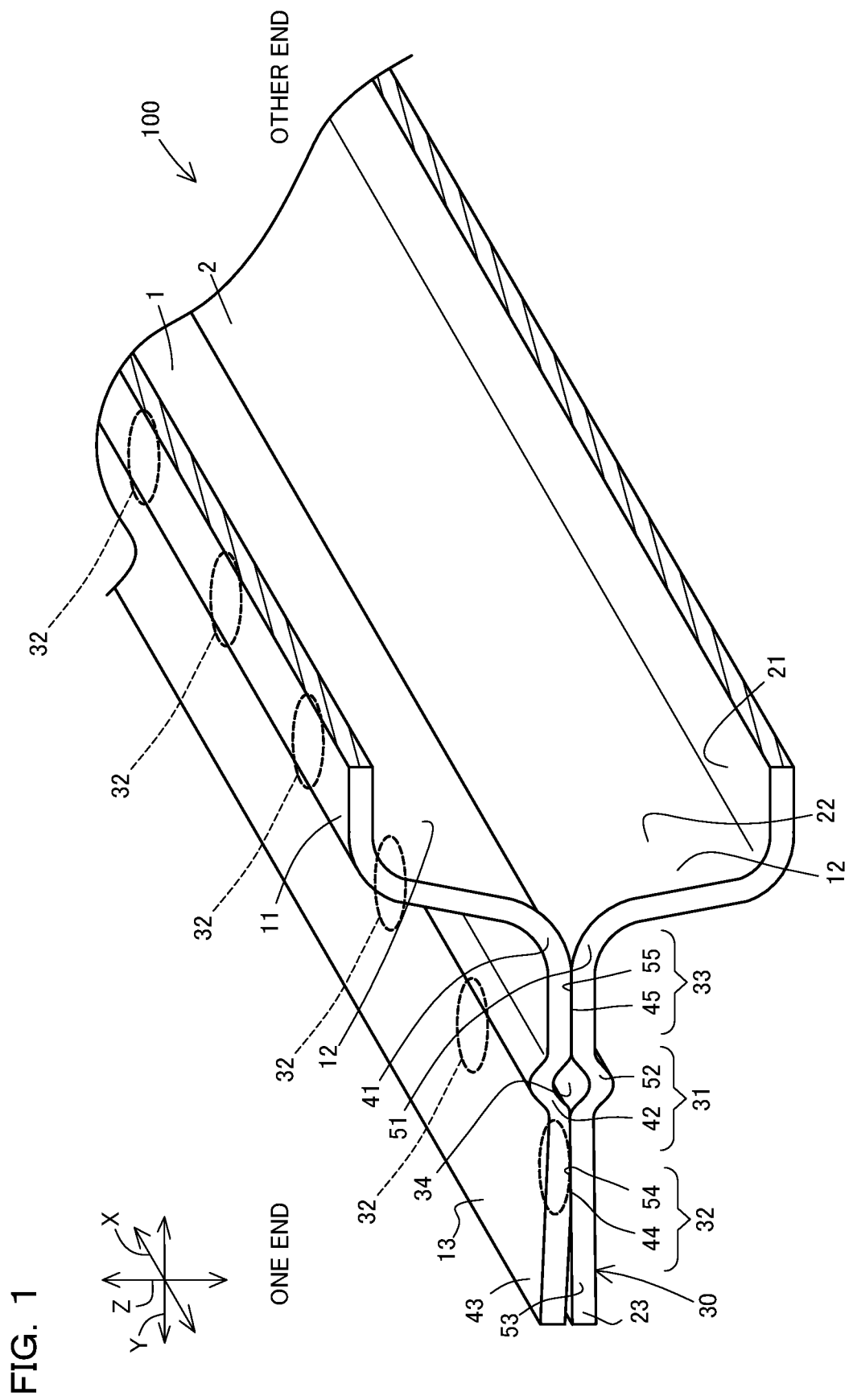
FIG. 1 is a schematic perspective view illustrating a part of an automobile vehicle body including a joining structure according to an embodiment of the present invention.
Figure 2:
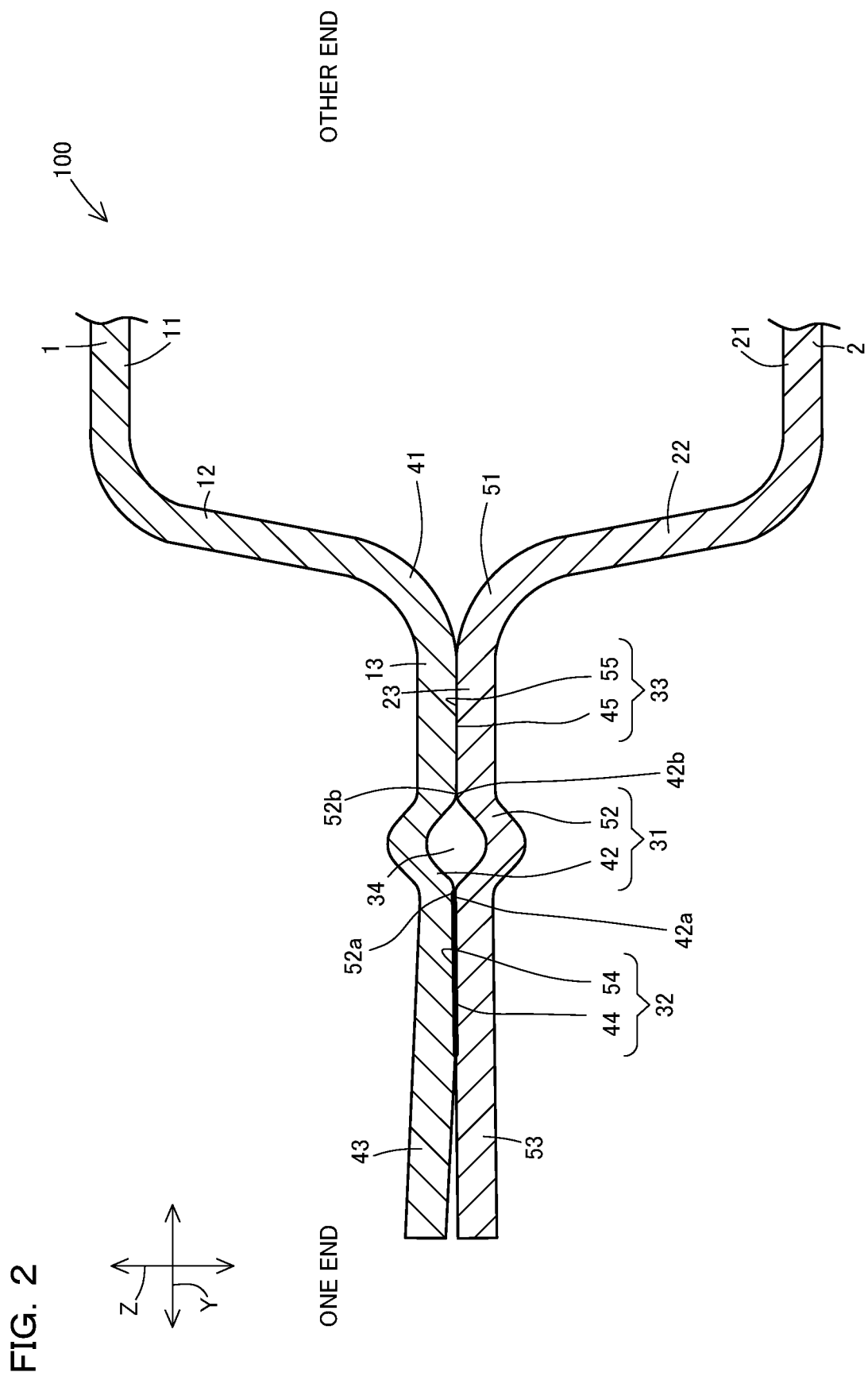
FIG. 2 is a cross-sectional diagram illustrating a part of the vehicle body, and shows a state as viewed from a longitudinal direction.

FIG. 1 is a schematic perspective view illustrating one part of an automobile vehicle body 100 (hereinafter, also referred to as simply "vehicle body 100") including a joining structure 30 according to a first embodiment of the present invention. FIG. 2 is a cross-sectional diagram illustrating one part of the vehicle body 100, and shows a state as viewed from a longitudinal direction X. Referring to FIG. 1 and FIG. 2, vehicle body 100 is the vehicle body of an automobile.

Note that, hereunder, the longitudinal direction of the joining structure 30 shown in FIG. 1 is referred to as "longitudinal direction X". In the longitudinal direction X, the side facing away from the viewer in FIG. 2 is taken as the positive side. Further, the width direction of the joining structure 30 is referred to as "width direction Y". The width direction Y is the transverse direction in FIG. 1 and FIG. 2, and the left direction on the page surface is taken as the positive side. Further, the direction orthogonal to both the longitudinal direction X and the width direction Y is referred to as "height direction Z". In the height direction Z, the upper side on the page surface in FIG. 1 and FIG. 2 is taken as the positive side. The longitudinal direction X, the width direction Y, and the height direction Z may match the vehicle length direction, the vehicle width direction, and the vehicle height direction of the vehicle body 100, respectively, or need not match these directions, respectively. Hereinafter, one of the sides in the width direction Y is referred to as "one end side", and the other side is referred to as "the other end side".

The vehicle body 100 has a first member 1 and a second member 2.

In the present embodiment, the first member 1 is, for example, an exterior member of the vehicle body 100, and is not a framework member which bears the weight of the automobile and receives an external force from the suspension. Examples of such an exterior member that can be mentioned include an outer panel, a rear quarter panel, a roof panel, a door panel (door inner panel, door outer panel), and a bonnet hood (hood inner panel, hood outer panel) of an automobile. Note that, the first member 1 may be a member other than the members mentioned as examples above.

The second member 2 is, for example, an exterior member or a framework member of the vehicle body 100. Examples of such a framework member that can be mentioned include a front side member, an A pillar, a B pillar, a C pillar, a side sill, a rear side member and a cross member. Note that, it suffices that the second member 2 is a member constituting the vehicle body 100, and the second member 2 may be a member other than the members mentioned as examples above.

The first member 1 is formed in a sheet shape by subjecting a sheet to press working. The sheet constituting the first member 1 is, for example, a mild steel sheet. The materials constituting the first member 1 and the second member 2 are sheets or tubes made of steel, aluminum, magnesium, and resin including resin reinforced with fiber, and the material quality and shape of the first member 1 and the second member 2 may differ from each other. The first member 1 and the second member 2 may each be formed of a single material, or may each be formed of a composite material. Methods for joining the first member 1 and the second member 2 include welding such as spot welding, laser welding, arc welding, or seam welding, mechanical joining such as riveting, caulking, or bolt fastening, and bonding using an adhesive or the like.

The first member 1 has a first main body 11, a first vertical wall 12 and a first flange 13.

The second member 2 has a second main body 21, a second vertical wall 22 and a second flange 23.

The first vertical wall 12 extends from the first main body 11. The first main body 11 is continuous with the other end of the first vertical wall 12, and the first flange 13 is continuous with one end of the first vertical wall 12. The first flange 13 is joined to the second flange 23 of the second member 2.

In the second member 2, the second vertical wall 22 extends from the second main body 21. The second main body 21 is continuous with the other end of the second vertical wall 22, and the second flange 23 is continuous with one end of the second vertical wall 22. The first flange 13 and the second flange 23 are arranged opposing each other in the height direction Z.

The joining structure 30 which includes the first flange 13 and the second flange 23 is provided in the vehicle body 100.

The joining structure 30 has the first flange 13, the second flange 23, a gap forming portion 31, a joint portion 32, and a contact portion 33.

The first flange 13 has a first curved portion 41, a first contact portion 45, a first gap forming portion 42, and a first edge part 43.

The first curved portion 41 is formed in a curved shape as viewed from the longitudinal direction X, and is formed in an arc shape that is convex toward the second member 2.

The first curved portion 41 extends to one side in the height direction Z so that the distance from the second flange 23 increases as the distance from the contact portion 33 to the other end side increases. The other end of the first curved portion 41 is continuous with the first vertical wall 12, and one end of the first curved portion 41 is continuous with the first gap forming portion 42 via the first contact portion 45.

The first gap forming portion 42 forms the gap 34 in cooperation with a second gap forming portion 52, to be described later, of the second flange 23. The gap forming portion 31 is formed by the first gap forming portion 42 and the second gap forming portion 52. The first gap forming portion 42 is formed, for example, in a substantially U-shape as viewed from the longitudinal direction X. One end and the other end of the first gap forming portion 42 in the width direction Y are in contact with the second flange 23, while on the other hand, an intermediate portion of the first gap forming portion 42 is separated from the second flange 23. The gap 34 is formed between the intermediate portion of the first gap forming portion 42 as the aforementioned separated portion and the second gap forming portion 52 of the second flange 23. The one end of the first gap forming portion 42 is continuous with the first edge part 43.

The first edge part 43 is the edge part (edge portion) of the first member 1 in the width direction Y. The first edge part 43 is also the front end portion of the first flange 13 in the width direction Y. The other end (base end) of the first edge part 43 is continuous with the first gap forming portion 42. The one end (front end) of the first edge part 43 is a free end.

The second flange 23 has a second curved portion 51, a second contact portion 55, the second gap forming portion 52, and a second edge part 53.

The second curved portion 51 is formed in a curved shape as viewed from the longitudinal direction X, and is formed in an arc shape that is convex toward the first member 1. The second curved portion 51 extends to the other side in the height direction Z so that the distance from the first flange 13 increases as the distance from the contact portion 33 to the other end side increases. The other end of the second curved portion 51 is continuous with the second vertical wall 22, and the one end of the second curved portion 51 is continuous with the second gap forming portion 52 via the second contact portion 55.

The second gap forming portion 52 is formed, for example, in a substantially U-shape as viewed from the longitudinal direction X. One end 52a and the other end 52b of the second gap forming portion 52 in the width direction Y are in contact with the first gap forming portion 42, while on the other hand, an intermediate portion of the second gap forming portion 52 is separated from the first flange 13. As mentioned above, at a position between the joint portion 32 and the contact portion 33, the gap 34 is formed between the first flange 13 and the second flange 23 as a result of the first flange 13 and the second flange 23 (the first gap forming portion 42 and the second gap forming portion 52) being separated from each other. The width and height of the gap 34 are appropriately set according to the target frictional force and the like between the flanges 13 and 23 at the contact portion 33. The one end of the second gap forming portion 52 is continuous with the second edge part 53.

The second edge part 53 is the edge part (edge portion) of the second member 2 in the width direction Y. The second edge part 53 is also the front end portion of the second flange 23 in the width direction Y. The one end (base end) of the second edge part 53 is continuous with the second gap forming portion 52, and the one end (front end) of the second edge part 53 is a free end. In the present embodiment, the second edge part 53 extends along the width direction Y. In the present embodiment, a clearance is formed between the first edge part 43 and the second edge part 53.

The joint portion 32 is formed by joining the first flange 13 and the second flange 23 (a first flange starting material and a second flange starting material which are described later) to each other in a state in which at least one of the first flange 13 and the second flange 23 is collapsed to the side of the other of the first flange 13 and the second flange 23. In the present embodiment, the joint portion 32 is formed by joining the first flange 13 and the second flange 23 to each other in a state in which the first flange 13 is collapsed to the second flange 23 side, and the second flange 23 is collapsed to the first flange 13 side. Spot welding can be mentioned as an example of the joining method in this case. The joint portion 32 is formed by, for example, intermittently performing spot welding in the longitudinal direction X. Note that, the joint portion 32 may be formed by joining the first flange 13 and the second flange 23 over the entire area in the longitudinal direction X in a state in which these flanges 13 and 23 are pressed against each other.

The joint portion 32 has a first joint portion 44 which is formed in the first flange 13, and a second joint portion 54 which is formed in the second flange 23.

In the present embodiment, the first joint portion 44 is provided at one end 42a of the first gap forming portion 42 that is the end closer to the first edge part 43, and extends in the width direction Y. The first gap forming portion 42 is formed by plastically deforming a first flange starting material that is the starting material of the first flange 13 by causing the first flange starting material to be collapsed to the side of a second flange starting material that is the starting material of the second flange 23, and presses the other end 42b (first contact portion 45) of the first gap forming portion 42 to the side of the second contact portion 55 of the second flange 23. The second joint portion 54 is a portion of the second flange 23 that is joined to the first joint portion 44 by joining, and is formed at the one end 52a of the second gap forming portion 52 that is the end closer the second edge part 53, and extends in the width direction Y. The second gap forming portion 52 is formed by causing a second flange starting material that is the starting material of the second flange 23 to be collapsed and deformed to the side of the first flange starting material that is the starting material of the first flange 13, and presses the other end 52 (second contact portion 55) of the second gap forming portion 52 to the side of the first contact portion 45 of the first flange 13.

The contact portion 33 is formed by the first flange 13 and the second flange 23 slidably contacting at a position that is separated from the joint portion 32.

The contact portion 33 has the first contact portion 45 which is formed in the first flange 13, and the second contact portion 55 which is formed in the second flange 23.

In the present embodiment, the first contact portion 45 is provided at the other end 42b which is on the first curved portion 41 side in the first gap forming portion 42, and extends in the width direction Y. It can also be said that the first contact portion 45 is formed at one end of the first curved portion 41. As mentioned above, the first contact portion 45 is pressed to the side of the second contact portion 55 of the second flange 23. In the present embodiment, the second contact portion 55 is provided at the other end 52b side on the second curved portion 51 side of the second gap forming portion 52, and extends in the width direction Y. It can also be said that the second contact portion 55 is provided at the other end of the second curved portion 51.

The second contact portion 55 is a portion of the second flange 23 that is pressed against the first contact portion 45, and by rubbing against the first contact portion 45, the second contact portion 55 converts vibration energy into thermal energy to thereby attenuate the vibration energy. The first contact portion 45 and the second contact portion 55 are in direct contact with each other, without an adhesive interposed therebetween. In this case, the term "direct" means that any of a steel sheet constituting the first flange 13, a coating layer formed on a surface of the steel sheet, a plating layer formed on a surface of the steel sheet, and a paint layer formed on a surface of the plating layer is in contact with any of a steel sheet constituting the second flange 23, a coating layer formed on a surface of the steel sheet, a plating layer formed on a surface of the steel sheet, and a paint layer formed on a surface of the plating layer.

The vehicle body 100 including the joining structure 30 having the configuration described above receives an exciting force due to vibration from the engine, vibration from the suspension, and vibrations generated by pressure fluctuations in air at the vehicle surface. The exciting force propagates through the framework of the vehicle body 100, and is transmitted to the joining structure 30. In the joining structure 30, the first contact portion 45 and the second contact portion 55 slide against each other due to the exciting force, thereby attenuating the vibrations. That is, when the first contact portion 45 slides with respect to the second contact portion 55, the aforementioned exciting force is consumed as thermal energy and attenuated. As a result, vibration sound (panel vibration sound) can be suppressed. By utilizing the vibration energy attenuation effect produced by friction between the sheets of the joined flanges 13 and 23 in this way, even in a case where the sheet thickness of the first member 1 and the second member 2 is made thin, vehicle body vibrations can be suppressed and noise emitted by the automobile can also be suppressed.

Further, in the present embodiment, the contact portion 33 is provided at one end of the curved portions 41 and 51. With this configuration, by the contact portions 45 and 55 being provided at one end of the curved portions 41 and 51 as places at which a contact force between the flanges 13 and 23 is particularly high, the amount of energy attenuation due to frictional sliding between the first contact portion 45 and the second contact portion 55 can be increased.

The foregoing describes the schematic configuration of the vehicle body 100. Next, an example of a method for producing the vehicle body 100 will be described.

Figure 3A:
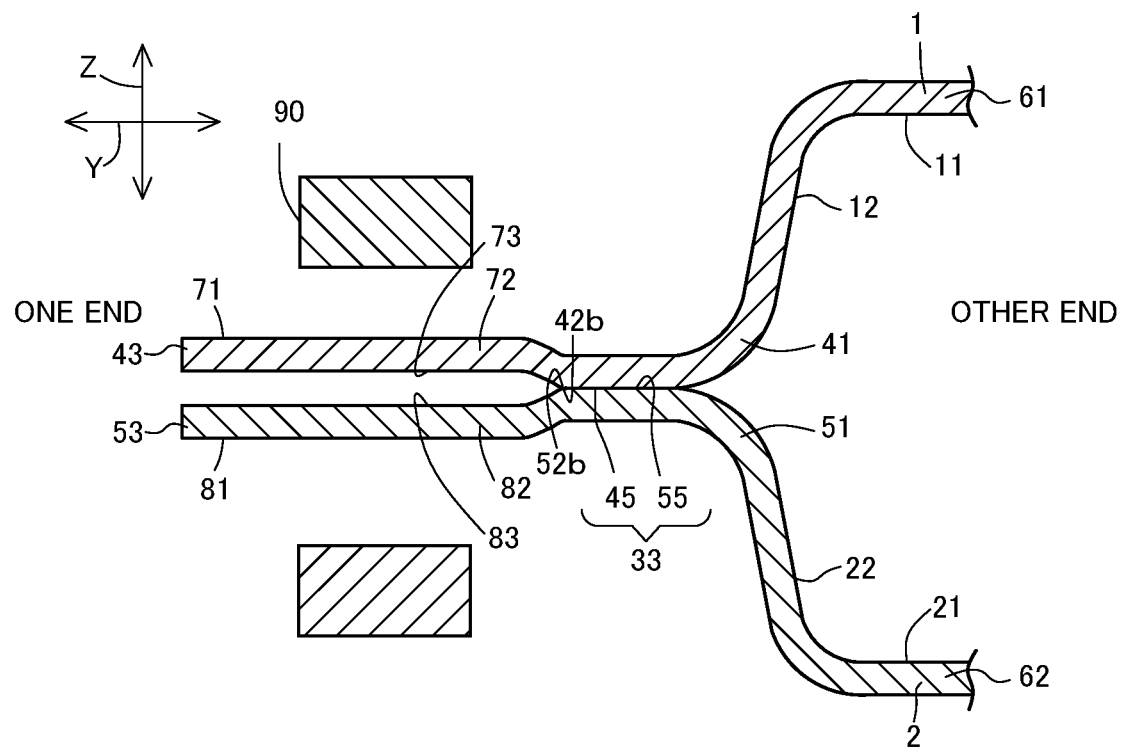
FIG. 3(A) and FIG. 3(B) are schematic cross-sectional diagrams for describing a process for joining a first flange of the vehicle body to a second flange by joining.
Figure 3B:
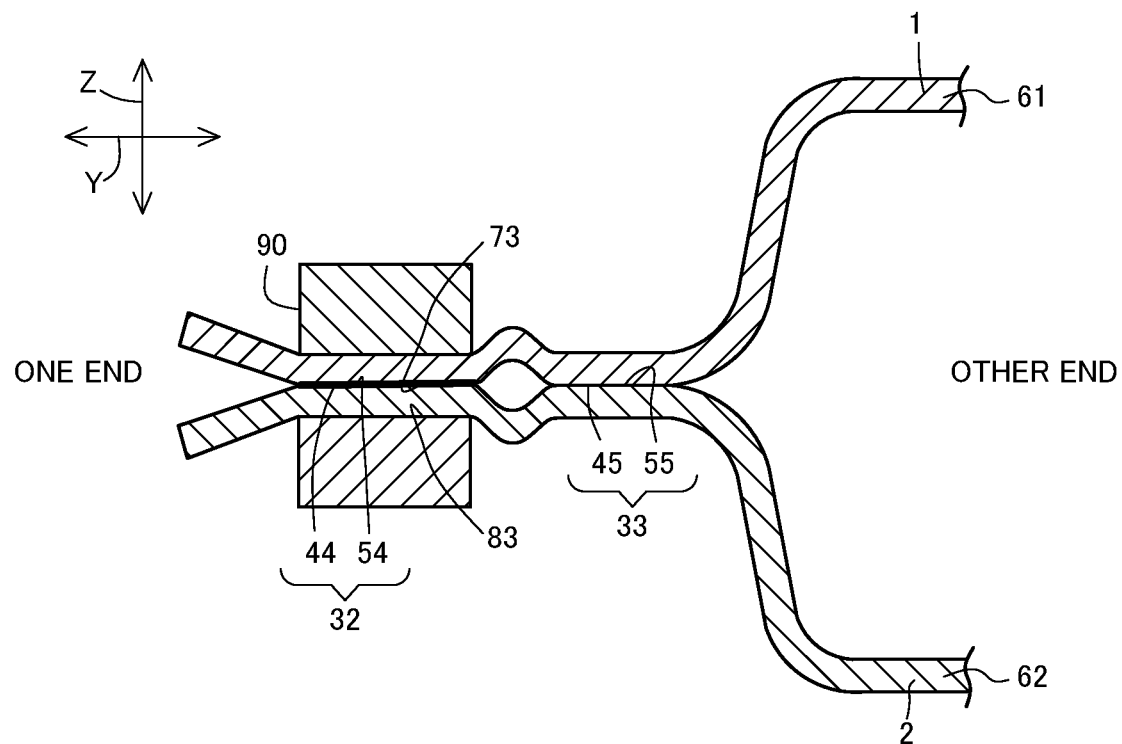

FIG. 3(A) and FIG. 3(B) are schematic cross-sectional diagrams for describing a process for joining the first flange 13 of the vehicle body 100 to the second flange 23 by joining. When joining the first flange 13 to the second flange 23, first, a first flange starting material 61 and a second flange starting material 62 illustrated in FIG. 3(A) are prepared. The first flange starting material 61 is the starting material of the first flange 13, and the second flange starting material 62 is the starting material of the second flange 23.

The first flange starting material 61 is formed in approximately the same shape as the first member 1 except that a portion of the first flange 13 which is located on the one end side in the width direction Y from the intermediate portion of the first gap forming portion 42 is formed in a flat shape. That is, the first flange starting material 61 has the first main body 11, the first vertical wall 12, and a first planned flange portion 71. The first planned flange portion 71 has the first curved portion 41, the first contact portion 45, the other end 42b of the first gap forming portion 42, and a first flat sheet portion 72 extending to the one end side in the width direction Y from the intermediate portion of the first gap forming portion 42. A first recess 73 is formed by the other end 42b of the first gap forming portion 42 and the first flat sheet portion 72. The first recess 73 is a portion at which the first flange starting material 61 and the second flange starting material 62 are separated from each other when the first flange starting material 61 and the second flange starting material 62 are butted against each other.

Similarly, the second flange starting material 62 is formed in the same shape as the second member 2 except that a portion of the second flange 23 which is located on the one end side in the width direction Y from the intermediate portion of the second gap forming portion 52 is formed in a flat shape. That is, the second flange starting material 62 has the second main body 21, the second vertical wall 22, and a second planned flange portion 81. The second planned flange portion 81 has the second curved portion 51, the second contact portion 55, the other end 52b of the second gap forming portion 52, and a second flat sheet portion 82 extending to the one end side in the width direction Y from the intermediate portion of the second gap forming portion 52. Further, a second recess 83 is formed by the other end 52b of the second gap forming portion 52 and the second flat sheet portion 82. The second recess 83 is a portion where the first flange starting material 61 and the second flange starting material 62 are separated from each other when the first contact portion 45 of the first flange starting material 61 and the second contact portion 55 of the second flange starting material 62 are butted against each other.

After preparing the first flange starting material 61 and the second flange starting material 62, the first contact portion 45 of the first flange starting material 61 and the second contact portion 55 of the second flange starting material 62 are positioned to oppose each other. At such time, the flat sheet portions 72 and 82 are arranged in parallel with each other, or are arranged non-parallel to each other so that a clearance therebetween expands toward the side of the corresponding edge parts 43 and 53. Then, by abutting the first flange starting material 61 and the second flange starting material 62 against each other at the recesses 73 and 83, the recesses 73 and 83 are deformed, as illustrated in FIG. 3(B). Specifically, a clamp of a spot welding gun 90 sandwiches the flange starting materials 61 and 62 so that the places in the recesses 73 and 83 which are the places to serve as the joint portion 32 contact each other. By this means, the portions of the flange starting materials 61 and 62 which serve as the joint portion 32 are abutted, and by joining the abutted portions by spot welding or the like, the joint portion 32 is formed. At this time, at the contact portion 33 which is at a position that is separated from the joint portion 32, the first contact portion 45 and the second contact portion 55 are slidably pressed against each other by deformation of the flat sheet portions 72 and 82.

In this way, the flange starting materials 61 and 62 are formed so that a clearance (recesses 73 and 83) can be formed in the vicinity of the portions which serve as the joint portion 32 prior to spot welding, and joining is performed while forcibly causing the flange starting materials 61 and 62 to come in contact with each other while the flange starting materials 61 and 62 are being sandwiched by the spot welding gun 90. By this means, the first contact portion 45 and the second contact portion 55 firmly come in contact at the contact portion 33 which is a place other than the joint portion 32.

By the above process, the first flange 13 is formed and the second flange 23 is formed, and furthermore, the flanges 13 and 23 are joined to each other at the joint portion 32. Note that, either one of the recess 73 of the flange starting material 61 and the recess 83 of the flange starting material 62 need not be provided. In such a case, the planned flange portion of the flange starting material in which a recess is not provided is formed in a flat shape.

As described above, according to the present embodiment, by the simple operation of performing joining while sandwiching the recesses 73 and 83 with the clamp of the spot welding gun 90, the joint portion 32 and the contact portion 33 which is capable of attenuating vibration energy can be formed.

Note that, although a form in which the contact portion 33 is provided at one end of the curved portions 41 and 51 is described as an example in the above embodiment, the form in which the contact portion 33 is provided may be different from the above example. Hereinafter, structures which are different from the foregoing embodiment will be mainly described, and structures which are the like in the foregoing embodiment are denoted by the like reference numerals in the drawings and a detailed description thereof may be omitted.

First Modification of First Embodiment

Figure 4A:
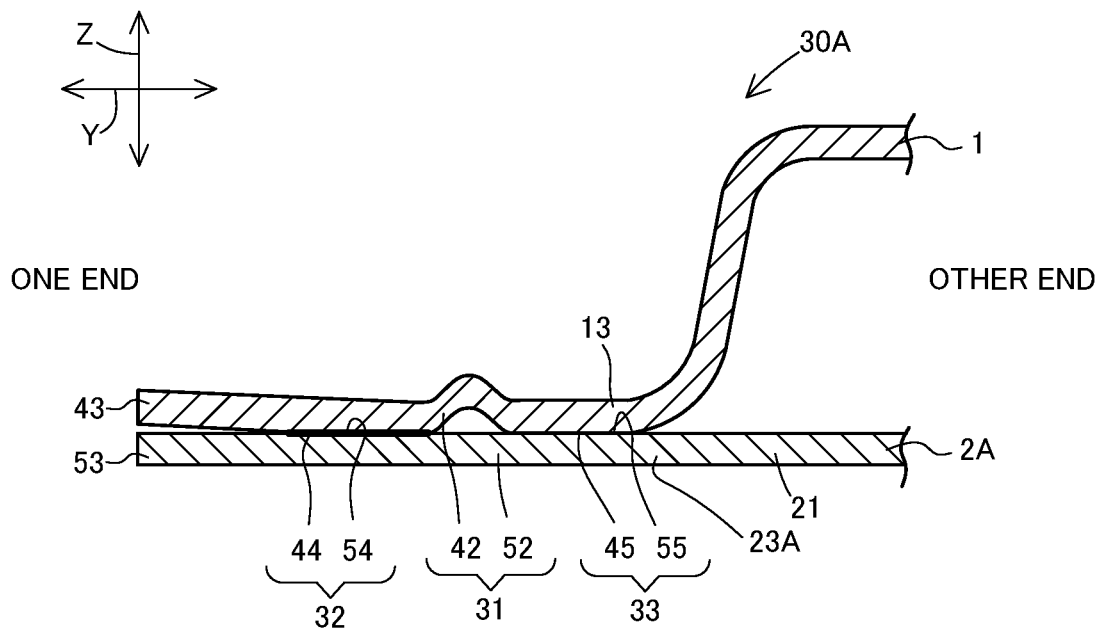
FIG. 4(A) is a view illustrating a first modification of a first embodiment, and shows a cross section as viewed from the longitudinal direction.

FIG. 4(A) is a view illustrating a first modification, and shows a cross section as viewed from the longitudinal direction X. Although the above embodiment is described by taking a configuration in which a curved portion (the second curved portion 51) is formed in the second member 2 as an example, a different configuration may also be adopted. As illustrated in FIG. 4(A), a second member 2A in which a curved portion is not provided may be provided instead of the second member 2. A second flange 23A of the second member 2A is formed, for example, in a flat shape. Further, in the aforementioned embodiment the second gap forming portion 52 of the second flange 23 is formed in a U-shape as viewed from the longitudinal direction X. On the other hand, in a joining structure 30A of the first modification, a second gap forming portion 52 of the second flange 23A of the second member 2A is formed in a flat shape that extends straight along the width direction Y.

Second Modification of First Embodiment

Figure 4B:
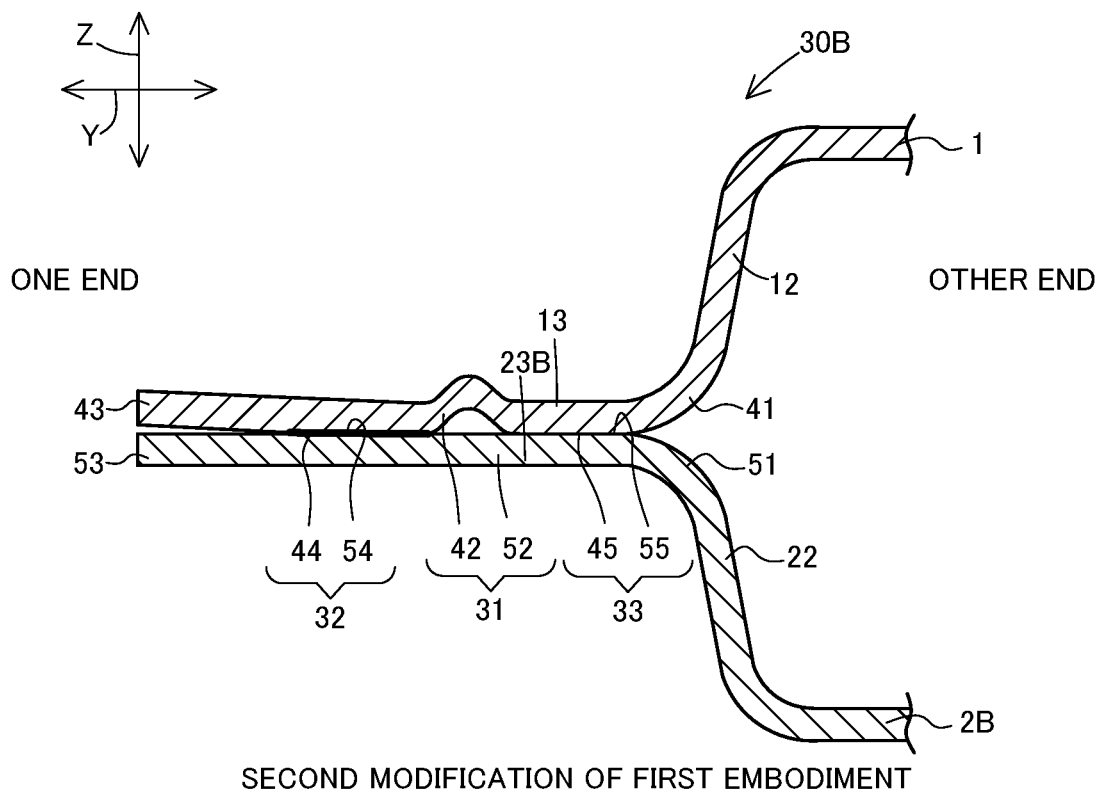
FIG. 4(B) is a view illustrating a second modification of the first embodiment, and shows a cross section as viewed from the longitudinal direction.

FIG. 4(B) is a view illustrating a second modification, and shows a cross section as viewed from the longitudinal direction X. In the above first modification, a curved portion is not provided in the second flange 23A. In contrast, in a joining structure 30B of the second modification, the second curved portion 51 and the second vertical wall 22 are provided in the second flange 23B.

Third Modification of First Embodiment

Figure 5A:
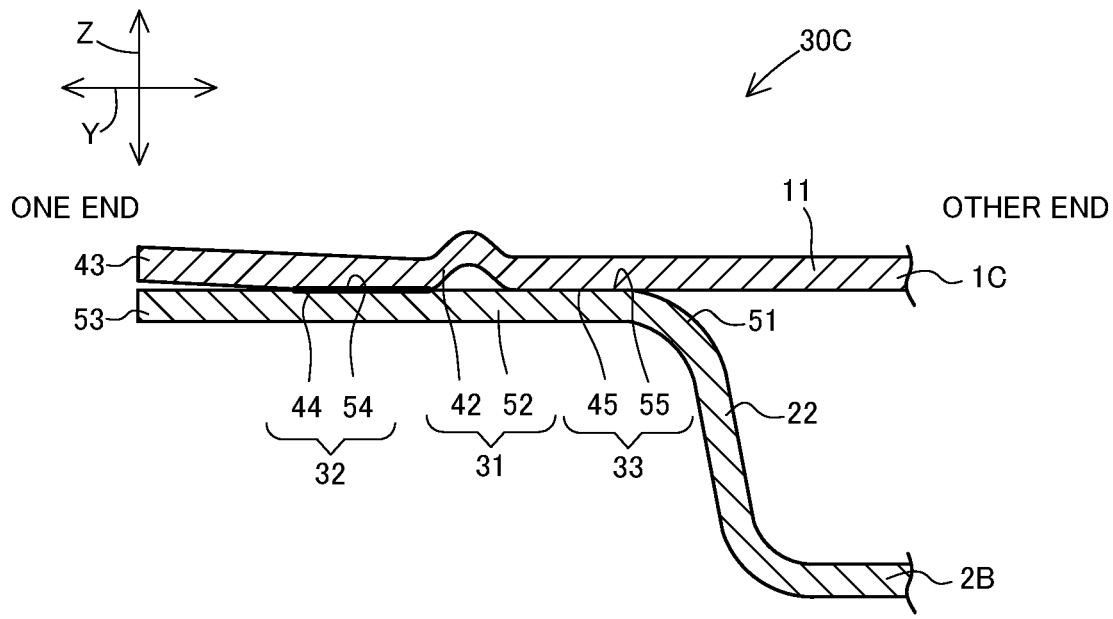
FIG. 5(A) is a view illustrating a third modification of the first embodiment, and shows a cross section as viewed from the longitudinal direction.

FIG. 5(A) is a view illustrating a third modification, and shows a cross section as viewed from the longitudinal direction X. Although the second modification is described by taking a form in which the first curved portion 41 and the first vertical wall 12 are provided in the first member 1 as an example, a different form may also be adopted. As illustrated in FIG. 5(A), a first member 1C in which a curved portion and a vertical wall are not provided may be provided instead of the first member 1. In this joining structure 30C, the first main body 11 of the first member 1C is directly continuous with the first contact portion 45.

Fourth Modification of First Embodiment

Figure 5B:
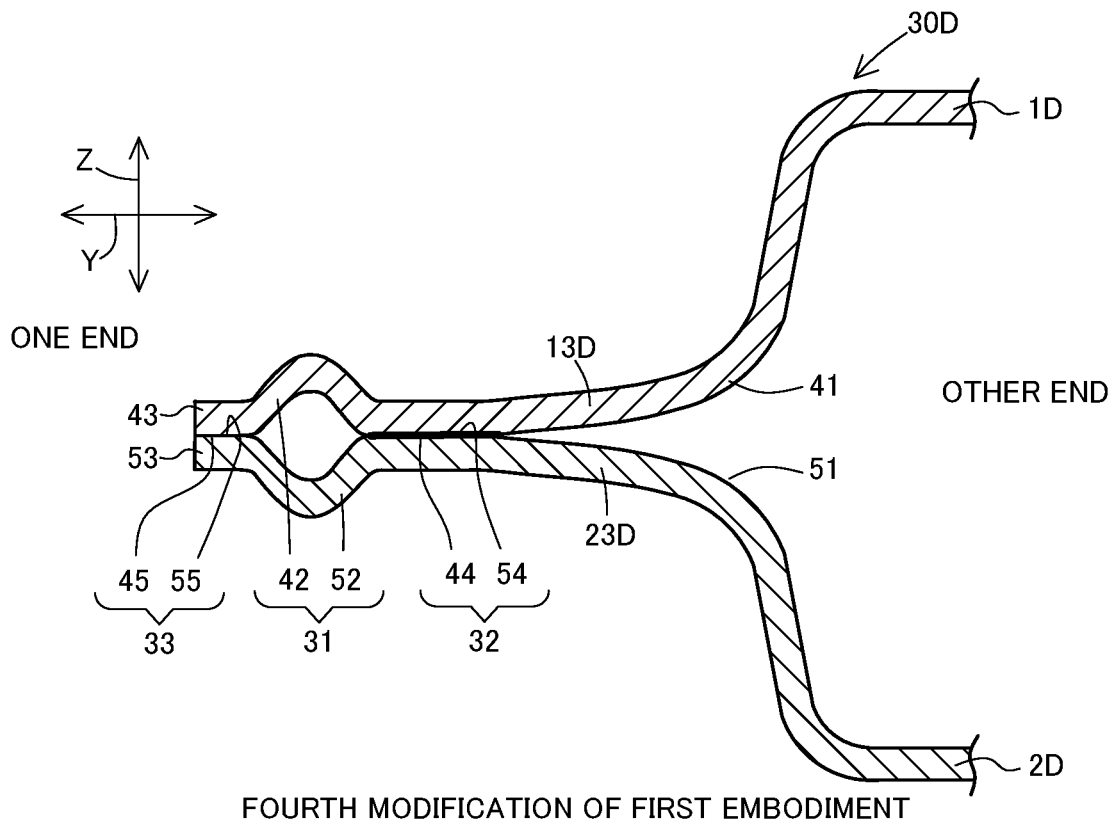
FIG. 5(B) is a view illustrating a fourth modification of the first embodiment, and shows a cross section as viewed from the longitudinal direction.

FIG. 5(B) is a view illustrating a fourth modification, and shows a cross section as viewed from the longitudinal direction X. In the embodiment described above, the curved portions 41 and 51, the contact portion 33, the gap forming portion 31, and the joint portion 32 are arranged in that order from the other end to the one end along the width direction Y. However, a different configuration may also be adopted. In a joining structure 30D of the fourth modification illustrated in FIG. 5(B), the curved portions 41 and 51, the joint portion 32, the gap forming portion 31, and the contact portion 33 are arranged in that order from the other end to the one end along the width direction Y. In this fourth modification, the contact portion 33 is arranged at the edge parts 43 and 53 of flanges 13D and 23D. The length of the contact portion 33 in the width direction Y is appropriately set according to the pressure for the target frictional resistance force between the first contact portion 45 and the second contact portion 55 and the like. Further, the joint portion 32 is arranged between the contact portion 33 and the curved portions 41 and 51.

The above is a description of the schematic configuration of the fourth modification. Next, an example of a method for producing the fourth modification will be described.

Figure 6A:
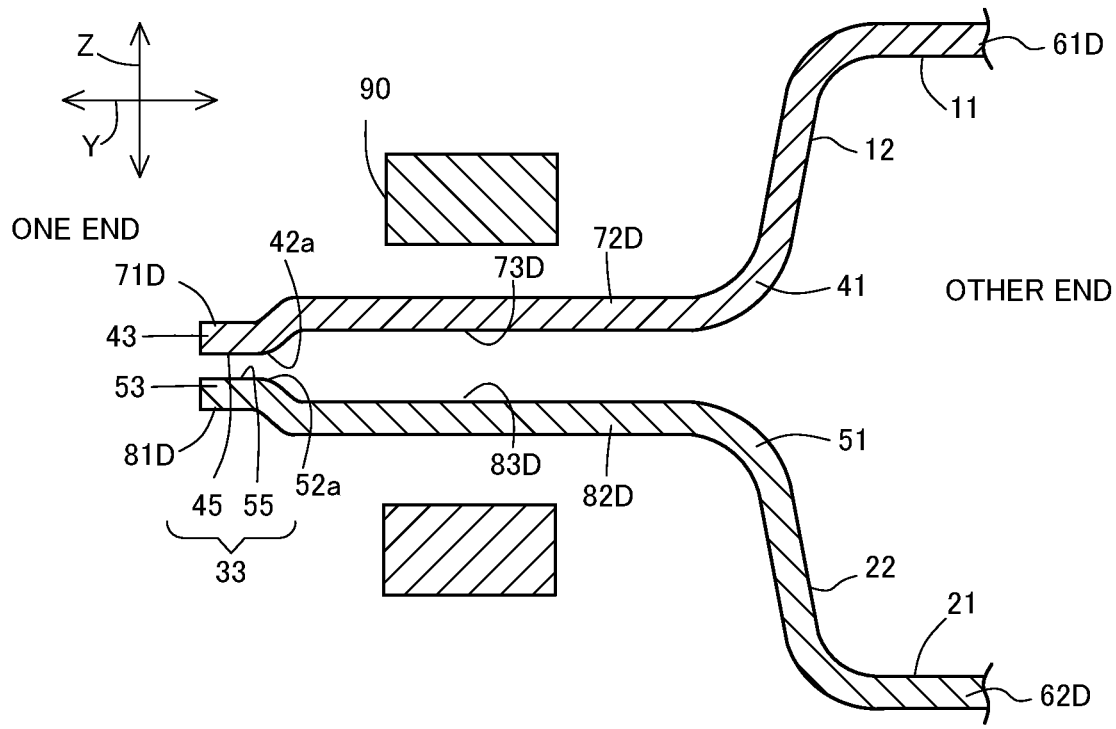
FIG. 6(A) and FIG. 6(B) are schematic cross-sectional diagrams for describing a process for joining a first flange to a second flange in the fourth modification of the first embodiment.
Figure 6B:
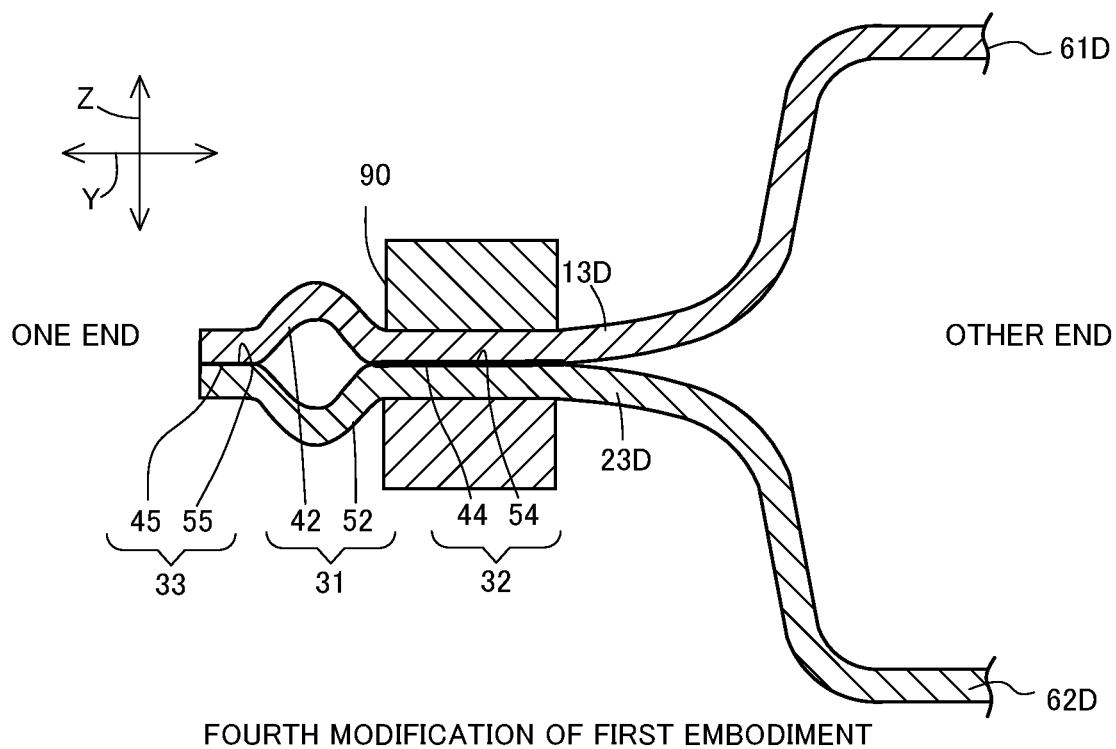

FIG. 6(A) and FIG. 6(B) are schematic cross-sectional diagrams for describing a process for joining the first flange 13D to the second flange 23D. When joining the first flange 13D to the second flange 23D, first, a first flange starting material 61D and a second flange starting material 62D illustrated in FIG. 6(A) are prepared.

The first flange starting material 61D is the starting material of the first flange 13D, and the second flange starting material 62D is the starting material of the second flange 23D. The first flange starting material 61D is formed in the same shape as the first member 1D except that a portion of the first flange 13D from the intermediate portion of the first gap forming portion 42 to the first curved portion 41 is formed in a flat shape. That is, the first flange starting material 61D has the first main body 11, the first vertical wall 12, and a first planned flange portion 71D. The first planned flange portion 71D has the one end 42a of the first gap forming portion 42, the first contact portion 45 that is formed at the one end 42a (first edge part 43), a first flat sheet portion 72D extending from the intermediate portion of the first gap forming portion 42 to the other end side in the width direction Y, and the first curved portion 41. Further, a first recess 73D is formed by the one end 42a of the first gap forming portion 42 and the first flat sheet portion 72D. The first recess 73D is a portion where the first flange starting material 61D and the second flange starting material 62D are separated from each other when the first flange starting material 61D and the second flange starting material 62D are butted against each other.

Similarly, the second flange starting material 62D is formed in the same shape as the second member 2D except that a portion of the second flange 23D from the intermediate portion of the second gap forming portion 52 to the second curved portion 51 is formed in a flat shape. That is, the second flange starting material 62D has the second main body 21, the second vertical wall 22, and a second planned flange portion 81D. The second planned flange portion 81D has the one end 52a of the second gap forming portion 52, the second contact portion 55 that is formed at the one end 52a (second edge part 53), a second flat sheet portion 82D extending from the intermediate portion of the second gap forming portion 52 to the other end side in the width direction Y, and the second curved portion 51. Further, a second recess 83D is formed by the one end 52a of the second gap forming portion 52 and the second flat sheet portion 82D. The second recess 83D is a portion where the first flange starting material 61D and the second flange starting material 62D are separated from each other when the first flange starting material 61D and the second flange starting material 62D are butted against each other.

After preparing the first flange starting material 61D and the second flange starting material 62D, the first contact portion 45 of the first flange starting material 61D and the second contact portion 55 of the second flange starting material 62D are caused to oppose each other. At such time, the flat sheet portions 72D and 82D are arranged in parallel with each other, or are arranged non-parallel to each other so that a clearance therebetween narrows toward the side of the corresponding edge parts 43 and 53, or are arranged in a state such that a curved portion is formed in the vicinity of the edge parts 43 and 53. Then, by abutting the first flange starting material 61D and the second flange starting material 62D against each other at the recesses 73D and 83D, the recesses 73D and 83D are deformed, as illustrated in FIG. 6(B). Specifically, the clamp of the spot welding gun 90 sandwiches the flange starting materials 61D and 62D so that the places to serve as the joint portion 32 contact each other. By this means, the portions of the flange starting materials 61D and 62D which become the joint portion 32 are abutted, and by subjecting the abutted portions to spot welding, the joint portion 32 is formed. At this time, at the contact portion 33 which is at a position that is separated from the joint portion 32, the first flange starting material 61D and the second flange starting material 62D are slidably pressed against each other.

In this way, the flange starting materials 61D and 62D are formed so that a clearance (clearance of recesses 73D and 83D) can be formed in the vicinity of the portions which become the joint portion 32 prior to spot welding, and joining is performed while forcibly causing the flange starting materials 61D and 62D to come in contact with each other while sandwiching the flange starting materials 61D and 62D using the spot welding gun 90. By this means, the first contact portion 45 and the second contact portion 55 firmly come in contact at a place other than the joint portion 32.

Fifth Modification of First Embodiment

Figure 7A:
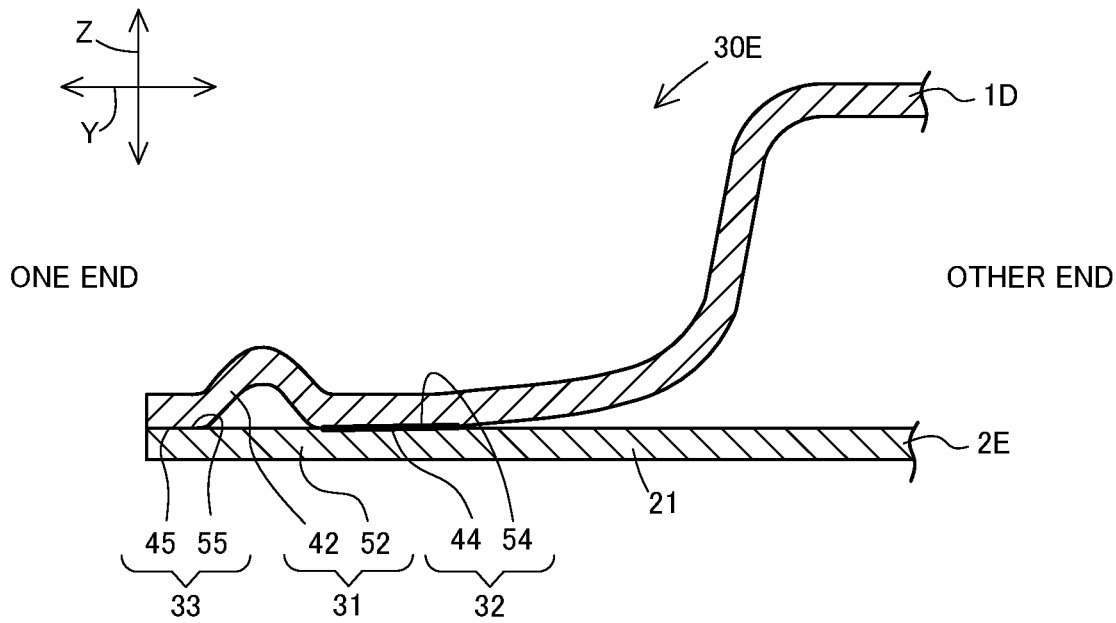
FIG. 7(A) is a view illustrating a fifth modification of the first embodiment, and shows a cross section as viewed from the longitudinal direction.

FIG. 7(A) is a view illustrating a fifth modification, and shows a cross section as viewed from the longitudinal direction X. Although the foregoing fourth modification was described by taking a configuration in which a curved portion (second curved portion 51) is formed in the second member 2D as an example, a different configuration may also be adopted. As illustrated in FIG. 7(A), a flat-shaped second member 2E in which a curved portion is not provided may be provided in a joining structure 30E instead of the second member 2D.

Sixth Modification of First Embodiment

Figure 7B:
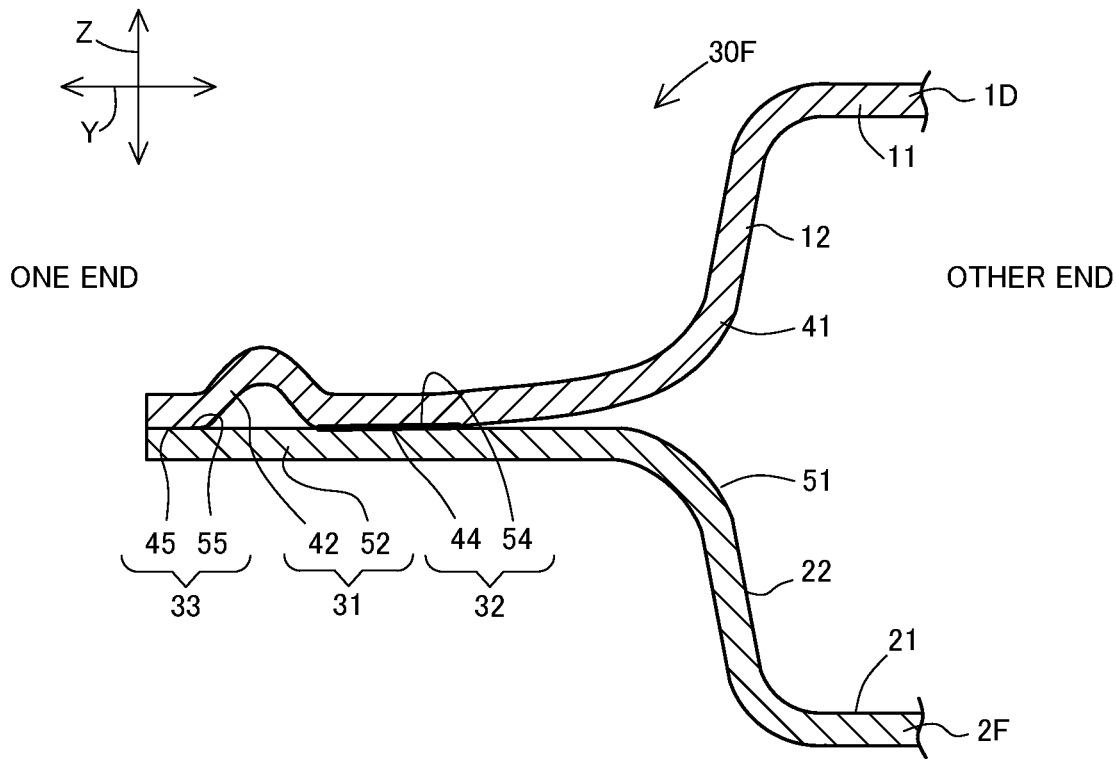
FIG. 7(B) is a view illustrating a sixth modification of the first embodiment, and shows a cross section as viewed from the longitudinal direction.

FIG. 7(B) is a view illustrating a sixth modification, and shows a cross section as viewed from the longitudinal direction X. In the aforementioned fifth modification, the second member 2E is a flat member in which a curved portion and a vertical wall are not formed. On the other hand, in a second member 2F of a joining structure 30F of the sixth modification, the second curved portion 51 and the second vertical wall 22 are provided.

Seventh Modification of First Embodiment

Figure 8:
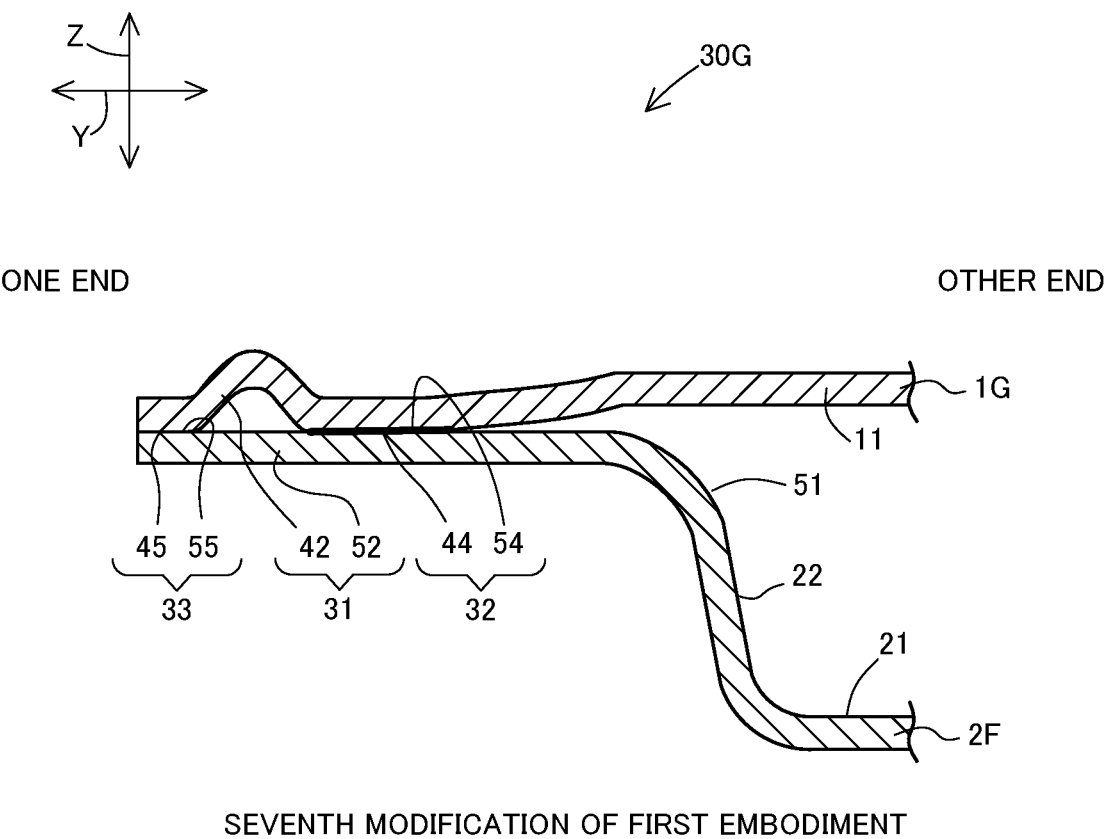
FIG. 8 is a view illustrating a seventh modification of the first embodiment, and shows a cross section as viewed from the longitudinal direction.

FIG. 8 is a view illustrating a seventh modification, and shows a cross section as viewed from the longitudinal direction X. In the aforementioned sixth modification, the first member 1D has the first curved portion 41 and the first vertical wall 12. In contrast, in a first member 1G of a joining structure 30G of the seventh modification, a curved portion and a vertical wall are not provided. In the first member 1G, on the other end side of the first joint portion 44, an inclined portion that rises slightly to one side in the height direction Z as it advances toward the other end side along the width direction Y is formed, and the first main body 11 is continuous with the other end of the inclined portion.

Eighth Modification of First Embodiment

Figure 9:
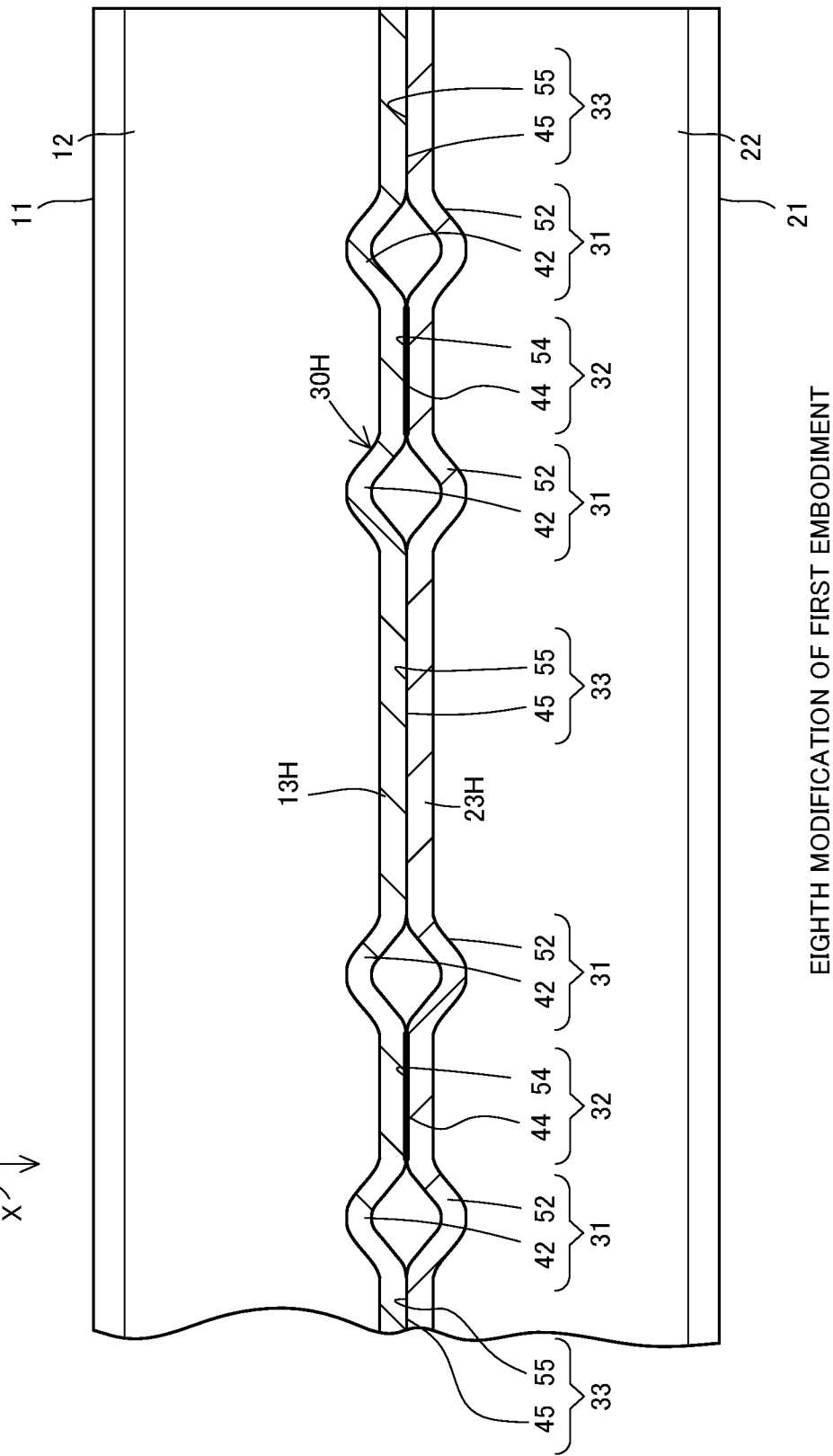
FIG. 9 is a view illustrating an eighth modification of the first embodiment, and shows a cross section as viewed from the width direction.

FIG. 9 is a view illustrating an eighth modification, and shows a cross section as viewed from the width direction Y. In the eighth modification illustrated in FIG. 9, a joining structure 30H is provided instead of the joining structure 30. The joining structure 30H is formed by providing a plurality of embossed-shape portions having shapes that are symmetrical with each other in a first flange 13H and a second flange 23H, and narrowing the clearances between the embossed-shape portions to join the flanges 13H and 23H.

The joining structure 30H has the first flange 13H, the second flange 23H, the joint portion 32, a pair of gap forming portions 31 and 31 arranged so as to sandwich the joint portion 32, and the contact portion 33.

The first flange 13H and the second flange 23H extend with the longitudinal direction X as the longitudinal direction thereof, and are arranged opposing each other in the height direction Z. In the eighth modification, in the longitudinal direction X, the contact portion 33 is arranged between two of the joint portions 32 and 32. Further, the contact portion 33 is also arranged at the ends in the longitudinal direction X. The first vertical wall 12 is continuous with an end of the first flange 13H in the width direction Y. Similarly, the second vertical wall 22 is continuous with an end of the second flange 23H in the width direction Y.

In the present embodiment, from the other end side to the one end side in the longitudinal direction X, the contact portion 33, one of the gap forming portions 31, the joint portion 32, and the other of the gap forming portions 31 are taken as one set, and a plurality of these sets are provided.

The first flange 13H has the first contact portion 45, a pair of the first gap forming portions 42 and 42, and the first joint portion 44 that is arranged between the first gap forming portions 42 and 42.

The second flange 23H has the second contact portion 55, a pair of the second gap forming portions 52 and 52, and the second joint portion 54 that is arranged between the second gap forming portions 52 and 52.

The joint portion 32 is formed by the first flange 13H and the second flange 23H being joined to each other in a state in which at least one of these flanges 13H and 23H is collapsed to the side of the other of these flanges 13H and 23H. In the present embodiment, the joint portion 32 is formed by the first flange 13H and the second flange 23H being joined to each other in a state in which the first flange 13H is collapsed to the second flange 23H side and the second flange 23H is collapsed to the first flange 13H side.

Similarly to the configuration of the embodiment, the first contact portion 45 is pushed to the second flange 23H side as a result of the first gap forming portion 42 being formed by deformation of the starting material. Further, the second contact portion 55 is pushed to the second flange 23H side as a result of the second gap forming portion 52 being formed by deformation of the starting material. By means of this configuration, by rubbing against the second contact portion 55, the first contact portion 45 converts vibration energy to thermal energy to thereby attenuate the vibration energy.

Next, one example of a method for joining the flanges 13H and 23H (method for producing a vehicle body) will be described.

FIG. 10 is a schematic perspective view for describing a process for joining the first flange 13H to the second flange 23H. FIG. 11(A) and FIG. 11(B) are schematic cross-sectional diagrams for describing a process for joining the first flange 13H to the second flange 23H. When joining the first flange 13H to the second flange 23H, first, a first flange starting material 61H and a second flange starting material 62H illustrated in FIG. 10 and FIG. 11(A) are prepared. The first flange starting material 61H is the starting material of the first flange 13H, and the second flange starting material 62H is the starting material of the second flange 23H.

The first flange starting material 61H is formed in the same shape as the first flange 13H except that a portion at which the pair of first gap forming portions 42 and 42 and the first joint portion 44 of the first flange 13H are to be formed is recessed with respect to the first contact portion 45 as a whole. That is, the first flange starting material 61H has the first contact portion 45 and a first recess 73H. The first contact portion 45 and the first recess 73 are alternately arranged in the longitudinal direction X. The first recess 73H becomes a portion where the first flange starting material 61H and the second flange starting material 62H are separated from each other when the first flange starting material 61H and the second flange starting material 62H are butted against each other.

Similarly, the second flange starting material 62H is formed in the same shape as the second flange 23H except that a portion at which the pair of second gap forming portions 52 and 52 and the second joint portion 54 of the second flange 23H are to formed is recessed with respect to the second contact portion 55 as a whole. That is, the second flange starting material 62H has the second contact portion 55 and a second recess 83H. The second contact portion 55 and the second recess 83H are alternately arranged in the longitudinal direction X. The second recess 83H becomes a portion where the first flange starting material 61H and the second flange starting material 62H are separated from each other when the first flange starting material 61H and the second flange starting material 62H are butted against each other.

After preparing the first flange starting material 61H and the second flange starting material 62H, while causing the first contact portion 45 of the first flange starting material 61H and the second contact portion 55 of the second flange starting material 62H to come in contact, the first flange starting material 61H and the second flange starting material 62H are abutted against each other at the recesses 73H and 83H. By this means, the recesses 73H and 83H are deformed, as illustrated in FIG. 11(B). Specifically, the clamp of the spot welding gun 90 sandwiches the flange starting materials 61H and 62H so that, of the entire recesses 73H and 83H, the places that are to serve as the joint portion 32 contact each other. By this means, the portions of the flange starting materials 61H and 62H which become the joint portion 32 are abutted, and by joining the abutted portions by spot welding or the like, the joint portion 32 is formed. At this time, at the contact portion 33 which is at a position that is separated from the joint portion 32, the first flange starting material 61H and the second flange starting material 62H are slidably pressed against each other.

In this way, the flange starting materials 61H and 62H are formed so that a clearance (recesses 73H and 83H) can be formed at the portions which become the joint portion 32 prior to spot welding, and joining is performed while forcibly causing the flange starting materials 61H and 62H to come in contact with each other while sandwiching the flange starting materials 61H and 62H using the spot welding gun 90. By this means, the first contact portion 45 and the second contact portion 55 firmly come in contact at a place (the contact portion 33) that is other than the joint portion 32.

By the above process, the first flange 13H is formed and the second flange 23H is formed, and furthermore, these flanges 13H and 23H are joined to each other.

Note that, in the above eighth modification, the joint portion 32 may be formed over the entire area in the width direction Y, or the joint portion 32 may be formed only at one part thereof. In a case where the joint portion 32 is formed at one part of the flanges 13H and 23H in the longitudinal direction X, when joining the first flange starting material 61H and the second flange starting material 62H using the spot welding gun 90, only one part of each of the recesses 73H and 83H in the longitudinal direction X is deformed and joined.

Second Embodiment

Figure 13:
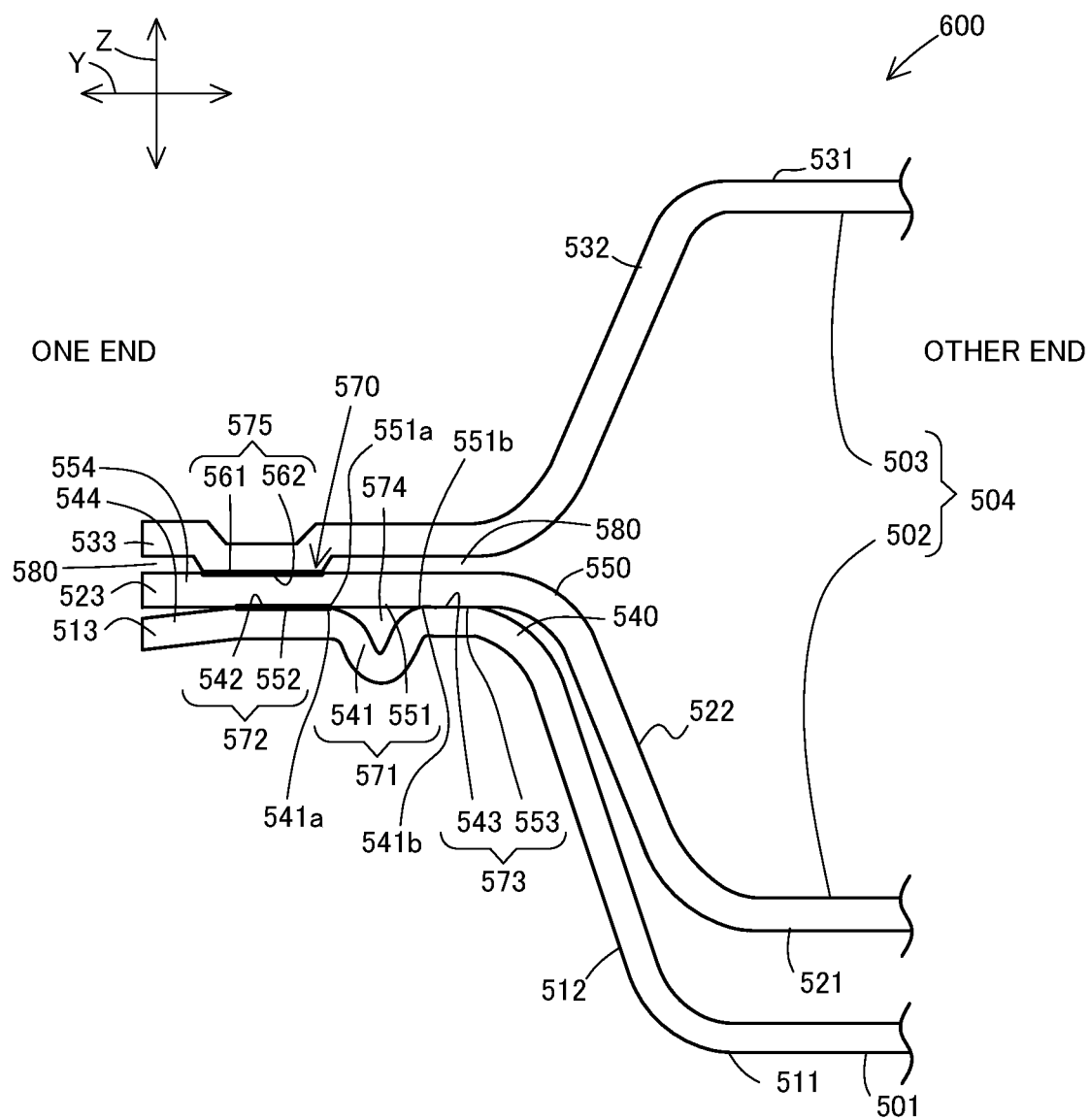
FIG. 13 is a view illustrating one part of the vehicle body illustrated in FIG. 12, and shows a state as viewed from the longitudinal direction.

FIG. 12 is a schematic perspective view illustrating a part of an automobile vehicle body 600 (hereinafter, also referred to simply as "vehicle body 600") according to a second embodiment of the present invention. FIG. 13 is a view illustrating one part of the vehicle body 600, and shows a state as viewed from the longitudinal direction X.

Note that, in the second embodiment, the longitudinal direction of a joining structure 570 of the vehicle body 600 shown in FIG. 12 is referred to as "longitudinal direction X". In the longitudinal direction X, the side facing away from the viewer in FIG. 13 is taken as the positive side. Further, the width direction of the joining structure 570 is referred to as "width direction Y". The width direction Y is the transverse direction in FIG. 12 and FIG. 13, and the left direction on the page surface is taken as the positive side. Further, the direction orthogonal to both the longitudinal direction X and the width direction Y is referred to as "height direction Z". In the height direction Z, the upper side on the page surface in FIG. 12 and FIG. 13 is taken as the positive side. The longitudinal direction X, the width direction Y, and the height direction Z may match the vehicle length direction, the vehicle width direction, and the vehicle height direction of the vehicle body 600, respectively, or need not match these directions, respectively. Hereinafter, one of the sides in the width direction Y is referred to as "one end side", and the other side is referred to as "the other end side".

The vehicle body 600 has a panel 501 and a framework member 504.

In the present embodiment, the panel 501 is, for example, an exterior member of the vehicle body 600, and is not a framework member which bears the weight of the automobile other than the panel 501 and receives an external force from the suspension. Examples of such an exterior member that can be mentioned include an outer panel, a roof panel, a rear quarter panel, a bonnet hood (hood inner panel, hood outer panel) and a door panel (door inner panel, door outer panel). Note that, the panel 501 may be an exterior member other than the members mentioned as examples above. The panel 501 is formed in a sheet shape by subjecting a sheet to press working.

The framework member 504 is provided as a framework member of the vehicle body 600. Examples of this kind of framework member 504 that can be mentioned include a front side member, an A pillar, a B pillar, a C pillar, a side sill, a rear side member and a cross member. Note that, it suffices that, in an automobile 600, the framework member 504 is a member that bears the weight of a member other than the framework member 504 itself, and receives a load from the suspension, and the framework member 504 may be a member other than the members mentioned as examples above.

The panel 501 has a panel main body 511, a panel vertical wall 512, and a first flange 513.

The framework member 504 has a first half portion 502, and a second half portion 503 which is combined with the first half portion 502.

In the present embodiment, the first half portion 502 has a crank-shaped cross-section, and includes a first main body 521, a first vertical wall 522, and a second flange 523.

In the present embodiment, the second half portion 503 has a crank-shaped cross-section, and includes a second main body 531, a second vertical wall 532, and a third flange 533.

The sheet constituting the panel 501 is, for example, a mild steel sheet. Examples that can be mentioned as the materials constituting the panel 501, the first half portion 502, and the second half portion 503 include sheets or tubes made of steel, aluminum, magnesium, and resin including resin reinforced with fiber, and the material quality and shape of the panel 501, the first half portion 502, and the second half portion 503 may differ from each other. The panel 501, the first half portion 502, and the second half portion 503 may each be formed of a single material, or may each be formed of a composite material. The methods for joining the panel 501 and the first half portion 502, and the methods for joining the first half portion 502 and the second half portion 503 respectively include welding such as spot welding, laser welding, arc welding, or seam welding, mechanical joining such as riveting, caulking, or bolt fastening, and bonding using an adhesive or the like.

The panel vertical wall 512 extends from the panel main body 511. The panel main body 511 is continuous with the other end of the panel vertical wall 512, and the first flange 513 is continuous with the one end of the panel vertical wall 512. The first flange 513 is joined to the second flange 523 of the first half portion 502.

In the first half portion 502, the first vertical wall 522 extends from the first main body 521. The first main body 521 is continuous with the other end of the first vertical wall 522, and the second flange 523 is continuous with the one end of the first vertical wall 522. The first flange 513 and the second flange 523 are arranged opposing each other in the height direction Z.

In the vehicle body 600, the joining structure 570 that includes the first flange 513, the second flange 523, and the third flange 533 is provided. The joining structure 570 is provided for joining the panel 501 to the framework member 504.

The joining structure 570 has: the first flange 513; the second flange 523; a panel gap forming portion 571, a panel joint portion 572 and a panel contact portion 573 which are formed by the flanges 513 and 523; the third flange 533; and a half-portion joint portion 575 which is formed by the second flange 523 and the third flange 533.

The first flange 513 has a panel curved portion 540, a panel-side gap forming portion 541, a panel-side joint portion 542, a panel-side contact portion 543, and a panel edge part 544.

The panel curved portion 540 is formed in a curved shape as viewed from the longitudinal direction X, and is formed in an arc shape that is convex toward the first half portion 502. The panel curved portion 540 extends to the other side in the height direction Z so that the distance from the second flange 523 increases as the distance from the panel contact portion 573 to the other end side increases. The other end of the panel curved portion 540 is continuous with the panel vertical wall 512, and one end of the panel curved portion 540 is continuous with the panel-side gap forming portion 541 via the panel-side contact portion 543.

The panel-side gap forming portion 541 forms a gap 574 in cooperation with a first gap forming portion 551, to be described later, of the second flange 523. The panel gap forming portion 571 is formed by the panel-side gap forming portion 541 and the first gap forming portion 551. The panel-side gap forming portion 541 is formed, for example, in a substantially U-shape as viewed from the longitudinal direction X. One end 541a and the other end 541b of the panel-side gap forming portion 541 in the width direction Y are in contact with the second flange 523, while on the other hand, an intermediate portion of the panel-side gap forming portion 541 is separated from the second flange 523. The gap 574 is formed between the intermediate portion of the panel-side gap forming portion 541 as the aforementioned separated portion and the first gap forming portion 551 of the second flange 523. The one end 541a of the panel-side gap forming portion 541 is continuous with the panel edge part 544 via the panel-side joint portion 542.

The panel edge part 544 is the edge part (edge portion) of the panel 501 in the width direction Y. The panel edge part 544 is also the front end portion of the first flange 513 in the width direction Y. One end (the front end) of the panel edge part 544 is a free end.

The second flange 523 has a first curved portion 550, the first gap forming portion 551, a first joint portion 552, a first contact portion 553, and a first edge part 554.

The first curved portion 550 is formed in a curved shape as viewed from the longitudinal direction X, and is formed in an arc shape that is convex toward the second half portion 503. The first curved portion 550 extends to the other side in the height direction Z so that the distance from the third flange 533 increases as the distance from the panel contact portion 573 to the other end side increases. The other end of the first curved portion 550 is continuous with the first vertical wall 522, and one end of the first curved portion 550 is continuous with the first gap forming portion 551 via the first contact portion 553.

The first gap forming portion 551 is formed in a flat shape. One end 551a and the other end 551b of the first gap forming portion 551 in the width direction Y are in contact with the panel-side gap forming portion 541, while on the other hand, an intermediate portion of the first gap forming portion 551 is separated from the first flange 513. As mentioned above, at a position between the panel joint portion 572 and the panel contact portion 573, the gap 574 is formed between the first flange 513 and the second flange 523 as a result of the first flange 513 and the second flange 523 (the panel-side gap forming portion 541 and the first gap forming portion 551) being separated from each other. The width and height of the gap 574 are appropriately set according to the target frictional force and the like between the flanges 513 and 523 at the panel contact portion 573. The one end 551a of the first gap forming portion 551 is continuous with the first edge part 554 via the first joint portion 552.

The first edge part 554 is the edge part (edge portion) of the first half portion 502 in the width direction Y. The first edge part 554 is also the front end portion of the second flange 523 in the width direction Y. One end (the front end) of the first edge part 554 is a free end. In the present embodiment, the first edge part 554 extends along the width direction Y. In the present embodiment, a clearance is formed between the panel edge part 544 and the first edge part 554.

The panel joint portion 572 is formed by joining the first flange 513 and the second flange 523 (a first flange starting material and a second flange starting material which are described later) to each other in a state in which at least one of these flanges 513 and 523 is collapsed to the side of the other of these flanges 513 and 523. In the present embodiment, the panel joint portion 572 is formed by joining these flanges 513 and 523 to each other in a state in which the first flange 513 is collapsed to the second flange 523 side. Spot welding can be mentioned as an example of the joining method in this case. The panel joint portion 572 is formed by, for example, intermittently performing spot welding in the longitudinal direction X. Note that, the panel joint portion 572 may be formed by joining the first flange 513 and the second flange 523 over the entire area in the longitudinal direction X in a state in which these flanges 513 and 523 are pressed against each other.

The panel joint portion 572 has the panel-side joint portion 542 that is formed in the first flange 513, and the first joint portion 552 that is formed in the second flange 523.

In the present embodiment, the panel-side joint portion 542 is provided at the one end 541a of the panel-side gap forming portion 541 that is the end closer to the panel edge part 544, and extends in the width direction Y. The panel-side gap forming portion 541 is formed by plastically deforming a first flange starting material that is the starting material of the first flange 513 by causing the first flange starting material to be collapsed to the side of a second flange starting material that is the starting material of the second flange 523, and presses the other end 541b (panel-side contact portion 543) of the panel-side gap forming portion 541 to the side of the first contact portion 553 of the second flange 523. The first joint portion 552 is a portion of the second flange 523 which is joined to the panel-side joint portion 542 by joining, and is formed on the side of the one end 551a of the first gap forming portion 551 that is the end closer to the first edge part 554, and extends in the width direction Y.

The panel contact portion 573 is formed by the first flange 513 and the second flange 523 slidably contacting at a position that is separated from the panel joint portion 572.

The panel contact portion 573 has the panel-side contact portion 543 that is formed in the first flange 513, and the first contact portion 553 that is formed in the second flange 523.

In the present embodiment, the panel-side contact portion 543 is provided at the other end 541b that is on the panel curved portion 540 side in the panel-side gap forming portion 541, and extends in the width direction Y. It can also be said that the panel-side contact portion 543 is formed at one end of the panel curved portion 540. As mentioned above, the panel-side contact portion 543 is pressed to the side of the first contact portion 553 of the second flange 523. In the present embodiment, the first contact portion 553 is provided on the other end 551b side that is on the first curved portion 550 side of the first gap forming portion 551, and extends in the width direction Y. It can also be said that the first contact portion 553 is provided at one end of the first curved portion 550. The first contact portion 553 is a portion of the second flange 523 that is pressed against the panel-side contact portion 543, and by rubbing against the panel-side contact portion 543, the first contact portion 553 converts vibration energy into thermal energy to thereby attenuate the vibration energy. The panel-side contact portion 543 and the first contact portion 553 are in direct contact with each other, without an adhesive interposed therebetween. In this case the term "direct" means that any of a steel sheet constituting the first flange 513, a plating layer formed on a surface of the steel sheet, a coating layer formed on a surface of the steel sheet, and a paint layer formed on a surface of the plating layer is in contact with any of a steel sheet constituting the second flange 523, a coating layer formed on a surface of the steel sheet, a plating layer formed on a surface of the steel sheet, and a paint layer formed on a surface of the plating layer. Further, since a panel component makes almost no contribution to the vehicle body rigidity that affects the steering stability, and structural hysteresis of the vehicle body which is caused by the aforementioned contact can therefore be ignored, the contact at the aforementioned joined flanges does not cause the steering stability or the sensory evaluation of the driver to deteriorate.

Next, a more detailed configuration of the framework member 504 is described.

In the framework member 504, the first half portion 502 constitutes the other side portion of the framework member 504 in the height direction Z, and the second half portion 503 constitutes the one side portion of the framework member 504 in the height direction Z.

As mentioned above, the framework member 504 bears the weight of the automobile and receives a load from the suspension. Therefore, preferably the first half portion 502 and the second half portion 503 are each formed of a steel sheet. In a case where the first half portion 502 and the second half portion 503 are each formed of a steel sheet, the first half portion 502 and the second half portion 503 are each formed in a sheet shape by subjecting a steel sheet to press working. The steel sheet is preferably a high-tensile strength steel sheet, and the tensile strength of the steel sheet is preferably 440 MPa or more. The steel sheet is more preferably an ultra-high tensile strength steel sheet, and the tensile strength in this case is preferably 590 MPa or more, and more preferably is 780 MPa or more.

The first half portion 502 forms a closed cross-section when viewed in the longitudinal direction X (in FIG. 12 and FIG. 13, one part of the closed cross-section is illustrated) by co-operation with the second half portion 503. The closed cross-section may be formed in a U-shape as viewed in the longitudinal direction X, or may be formed in a shape such as a trapezoidal shape or a rectangular shape. Further, the closed cross-section may be formed across the whole of the framework member 504 in the longitudinal direction X as in the present embodiment, or may be formed in one part of the framework member 504 in the longitudinal direction X. According to this configuration, the framework member 504 is a hollow member.

The second main body 531 of the second half portion 503 is, for example, a flat-shaped portion, and extends along the width direction Y. The second vertical wall 532 extends from the second main body 531. The second main body 531 is continuous with the other end of the second vertical wall 532, and the third flange 533 is continuous with the one end of the second vertical wall 532.

The third flange 533 is arranged opposing the second flange 523 in the height direction Z. The second flange 523 and the third flange 533 form the half-portion joint portion 575 by being joined to each other at a position which overlaps with the panel joint portion 572 in the height direction Z (thickness direction of the panel 501). That is, because the panel joint portion 572 and the half-portion joint portion 575 are formed at a place where the first flange 513, the second flange 523 and the third flange 533 are superimposed on one another, the panel joint portion 572 and the half-portion joint portion 575 are arranged overlapping each other in the thickness direction of the panel 501. In this way, the half-portion joint portion 575 is provided in the framework member 504.

The joining method with respect to the half-portion joint portion 575 is the same as the joining method described above. The half-portion joint portion 575 has a first half-portion joint portion 561 formed in the second flange 523, and a second half-portion joint portion 562 formed in the third flange 533. The second half-portion joint portion 562 is formed in the third flange 533 at a place that is recessed toward the second flange 523 side. Flange gaps 580 and 580 are formed on both sides of the half-portion joint portion 575 in the width direction Y as a result of the second flange 523 and the third flange 533 being arranged spaced apart from each other.

The second flange 523 and the third flange 533 are firmly fixed by the half-portion joint portion 575. The half-portion joint portion 575 restricts relative movement (relative sliding) between the second flange 523 and the third flange 533 even when an exciting force is input to the framework member 504. Further, the second flange 523 and the third flange 533 do not come in contact with each other in an area other than the half-portion joint portion 575 where the second flange 523 and the third flange 533 are joined. Therefore, since generation of friction at the joined flanges 523 and 533 is suppressed while securing the rigidity by the flanges 523 and 533 being joined at the half-portion joint portion 575, structural hysteresis can be suppressed in the vehicle body framework (framework member 504) that contributes greatly to the vehicle body rigidity which influences the steering stability of the vehicle.

The vehicle body 600 including the joining structure 570 having the configuration described above receives an exciting force due to vibration from the engine, vibration from the suspension, and vibrations generated by pressure fluctuations in air at the vehicle surface. The exciting force propagates through the framework member 504 of the vehicle body 600, and is transmitted to the joining structure 570. In the joining structure 570, the panel-side contact portion 543 and the first contact portion 553 of the panel contact portion 573 slide against each other due to the exciting force, thereby attenuating the vibrations. That is, when the panel-side contact portion 543 slides with respect to the first contact portion 553, the aforementioned exciting force is consumed as thermal energy and attenuated. As a result, vibration sound (panel vibration sound) can be suppressed. By utilizing the vibration energy attenuation effect produced by friction between the sheets of the joined flanges 513 and 523 in this way, even in a case where the sheet thickness of the panel 501 and the framework member 504 is made thin, vehicle body vibrations can be suppressed and noise emitted by the automobile can also be suppressed.

Furthermore, according to the present embodiment, in the framework member 504, relative displacement between the second flange 523 and the third flange 533 is restricted by the half-portion joint portion 575. By this means, even if the aforementioned exciting force acts on the framework member 504, relative displacement between the first half portion 502 and the second half portion 503 in the framework member 504 can be suppressed. Therefore, the rigidity of the framework member 504 can be further increased. As a result, the structural hysteresis of the vehicle body 600 (framework member 504) can be suppressed. Note that, structural hysteresis is a phenomenon that is often seen in mechanical structures that deform or displace under a cyclic load, and is a phenomenon in which loading and unloading plot different paths with respect to the relation between load and displacement. For example, when the automobile turns from a state in which it is travelling straight ahead, and then returns to a state in which it is travelling straight ahead, if the difference with respect to the relation between the steering angle of the steering wheel and the behavior of the vehicle body 600 is small between the time of changing from travelling straight ahead→turning and the time of changing from turning→travelling straight ahead, it can be said that the structural hysteresis is small. By making the structural hysteresis small, the steering stability of the automobile and the sensory evaluation of the driver can be further enhanced. Thus, by increasing the bonding strength of these half portions 502 and 503 at a joint portion (half-portion joint portion 575) between the first half portion 502 and the second half portion 503 of the framework member 504, relative displacement caused by the aforementioned exciting force is suppressed to thereby suppress structural hysteresis, and on the other hand, by providing the panel contact portion 573 at a joint portion between the panel 501 and the framework member 504, vibrations of the vehicle body 600 can be attenuated at the panel contact portion 573. As a result, in the automobile, steering stability and sensory evaluation of the driver as well as quietness can be achieved in a compatible manner.

Further, in the present embodiment, the panel contact portion 573 is provided at one end of the curved portions 540 and 550. With this configuration, because the contact portions 543 and 553 are provided at one end of the curved portions 540 and 550 as places at which a contact force between the flanges 513 and 523 is particularly high, the amount of energy attenuation due to frictional sliding between the panel-side contact portion 543 and the first contact portion 553 can be increased.

The foregoing describes the schematic configuration of the vehicle body 600. Next, an example of a method for producing the vehicle body 600 will be described.

Figure 14:
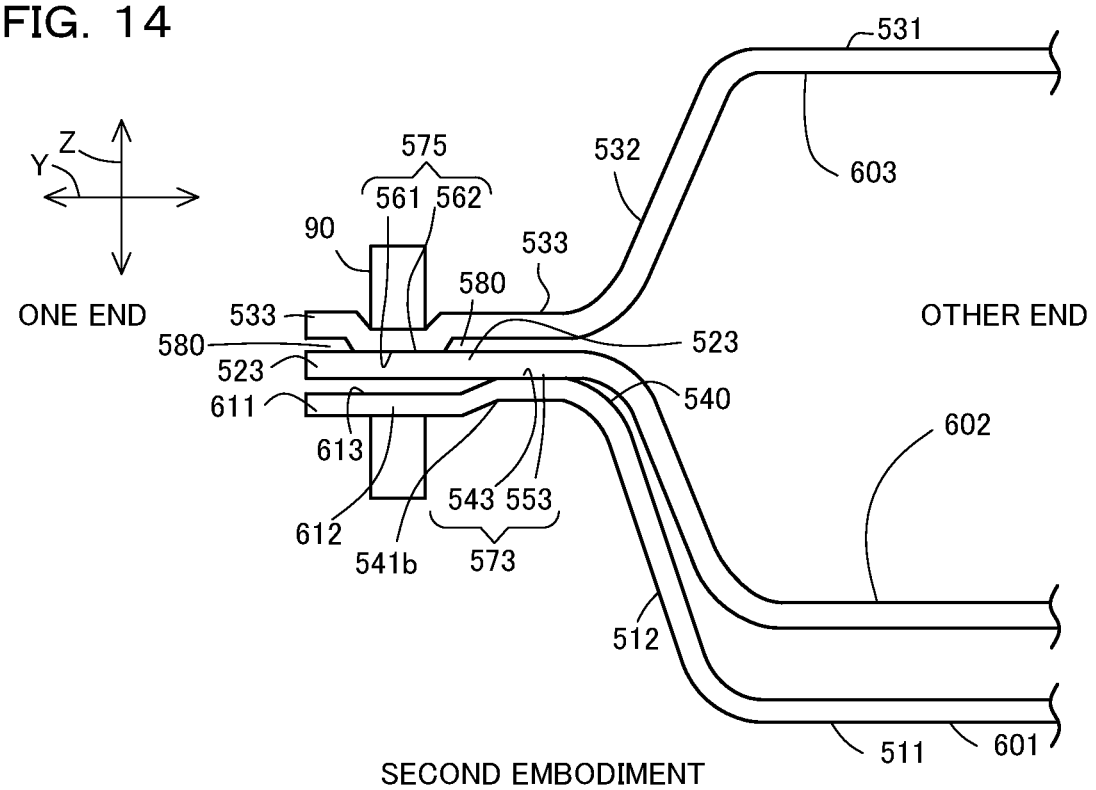
FIG. 14 is a schematic diagram for describing a process for joining a first flange of the vehicle body to a second flange.

FIG. 14 is a schematic diagram for describing a process for joining the first flange 513 of the vehicle body 600 to the second flange 523. Referring to FIG. 13 and FIG. 14, when joining the first flange 513 to the second flange 523, first, a first flange starting material 601, a second flange starting material 602, and a third flange starting material 603 that are illustrated in FIG. 14 are prepared. The first flange starting material 601 is the starting material of the first flange 513, the second flange starting material 602 is the starting material of the second flange 523, and the third flange starting material 603 is the starting material of the third flange 533.

The first flange starting material 601 is formed in approximately the same shape as the panel 501 except that a portion of the first flange 513 which is located on the one end side in the width direction Y from the intermediate portion of the panel-side gap forming portion 541 is formed in a flat shape. That is, the first flange starting material 601 has the panel main body 511, the panel vertical wall 512, and a first planned flange portion 611. The first planned flange portion 611 has the panel curved portion 540, the panel-side contact portion 543, the other end 541b of the panel-side gap forming portion 541, and a panel flat sheet portion 612 extending to the one end side in the width direction Y from the intermediate portion of the panel-side gap forming portion 541. A panel recess 613 is formed by the other end 541b of the panel-side gap forming portion 541 and the panel flat sheet portion 612. The panel recess 613 is a portion at which the first flange starting material 601 and the second flange starting material 602 is separated from each other when the first flange starting material 601 and the second flange starting material 602 are butted against each other.

The second flange starting material 602 and the third flange starting material 603 are formed in the same shape as the corresponding first half portion 502 and second half portion 503, respectively. One part of the second flange 523 of the second flange starting material 602 is a portion at which the second flange starting material 602 and the third flange starting material 603 is separated from each other when the panel-side contact portion 543 of the first flange starting material 601 and the first contact portion 553 of the second flange starting material 602 are butted against each other.

After preparing the first flange starting material 601, the second flange starting material 602, and the third flange starting material 603, the panel-side contact portion 543 of the first flange starting material 601 and the first contact portion 553 of the second flange starting material 602 are positioned to oppose each other. In addition, the second flange 523 of the second flange starting material 602 and the third flange 533 of the third flange starting material 603 are positioned to oppose each other.

Subsequently, by abutting the first flange starting material 601 and the second flange starting material 602 against each other at the place where the panel recess 613 is arranged, the panel recess 613 is deformed. Specifically, the clamp of the spot welding gun 90 sandwiches the first flange starting material 601, the second flange starting material 602, and the third flange starting material 603. That is, the spot welding gun 90 sandwiches the flange starting materials 601, 602, and 603 so that, in the recess 613, the places that are to serve as the panel joint portion 572 contact each other. By this means, the portions of the flange starting materials 601 and 602 which become the panel joint portion 572 are abutted, and by joining the abutted portions by spot welding or the like, the panel joint portion 572 and the half-portion joint portion 575 are formed. At this time, at the panel contact portion 573 which is at a position that is separated from the panel joint portion 572, as a result of deformation of the panel flat sheet portion 612, the panel-side contact portion 543 and the first contact portion 553 are slidably pressed against each other.

In this way, the flange starting materials 601 and 602 are formed so that a clearance (recess 613) can be formed in the vicinity of portions which become the panel joint portion 572 prior to spot welding, and joining is performed while forcibly causing the flange starting materials 601 and 602 to come in contact with each other while sandwiching the flange starting materials 601 and 602 using the spot welding gun 90. By this means, the panel-side contact portion 543 and the first contact portion 553 firmly come in contact at the panel contact portion 573 which is a place that is other than the panel joint portion 572.

By the above process, the first flange 513 is formed and the second flange 523 is formed, and furthermore, the first flange 513 and the second flange 523 are joined to each other at the panel joint portion 572. Further, the second and third flanges 523 and 533 are joined to each other at the half-portion joint portion 575. Note that, in addition to the panel recess 613 of the first flange starting material 601, a first recess may be formed in the second flange starting material 602 at a place opposing the panel recess 613 in the height direction Z. In such a case, the panel recess 613 need not be provided. The planned flange portion of the flange starting material in which a recess is not provided is formed in a flat shape.

As described above, according to the present embodiment, by the simple operation of performing joining while sandwiching the recess 613 and the second flange starting material 602 with the clamp of the spot welding gun 90, the panel joint portion 572 and the panel contact portion 573 which is capable of attenuating vibration energy can be formed.

Further, in the present embodiment, because the panel joint portion 572 and the half-portion joint portion 575 are formed at a place where the first flange 513, the second flange 523 and the third flange 533 are superimposed on each other, the panel joint portion 572 and the half-portion joint portion 575 are arranged overlapping one another in the thickness direction of the panel 501. According to this configuration, the panel recess 613 of the first flange starting material 601, the second flange 523 of the second flange starting material 602, and the third flange 533 of the third flange starting material 603 can be superimposed on one another and sandwiched with the spot welding gun 90. Hence, a joining operation to join the first flange 513 and the second flange 523, and a joining operation to join the second flange 523 and the third flange 533 can be performed together at one time.

Note that, although a form in which the panel contact portion 573 is provided at one end of the curved portions 540 and 550 has been described as an example in the above embodiment, the form in which the panel contact portion 573 is provided may be different from the above example. Hereinafter, structures which are different from the foregoing embodiment will be mainly described, and structures which are the like in the foregoing embodiment are denoted by the like reference numerals in the drawings and a detailed description thereof may be omitted.

Figure 15A:
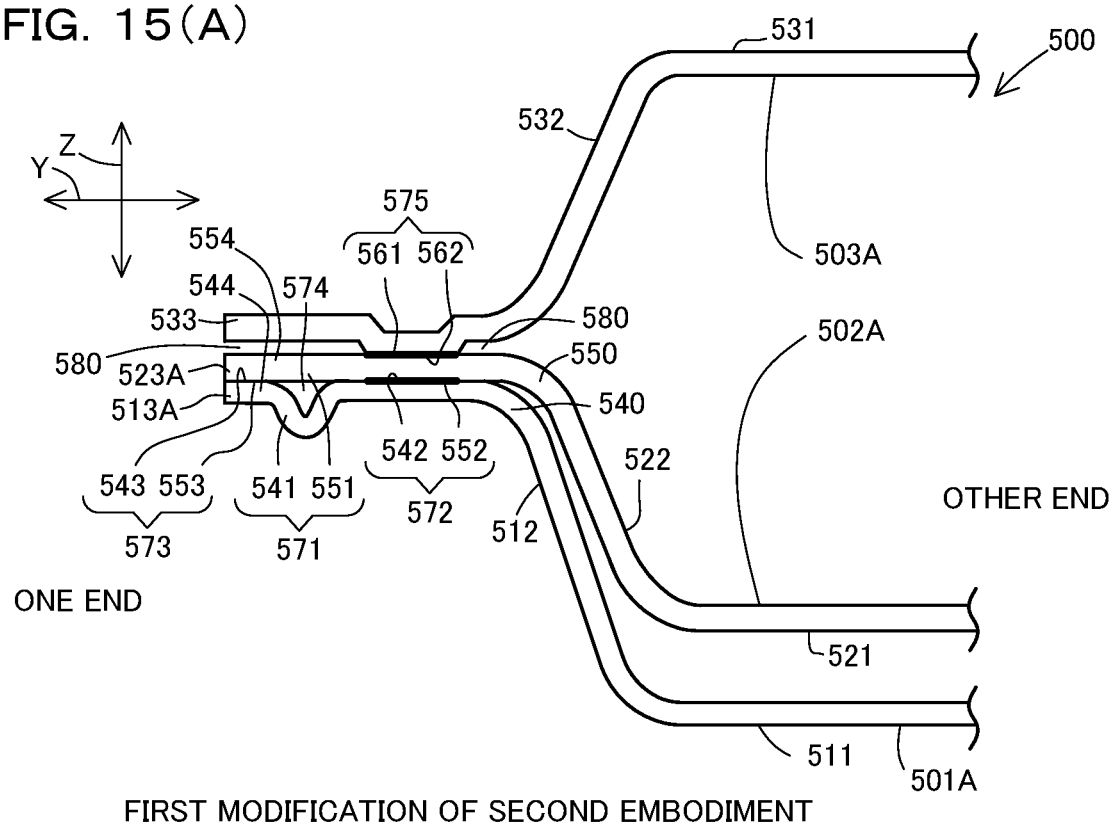
FIG. 15(A) is a view illustrating a first modification of the second embodiment, and shows a state as viewed from the longitudinal direction.

FIG. 15(A) is a view illustrating a first modification of the second embodiment, and shows a state as viewed from the longitudinal direction X. In the embodiment described above, the curved portions 540 and 550, the panel contact portion 573, the panel gap forming portion 571, and the panel joint portion 572 are arranged in that order from the other end to the one end along the width direction Y. However, a different configuration may also be adopted. In the first modification illustrated in FIG. 15(A), the curved portions 540 and 550, the panel joint portion 572, the panel gap forming portion 571, and the panel contact portion 573 are arranged in that order from the other end to the one end along the width direction Y. In this first modification, the panel contact portion 573 is arranged at the edge parts 544 and 554 of flanges 513A and 523A. The length of the panel contact portion 573 in the width direction Y is appropriately set according to the pressure for the target frictional resistance force between the panel-side contact portion 543 and the first contact portion 553 and the like. Further, the panel joint portion 572 is arranged between the panel contact portion 573 and the curved portions 540 and 550.

Figure 15B:
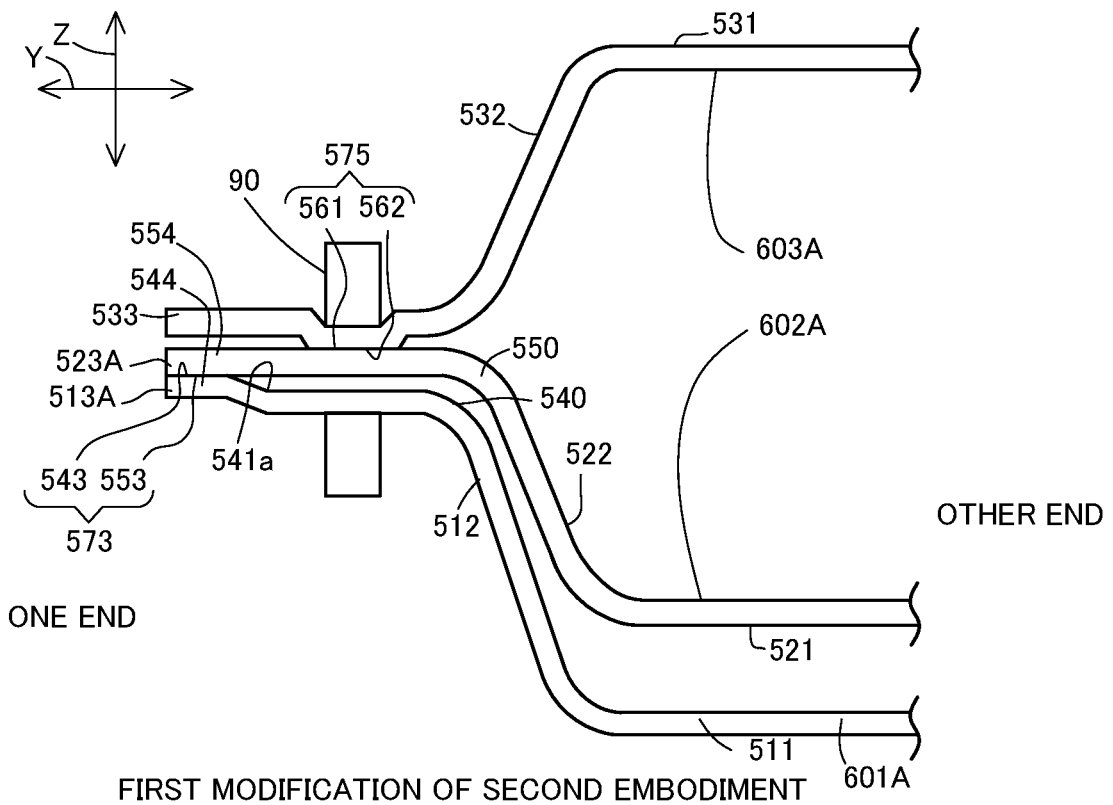
FIG. 15(B) is a schematic diagram for describing a process for joining a first flange to a second flange in the first modification of the second embodiment.

In this first modification, when joining the first flange 513A to the second flange 523A, as illustrated in FIG. 15(B), a first flange starting material 601A, a second flange starting material 602A, and a third flange starting material 603A are prepared. The first flange starting material 601A has the same shape as a panel 501A except that one part of a portion extending from the other end of the panel-side contact portion 543 is inclined so as to move away from the second flange starting material 602A, and thereafter extends in a flat shape to the panel curved portion 540. The second flange starting material 602A and the third flange starting material 603A are formed in the same shape as a corresponding first half portion 502A and second half portion 503A, respectively. Further, the contact portions 543 and 553 of the first flange starting material 601A and the second flange starting material 602A are caused to come in contact with each other, and the first half-portion joint portion 561 of the second flange starting material 602A and the second half-portion joint portion 562 of the third flange starting material 603A are caused to come in contact with each other. In this state, the place where the panel joint portion 572 is formed is sandwiched with the clamp of the spot welding gun 90. By this means, the panel joint portion 572 and the half-portion joint portion 575 are formed.

Figure 16A:
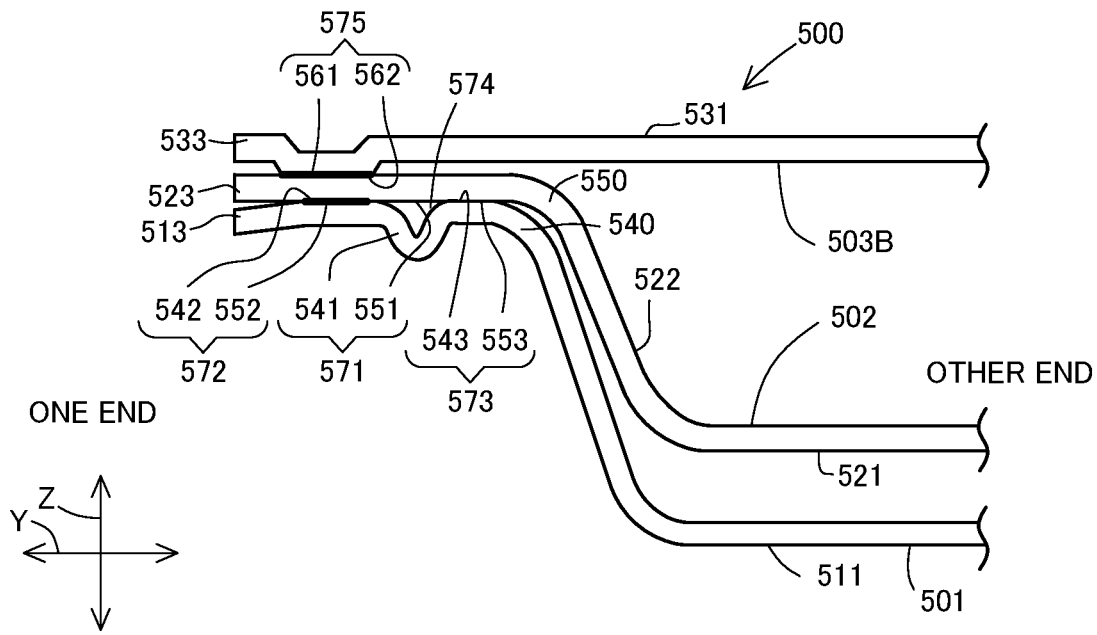
FIG. 16(A) is a view illustrating a second modification of the second embodiment, and shows a state as viewed from the longitudinal direction.
Figure 16B:
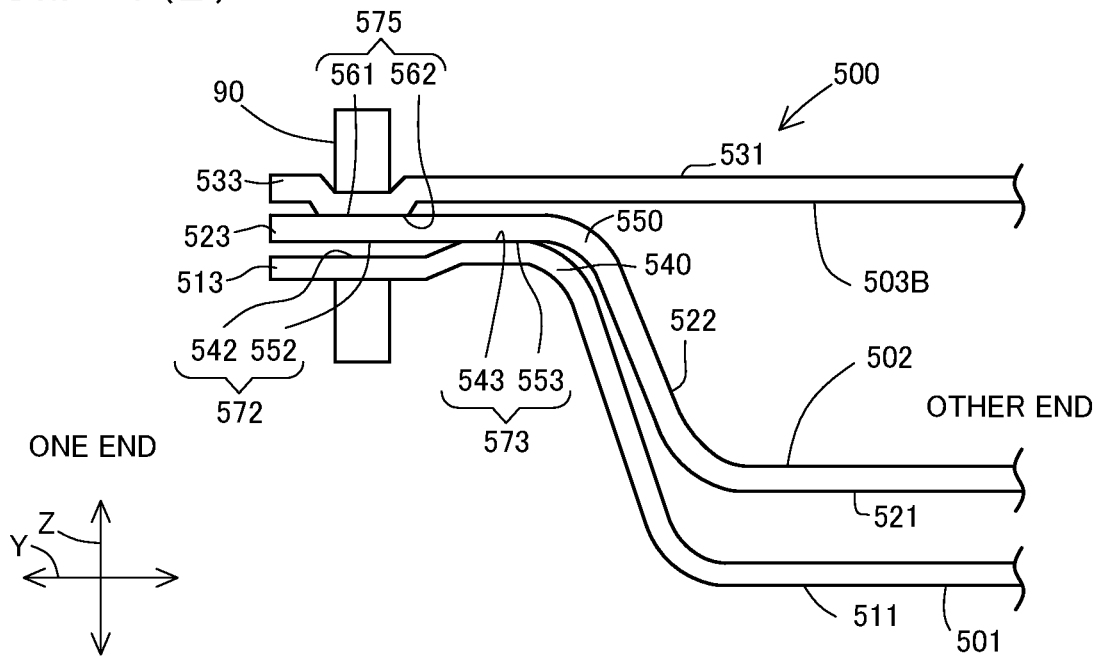
FIG. 16(B) is a schematic diagram for describing a process for joining a first flange to a second flange in the second modification of the second embodiment.

FIG. 16(A) is a view illustrating a second modification of the second embodiment, and shows a state as viewed from the longitudinal direction X. FIG. 16(B) is a schematic diagram for describing a process for joining the first flange 513 to the second flange 523 in the second modification of the second embodiment. In the second modification, with regard to a second half portion 503B, the one end side portion other than the second half-portion joint portion 562 is formed in a flat shape. Apart from this point, the configuration is the same as the second embodiment.

Figure 17A:
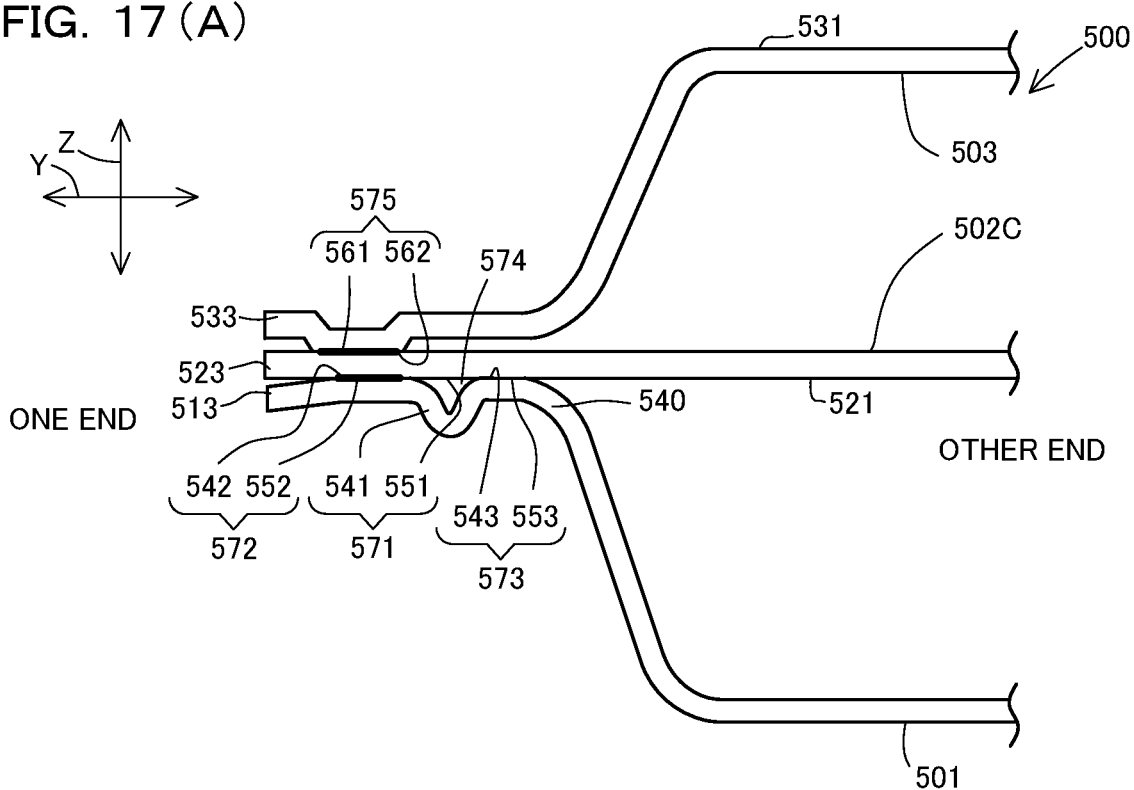
FIG. 17(A) is a view illustrating a third modification of the second embodiment, and shows a state as viewed from the longitudinal direction.
Figure 17B:
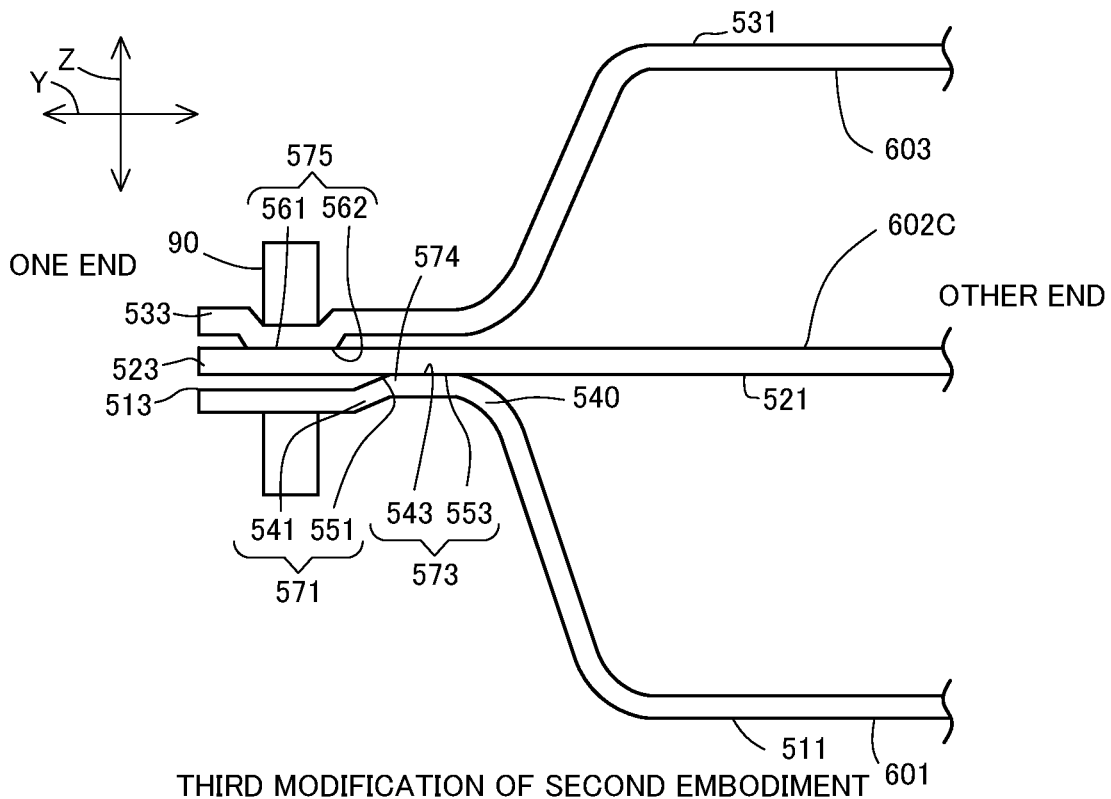
FIG. 17(B) is a schematic diagram for describing a process for joining a first flange to a second flange in the third modification of the second embodiment.

FIG. 17(A) is a view illustrating a third modification of the second embodiment, and shows a state as viewed from the longitudinal direction X. FIG. 17(B) is a schematic diagram for describing a process for joining the first flange 513 to the second flange 523 in the third modification of the second embodiment. In the third modification, a first half portion 502C is formed using a sheet in which the whole of the one end side portion is flat. Apart from this point, the configuration is the same as the second embodiment.

Figure 18:
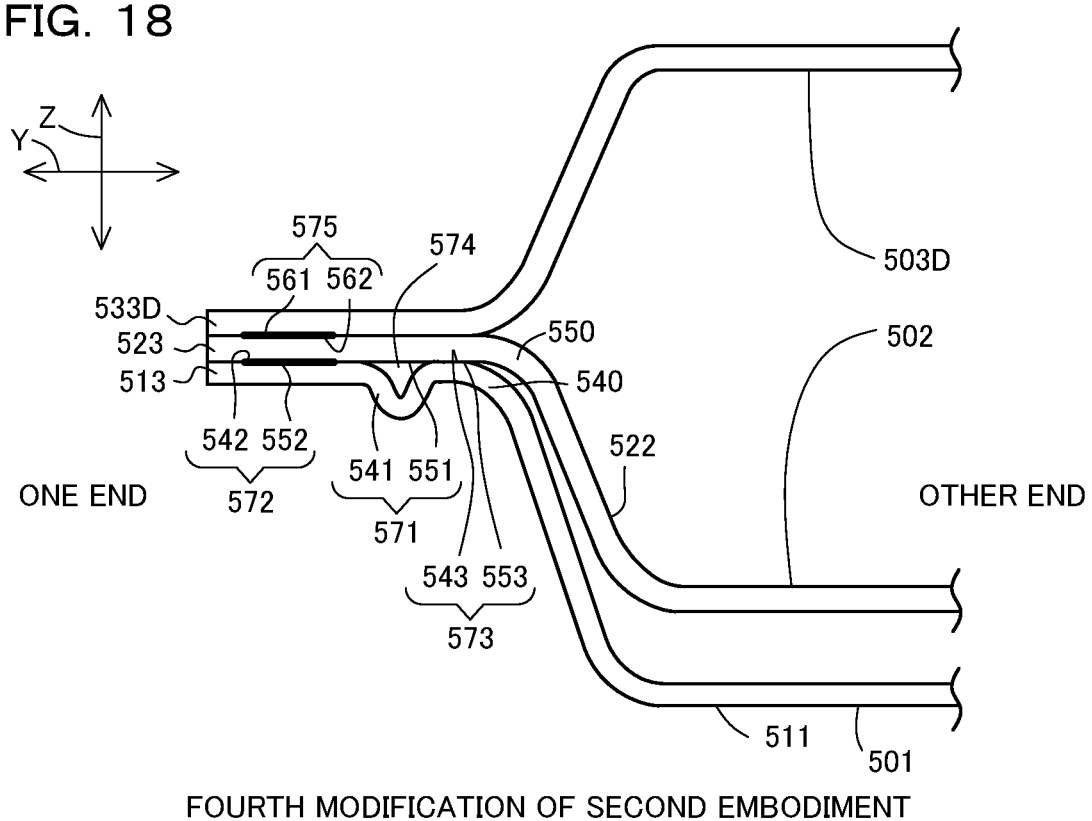
FIG. 18 is a view illustrating a fourth modification of the second embodiment, and shows a view as viewed from a longitudinal direction X.

FIG. 18 is a view illustrating a fourth modification of the second embodiment, and shows a state as viewed from the longitudinal direction X. In the fourth modification, the whole of a third flange 533D of a second half portion 503D is formed in a flat shape. Apart from this point, the configuration is the same as the second embodiment.

Figure 19A:
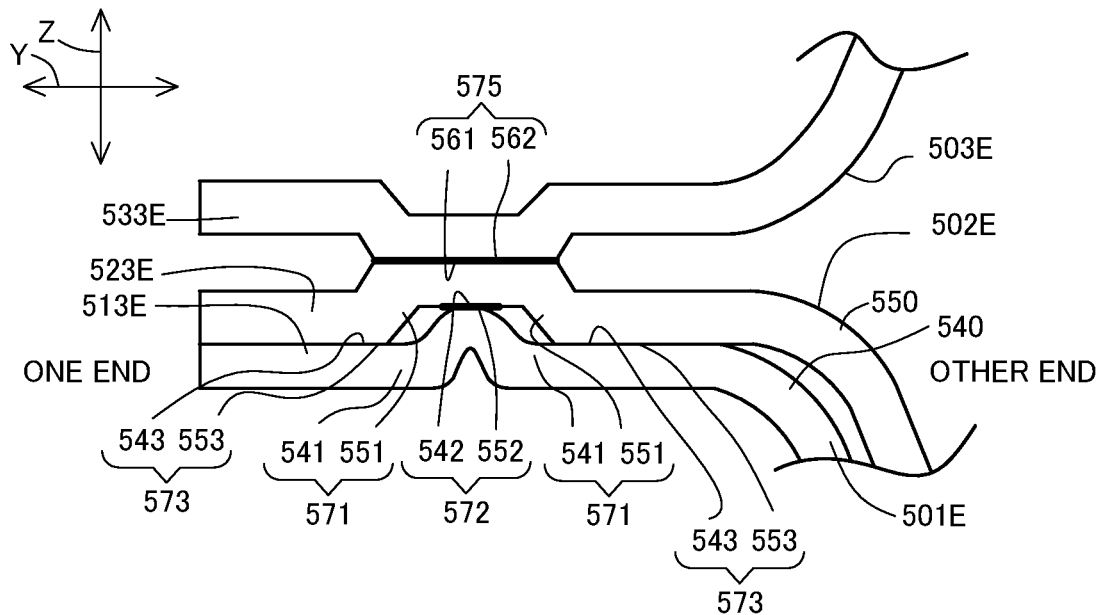
FIG. 19(A) is a view illustrating a fifth modification of the second embodiment, and shows a view as viewed from the longitudinal direction X.
Figure 19B:
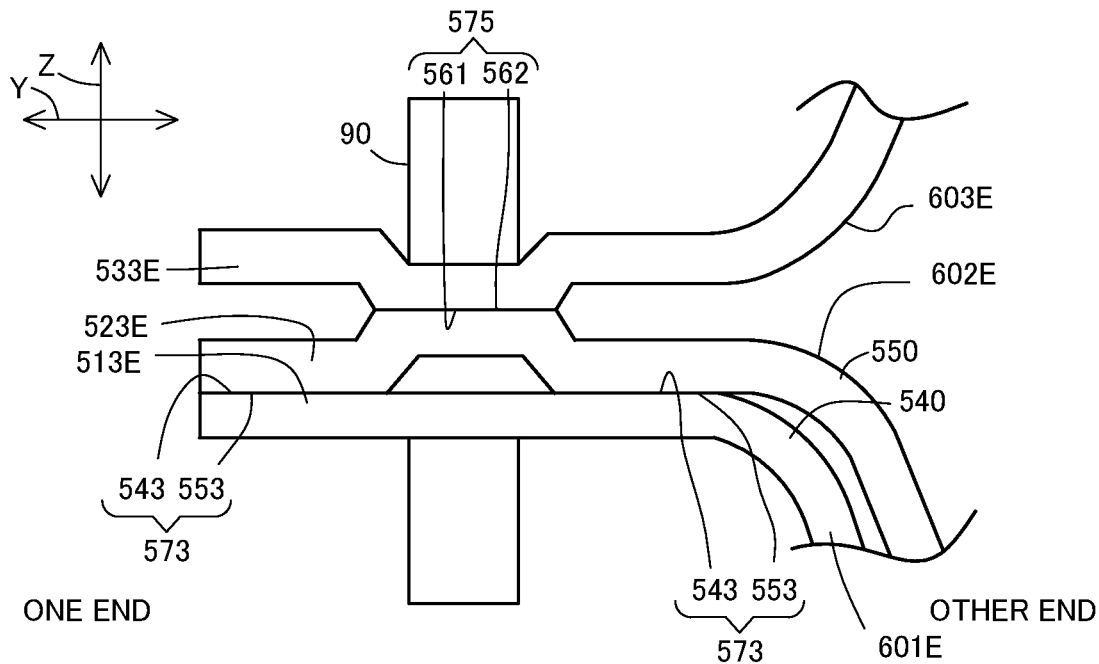
FIG. 19(B) is a schematic diagram for describing a process for joining a first flange to a second flange in the fifth modification of the second embodiment.

FIG. 19(A) is a view illustrating a fifth modification of the second embodiment, and shows a view as viewed from the longitudinal direction X. FIG. 19(B) is a schematic diagram for describing a process for joining a first flange 513E to a second flange 523E in the fifth modification of the second embodiment. In the fifth modification, a pair of the panel contact portions 573 is provided. In this fifth modification, one panel contact portion 573, one panel gap forming portion 571, the panel joint portion 572, another panel gap forming portion 571, and another panel contact portion 573 are arranged in that order from the other end to the one end in the width direction Y. An intermediate portion in the width direction Y of the first flange 513E is formed in a shape that is convex toward a recessed portion formed in the second flange 523E, and the panel-side joint portion 542 is formed at this portion. The first half-portion joint portion 561 and the second half-portion joint portion 562 are provided at positions aligned with the panel-side joint portion 542 in the height direction Z.

When joining the first flange 513E to the second flange 523E, a first flange starting material 601E, a second flange starting material 602E, and a third flange starting material 603E are prepared. In the first flange starting material 601E, a flange portion that is to become the first flange 513E is flat. The second flange starting material 602E and the third flange starting material 603E are the same shape as a corresponding first half portion 502E and second half portion 503E, respectively. The flange portion of the first flange starting material 601E and the second flange 523E of the second flange starting material 602E are then superimposed on each other, and the second flange 523E and a third flange 533E are also superimposed on each other. In this state, the spot welding gun 90 is used to perform a joining operation while sandwiching the places where the panel joint portion 572 and the half-portion joint portion 575 are to be formed. By this means, as illustrated in FIG. 19(A), the first flange 513E is joined to the second flange 523E.

Figure 20A:
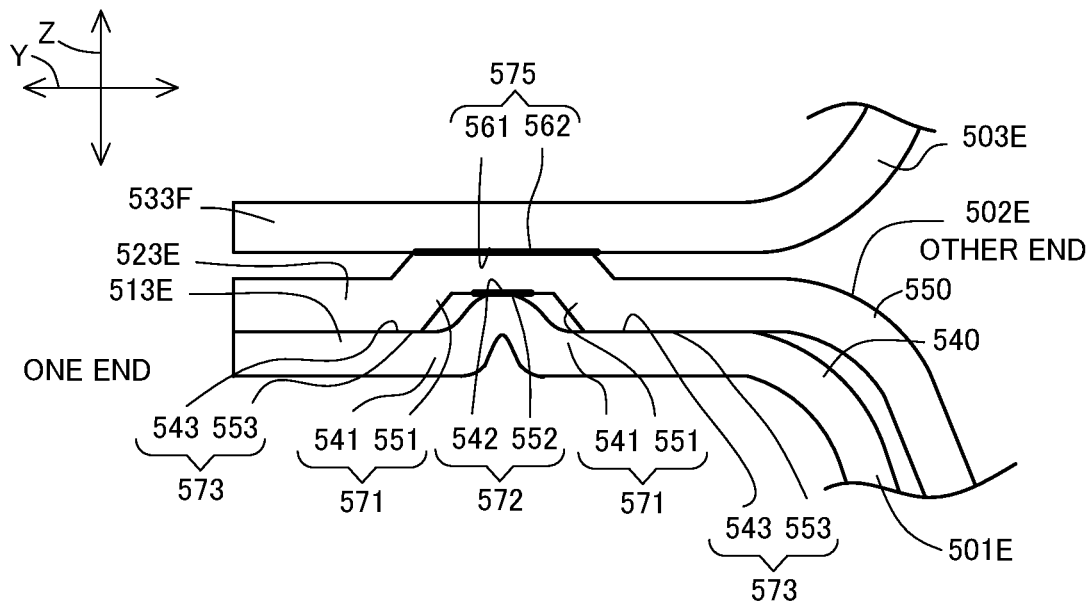
FIG. 20(A) is a view illustrating a sixth modification of the second embodiment, and shows a view as viewed from the longitudinal direction.
Figure 20B:
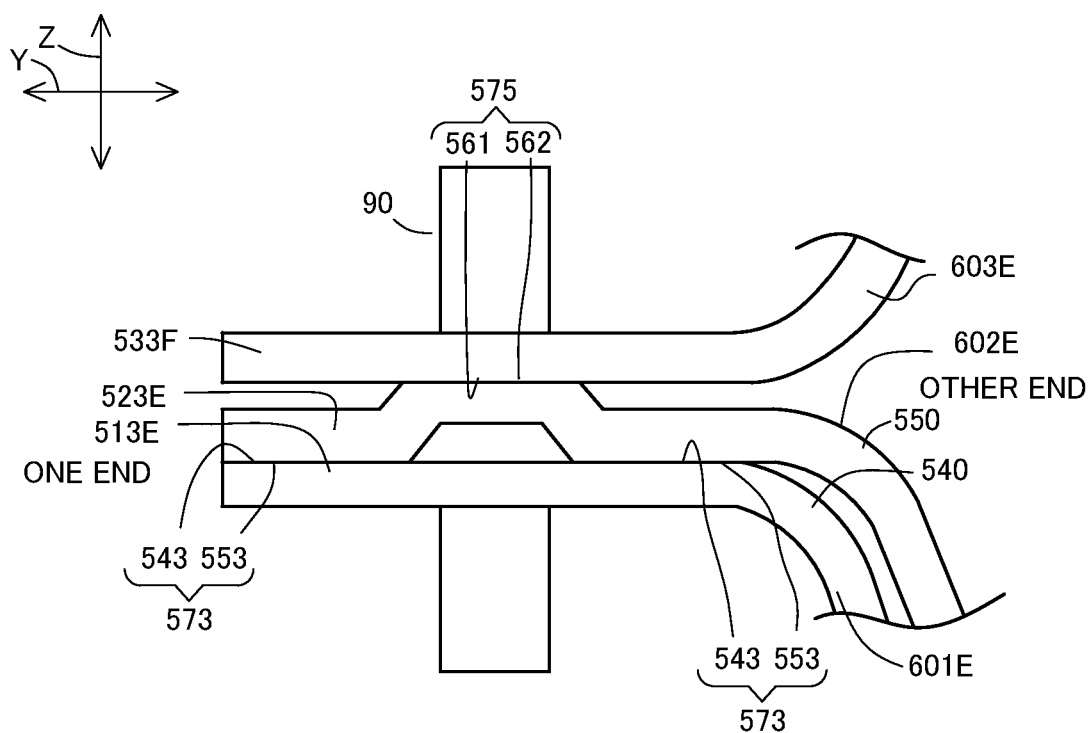
FIG. 20(B) is a schematic diagram for describing a process for joining a first flange to a second flange in the sixth modification of the second embodiment.

FIG. 20(A) is a view illustrating a sixth modification of the second embodiment, and shows a view as viewed from the longitudinal direction X. FIG. 20(B) is a schematic diagram describing a process for joining the first flange 513E to the second flange 523E in the sixth modification of the second embodiment. In the sixth modification, the whole of a third flange 533F is formed in a flat shape. Apart from this point, the configuration is the same as the fifth modification.

Third Embodiment

Figure 21:
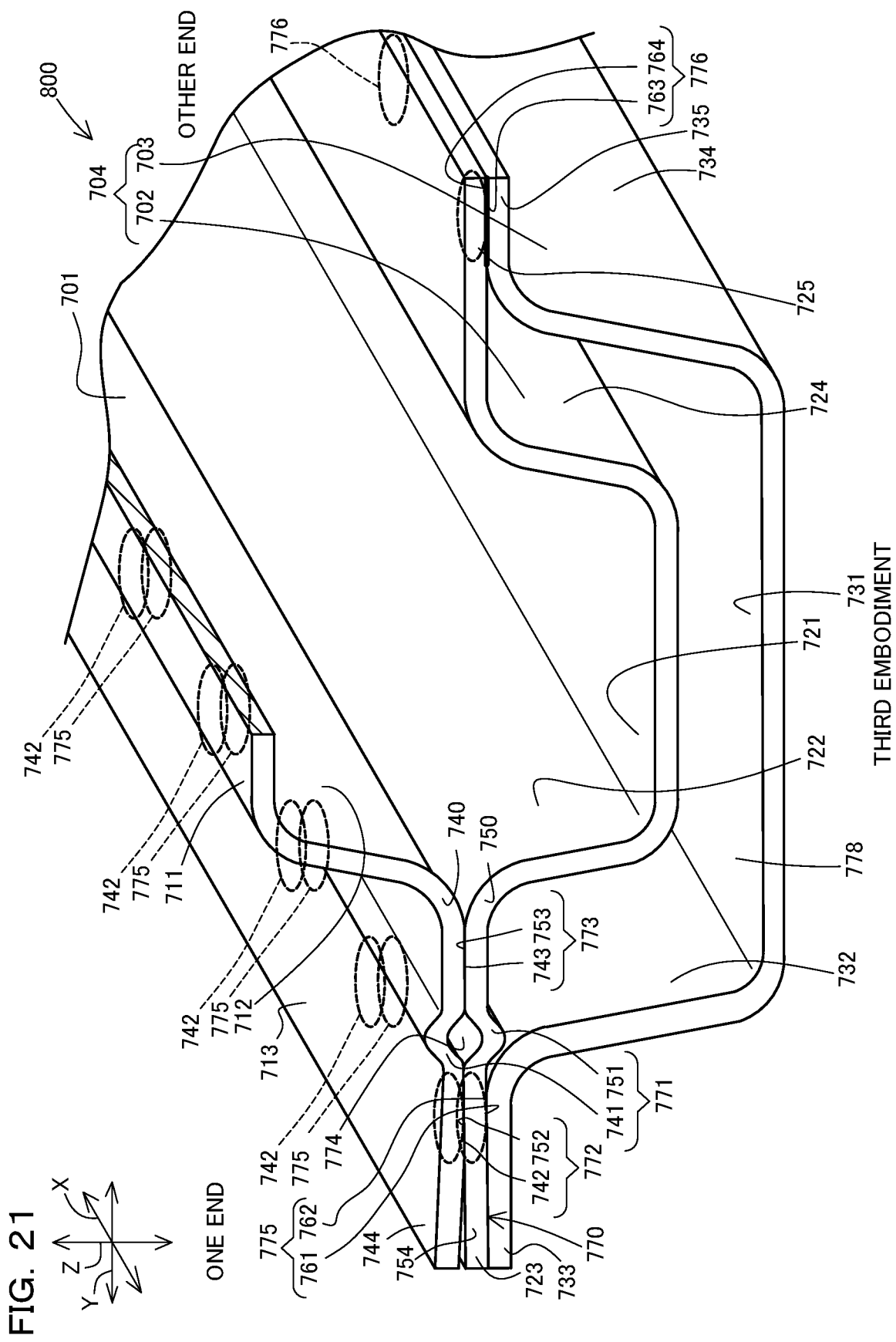
FIG. 21 is a schematic perspective view illustrating one part of an automobile vehicle body according to a third embodiment of the present invention.
Figure 22:
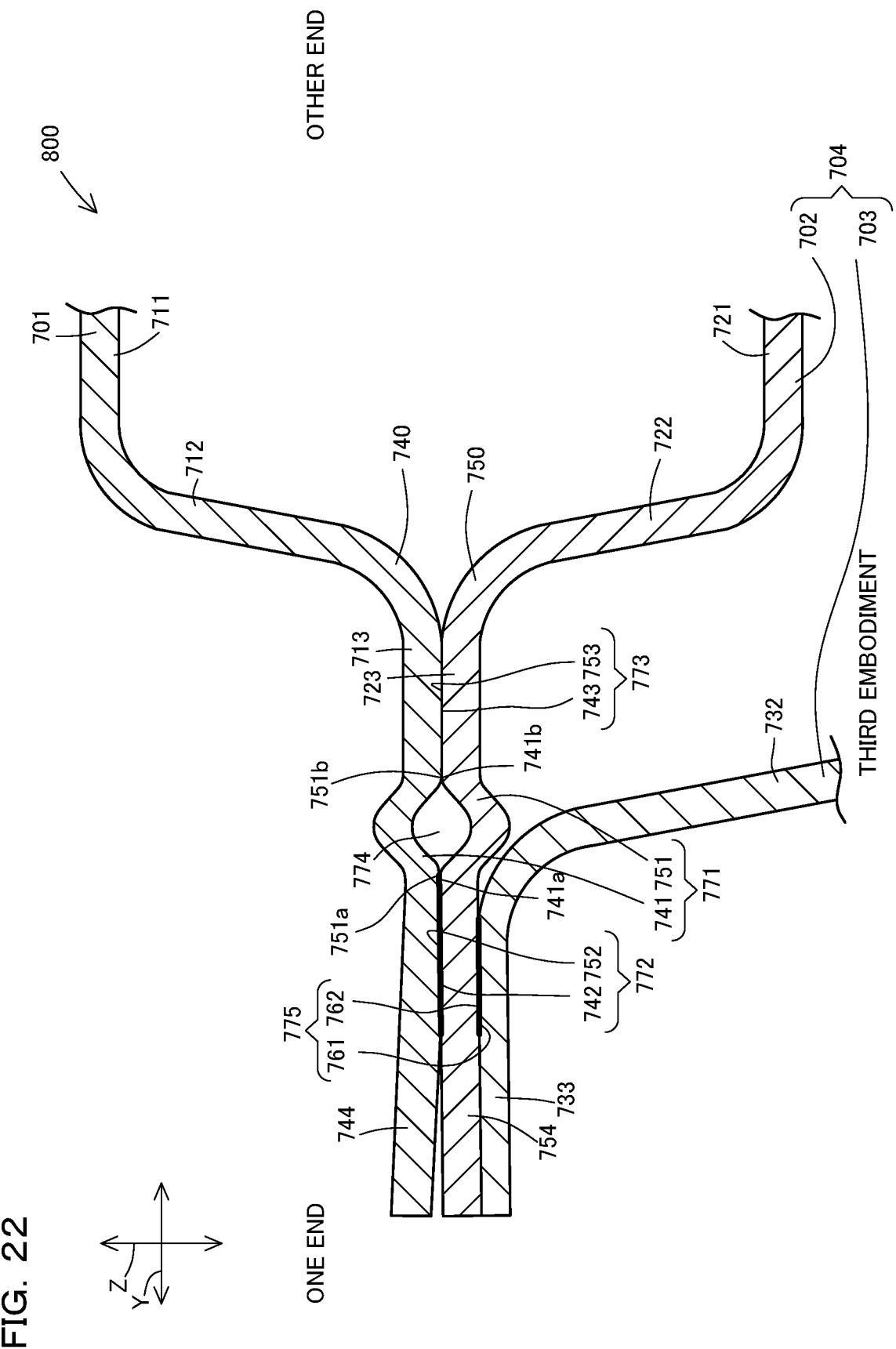
FIG. 22 is a cross-sectional diagram illustrating one part of the vehicle body of the third embodiment, and shows a state as viewed from the longitudinal direction.

FIG. 21 is a schematic perspective view illustrating a part of an automobile vehicle body 800 (hereinafter, also referred to simply as "vehicle body 800") according to a third embodiment of the present invention. FIG. 22 is a cross-sectional diagram illustrating one part of the vehicle body 800 of the third embodiment, and shows a state as viewed from the longitudinal direction X.

Note that, in the third embodiment, the longitudinal direction of a joining structure 770 of the vehicle body 800 shown in FIG. 21 is referred to as "longitudinal direction X". In the longitudinal direction X, the side facing away from the viewer in FIG. 22 is taken as the positive side. Further, the width direction of the joining structure 770 is referred to as "width direction Y". The width direction Y is the transverse direction in FIG. 21 and FIG. 22, and the left direction on the page surface is taken as the positive side. Further, the direction orthogonal to both the longitudinal direction X and the width direction Y is referred to as "height direction Z". In the height direction Z, the upper side on the page surface in FIG. 21 and FIG. 22 is taken as the positive side. The longitudinal direction X, the width direction Y, and the height direction Z may match the vehicle length direction, the vehicle width direction, and the vehicle height direction of the vehicle body 800, respectively, or need not match these directions, respectively. Hereinafter, one of the sides in the width direction Y is referred to as "one end side", and the other side is referred to as "the other end side".

The vehicle body 800 has a panel 701, and a framework member 704.

In the present embodiment, the panel 701 is, for example, an exterior member of the vehicle body 800, and is not a framework member which bears the weight of the automobile and receives an external force from the suspension. Examples of such an exterior member that can be mentioned include an outer panel, a rear quarter panel, a roof panel, a door panel (door inner panel, door outer panel), and a bonnet hood (hood inner panel, hood outer panel) of an automobile. Note that, the panel 701 may be an exterior member other than the members mentioned as examples above. The panel 701 is formed in a sheet shape by subjecting a sheet to press working.

The framework member 704 is provided as a framework member of the vehicle body 800. Examples of this kind of framework member 704 that can be mentioned include a front side member, an A pillar, a B pillar, a C pillar, a side sill, and a rear side member. Note that, it suffices that, in the automobile 800, the framework member 704 is a member that bears the weight of a component other than the framework member 704 itself, and receives a load from the suspension, and the framework member 704 may be a member other than the members mentioned as examples above.

The panel 701 has a panel main body 711, a panel vertical wall 712, and a first flange 713.

The framework member 704 has a first half portion 702, and a second half portion 703 which is combined with the first half portion 702.

In the present embodiment, the first half portion 702 has a hat-shaped cross section, and includes a first main body 721, a pair of first vertical walls 722 and 724, and a pair of second flanges 723 and 725.

In the present embodiment, the second half portion 703 has a hat-shaped cross section, and includes a second main body 731, a pair of second vertical walls 732 and 734, and a pair of third flanges 733 and 735.

The sheet constituting the panel 701 is, for example, a mild steel sheet. Examples that can be mentioned as the materials constituting the panel 701, the first half portion 702, and the second half portion 703 include sheets or tubes made of steel, aluminum, magnesium, and resin including resin reinforced with fiber, and the material quality and shape of the panel 701, the first half portion 702, and the second half portion 703 may differ from each other. The panel 701, the first half portion 702, and the second half portion 703 may each be formed of a single material, or may each be formed of a composite material. The methods for joining the panel 701 and the first half portion 702, and the methods for joining the first half portion 702 and the second half portion 703 respectively include welding such as spot welding, laser welding, arc welding, or seam welding, mechanical joining such as riveting, caulking, or bolt fastening, and bonding using an adhesive or the like.

The panel vertical wall 712 extends from the panel main body 711. The panel main body 711 is continuous with the other end of the panel vertical wall 712, and the first flange 713 is continuous with the one end of the panel vertical wall 712. The first flange 713 is joined to the second flange 723 of the first half portion 702.

In the first half portion 702, the pair of first vertical walls 722 and 724 extend from the first main body 721. The first main body 721 is continuous with the other end of one first vertical wall 722, and one second flange 723 is continuous with the one end of the first vertical wall 722. The first main body 721 is continuous with the one end of the other first vertical wall 724, and the other second flange 725 is continuous with the other end of the first vertical wall 724. The first flange 713 and the second flange 723 are arranged opposing each other in the height direction Z.

In the vehicle body 800, the joining structure 770 that includes the first flange 713, the second flange 723, and the third flange 733 is provided. The joining structure 770 is provided for joining the panel 701 to the framework member 704.

The joining structure 770 has: the first flange 713; the second flange 723; a panel gap forming portion 771, a panel joint portion 772 and a panel contact portion 773 which are formed by the flanges 713 and 723; the third flange 733; and one half-portion joint portion 775 which is formed by the second flange 723 and the third flange 733.

The first flange 713 has a panel curved portion 740, a panel-side gap forming portion 741, a panel-side joint portion 742, a panel-side contact portion 743, and a panel edge part 744.

The panel curved portion 740 is formed in a curved shape as viewed from the longitudinal direction X, and is formed in an arc shape that is convex toward the first half portion 702. The panel curved portion 740 extends to one side in the height direction Z so that the distance from the second flange 723 increases as the distance from the panel contact portion 773 to the other end side increases. The other end of the panel curved portion 740 is continuous with the panel vertical wall 712, and the one end of the panel curved portion 740 is continuous with the panel-side gap forming portion 741 via the panel-side contact portion 743.

The panel-side gap forming portion 741 forms a gap 774 in cooperation with a first gap forming portion 751, to be described later, of the second flange 723. The panel gap forming portion 771 is formed by the panel-side gap forming portion 741 and the first gap forming portion 751. The panel-side gap forming portion 741 is formed, for example, in a substantially U-shape as viewed from the longitudinal direction X. One end 741a and the other end 741b of the panel-side gap forming portion 741 in the width direction Y are in contact with the second flange 723, while on the other hand, an intermediate portion of the panel-side gap forming portion 741 is separated from the second flange 723. The gap 774 is formed between the intermediate portion of the panel-side gap forming portion 741 as the aforementioned separated portion and the first gap forming portion 751 of the second flange 723. The one end 741a of the panel-side gap forming portion 741 is continuous with the panel edge part 744 via the panel-side joint portion 742.

The panel edge part 744 is the edge part (edge portion) of the panel 701 in the width direction Y. The panel edge part 744 is also the front end portion of the first flange 713 in the width direction Y. One end (the front end) of the panel edge part 744 is a free end.

One of the second flanges 723 has a first curved portion 750, the first gap forming portion 751, a first joint portion 752, a first contact portion 753, and a first edge part 754.

The first curved portion 750 is formed in a curved shape as viewed from the longitudinal direction X, and is formed in an arc shape that is convex toward the panel 701. The first curved portion 750 extends to the other side in the height direction Z so that the distance from the first flange 713 increases as the distance from the panel contact portion 773 to the other end side increases. The other end of the first curved portion 750 is continuous with the first vertical wall 722, and the one end of the first curved portion 750 is continuous with the first gap forming portion 751 via the first contact portion 753.

The first gap forming portion 751 is formed, for example, in a substantially U-shape as viewed from the longitudinal direction X. One end 751a and the other end 751b of the first gap forming portion 751 in the width direction Y are in contact with the panel-side gap forming portion 741, while on the other hand, an intermediate portion of the first gap forming portion 751 is separated from the first flange 713. As mentioned above, at a position between the panel joint portion 772 and the panel contact portion 773, the gap 774 is formed between the first flange 713 and the second flange 723 as a result of the first flange 713 and the second flange 723 (the panel-side gap forming portion 741 and the first gap forming portion 751) being separated from each other. The width and height of the gap 774 are appropriately set according to the target frictional pressure and the like between the flanges 713 and 723 at the panel contact portion 773. The one end 751a of the first gap forming portion 751 is continuous with the first edge part 754 via the first joint portion 752.

The first edge part 754 is the edge part (edge portion) of the first half portion 702 in the width direction Y. The first edge part 754 is also the front end portion of the second flange 723 in the width direction Y. One end (the front end) of the first edge part 754 is a free end. In the present embodiment, the first edge part 754 extends along the width direction Y. In the present embodiment, a clearance is formed between the panel edge part 744 and the first edge part 754.

The panel joint portion 772 is formed by joining the first flange 713 and the second flange 723 (a first flange starting material and a second flange starting material which are described later) to each other in a state in which at least one of the first flange 713 and the second flange 723 is collapsed to the side of the other of the first flange 713 and the second flange 723. In the present embodiment, the panel joint portion 772 is formed by joining these flanges 713 and flange 723 to each other in a state in which the first flange 713 is collapsed to the second flange 723 side, and the second flange 723 is collapsed to the first flange 713 side. Spot welding can be mentioned as an example of the joining method in this case. The panel joint portion 772 is formed by, for example, intermittently performing spot welding in the longitudinal direction X. Note that, the panel joint portion 772 may be formed by joining the first flange 713 and the second flange 723 over the entire area in the longitudinal direction X in a state in which these flanges 713 and 723 are pressed against each other.

The panel joint portion 772 has the panel-side joint portion 742 which is formed in the first flange 713, and the first joint portion 752 which is formed in the second flange 723.

In the present embodiment, the panel-side joint portion 742 is provided at the one end 741a of the panel-side gap forming portion 741 that is the end closer to the panel edge part 744, and extends in the width direction Y. The panel-side gap forming portion 741 is formed by plastically deforming a first flange starting material that is the starting material of the first flange 713 by causing the first flange starting material to be collapsed to the side of a second flange starting material that is the starting material of the second flange 723, and presses the other end 741b (panel-side contact portion 743) of the panel-side gap forming portion 741 to the side of the first contact portion 753 of the second flange 723. The first joint portion 752 is a portion of the second flange 723 that is joined to the panel-side joint portion 742 by joining, and is formed at the one end 751a of the first gap forming portion 751 that is the end closer the first edge part 754, and extends in the width direction Y. The first gap forming portion 751 is formed by causing the second flange starting material that is the starting material of the second flange 723 to be collapsed and deformed to the side of the first flange starting material that is the starting material of the first flange 713, and presses the other end 751b (first contact portion 753) of the first gap forming portion 751 to the side of the panel-side contact portion 743 of the first flange 713.

The panel contact portion 773 is formed by the first flange 713 and the second flange 723 slidably contacting at a position that is separated from the panel joint portion 772.

The panel contact portion 773 has the panel-side contact portion 743 which is formed in the first flange 713, and the first contact portion 753 which is formed in the second flange 723.

In the present embodiment, the panel-side contact portion 743 is provided at the other end 741b which is on the panel curved portion 740 side in the panel-side gap forming portion 741, and extends in the width direction Y. It can also be said that the panel-side contact portion 743 is formed at one end of the panel curved portion 740. As mentioned above, the panel-side contact portion 743 is pressed to the side of the first contact portion 753 of the second flange 723. In the present embodiment, the first contact portion 753 is provided at the other end 751b side on the first curved portion 750 side of the first gap forming portion 751, and extends in the width direction Y. It can also be said that the first contact portion 753 is provided at one end of the first curved portion 750. The first contact portion 753 is a portion of the second flange 723 that is pressed against the panel-side contact portion 743, and by rubbing against the panel-side contact portion 743, the first contact portion 753 converts vibration energy into thermal energy to thereby attenuate the vibration energy. The panel-side contact portion 743 and the first contact portion 753 are in direct contact with each other, without an adhesive interposed therebetween. In this case, the term "direct" means that any of a steel sheet constituting the first flange 713, a plating layer formed on a surface of the steel sheet, a coating layer formed on a surface of the steel sheet, and a paint layer formed on a surface of the plating layer is in contact with any of a steel sheet constituting the second flange 723, a coating layer formed on a surface of the steel sheet, a plating layer formed on a surface of the steel sheet, and a paint layer formed on a surface of the plating layer. Since a panel component makes almost no contribution to the vehicle body rigidity that affects the steering stability, and structural hysteresis of the vehicle body which is caused by the aforementioned contact can therefore be ignored, the contact at the aforementioned joined flanges does not cause the steering stability or the sensory evaluation of the driver to deteriorate.

Next, a more detailed configuration of the framework member 704 is described.

In the framework member 704, the first half portion 702 constitutes the one side portion of the framework member 704 in the height direction Z, and the second half portion 703 constitutes the other side portion of the framework member 704 in the height direction Z.

As mentioned above, the framework member 704 bears the weight of the automobile and receives a load from the suspension. Therefore, preferably the first half portion 702 and the second half portion 703 are each formed of a steel sheet. In a case where the first half portion 702 and the second half portion 703 are each formed of a steel sheet, the first half portion 702 and the second half portion 703 are each formed in a sheet shape by subjecting a steel sheet to press working. The steel sheet is preferably a high-tensile strength steel sheet, and the tensile strength of the steel sheet is preferably 440 MPa or more. The steel sheet is more preferably an ultra-high tensile strength steel sheet, and the tensile strength in this case is preferably 590 MPa or more, and more preferably is 780 MPa or more.

The first half portion 702 forms a closed cross-section when viewed in the longitudinal direction X, by co-operation with the second half portion 703. Although in the present embodiment the closed cross-section is formed in a U-shape as viewed in the longitudinal direction X, the closed cross-section may also be formed in a shape such as a trapezoidal shape or a rectangular shape. Further, the closed cross-section may be formed across the whole of the framework member 704 in the longitudinal direction X as in the present embodiment, or may be formed in one part of the framework member 704 in the longitudinal direction X. According to this configuration, the framework member 704 is a hollow member.

The second main body 731 of the second half portion 703 is, for example, a flat-shaped portion, and extends along the width direction Y. The pair of second vertical walls 732 and 734 extend from the second main body 731. The second main body 731 continuous with the other end of one second vertical wall 732, and one third flange 733 is continuous with one end of the one second vertical wall 732. The second main body 731 is continuous with one end of the other second vertical wall 734, and the other third flange 735 is continuous with the other end of the other second vertical wall 734.

The pair of third flanges 733 and 735 are arranged opposing the pair of second flanges 723 and 725 in the height direction Z. One second flange 723 and one third flange 733 form one half-portion joint portion 775 by being joined to each other at a position which overlaps with the panel joint portion 772 in the height direction Z (thickness direction of the panel 701). That is, because the panel joint portion 772 and one half-portion joint portion 775 are formed at a place where the first flange 713, one second flange 723, and one third flange 733 are superimposed on each other, the panel joint portion 772 and the half-portion joint portion 775 are arranged overlapping each other in the thickness direction of the panel 701. Further, the other half-portion joint portion 776 is formed by the other second flange 725 and the other third flange 735 being joined to each other. In this way, the pair of half-portion joint portions 775 and 776 are provided in the framework member 704.

The joining method for each of the pair of half-portion joint portions 775 and 776 is the same as the joining method described above. One half-portion joint portion 775 has one first half-portion joint portion 761 that is formed in one second flange 723, and one second half-portion joint portion 762 that is formed in one third flange 733. The other half-portion joint portion 776 has the other first half-portion joint portion 763 that is formed in the other second flange 725, and the other second half-portion joint portion 764 that is formed in the other third flange 735.

The pair of second flanges 723 and 725 and the pair of third flanges 733 and 735 are firmly fixed by the pair of half-portion joint portions 775 and 776. The pair of half-portion joint portions 775 and 776 restrict relative movement (relative sliding) between the pair of second flanges 723 and 725 and the pair of third flanges 733 and 735 even when an exciting force is input to the framework member 704. Further, the second flanges 723 and 725 and the third flanges 733 and 735 do not substantially come in contact with each other in an area other than the half-portion joint portions 775 and 776 where the second flange 723 and the third flange 733, and the second flange 725 and the third flange 735 are joined, respectively. Therefore, since generation of frictional sliding at the joined flanges 723 and 733, and 725 and 735 is suppressed as much as possible while securing the rigidity by the flanges 723 and 733, and 725 and 735 being joined at the half-portion joint portions 775 and 776, respectively, structural hysteresis can be suppressed in the vehicle body framework (framework member 704) that contributes greatly to the vehicle body rigidity which influences the steering stability of the vehicle.

The vehicle body 800 including the joining structure 770 having the configuration described above receives an exciting force due to vibration from the engine, vibration from the suspension, and vibrations generated by pressure fluctuations in air at the vehicle surface. The exciting force propagates through the framework member 704 of the vehicle body 800, and is transmitted to the joining structure 770. In the joining structure 770, the panel-side contact portion 743 and the first contact portion 753 of the panel contact portion 773 slide against each other due to the exciting force, thereby attenuating the vibrations. That is, when the panel-side contact portion 743 slides with respect to the first contact portion 753, the aforementioned exciting force is consumed as thermal energy and attenuated. As a result, vibration sound (panel vibration sound) can be suppressed. By utilizing the vibration energy attenuation effect produced by friction between the sheets of the joined flanges 713 and 723 in this way, even in a case where the sheet thickness of the panel 701 and the framework member 704 is made thin, vehicle body vibrations can be suppressed and noise emitted by the automobile can also be suppressed.

Furthermore, according to the present embodiment, in the framework member 704, relative displacement between the pair of second flanges 723 and 725 and the pair of third flanges 733 and 735 is restricted by the pair of half-portion joint portions 775 and 776. By this means, even if the aforementioned exciting force acts on the framework member 704, relative displacement between the first half portion 702 and the second half portion 703 in the framework member 704 can be suppressed. Therefore, the rigidity of the framework member 704 can be further increased. As a result, the structural hysteresis of the vehicle body 800 (framework member 704) can be suppressed. Note that, the term "structural hysteresis" refers to a phenomenon that is often seen in mechanical structures that deform or displace under a cyclic load, and is a phenomenon in which loading and unloading plot different paths with respect to the relation between load and displacement. For example, when the automobile turns from a state in which it is travelling straight ahead, and then returns again to a state in which it is travelling straight ahead, if the difference with respect to the relation between the steering angle of the steering wheel and the behavior of the vehicle body 800 is small between the time of changing from travelling straight ahead→turning and the time of changing from turning→travelling straight ahead, it can be said that the structural hysteresis is small. By making the structural hysteresis small, the steering stability of the automobile and the sensory evaluation of the driver can be further enhanced. Thus, by increasing the bonding strength between these half portions 702 and 703 at the joint portions (half-portion joint portions 775 and 776) between the first half portion 702 and the second half portion 703 of the framework member 704, relative displacement caused by the aforementioned exciting force is suppressed to thereby suppress structural hysteresis, and on the other hand, by providing the panel contact portion 773 at a joint portion between the panel 701 and the framework member 704, vibrations of the vehicle body 800 can be attenuated at the panel contact portion 773. As a result, in the automobile, steering stability and sensory evaluation of the driver as well as quietness can be achieved in a compatible manner.

Further, in the present embodiment, the panel contact portion 773 is provided at one end of the curved portions 740 and 750. With this configuration, because the contact portions 745 and 755 are provided at one end of the curved portions 740 and 750 as places at which a contact force between the flanges 713 and 723 is particularly high, the amount of energy attenuation due to frictional sliding between the panel-side contact portion 743 and the first contact portion 753 can be increased.

The foregoing describes the schematic configuration of the vehicle body 800. Next, an example of a method for producing the vehicle body 800 will be described.

Figure 23A:
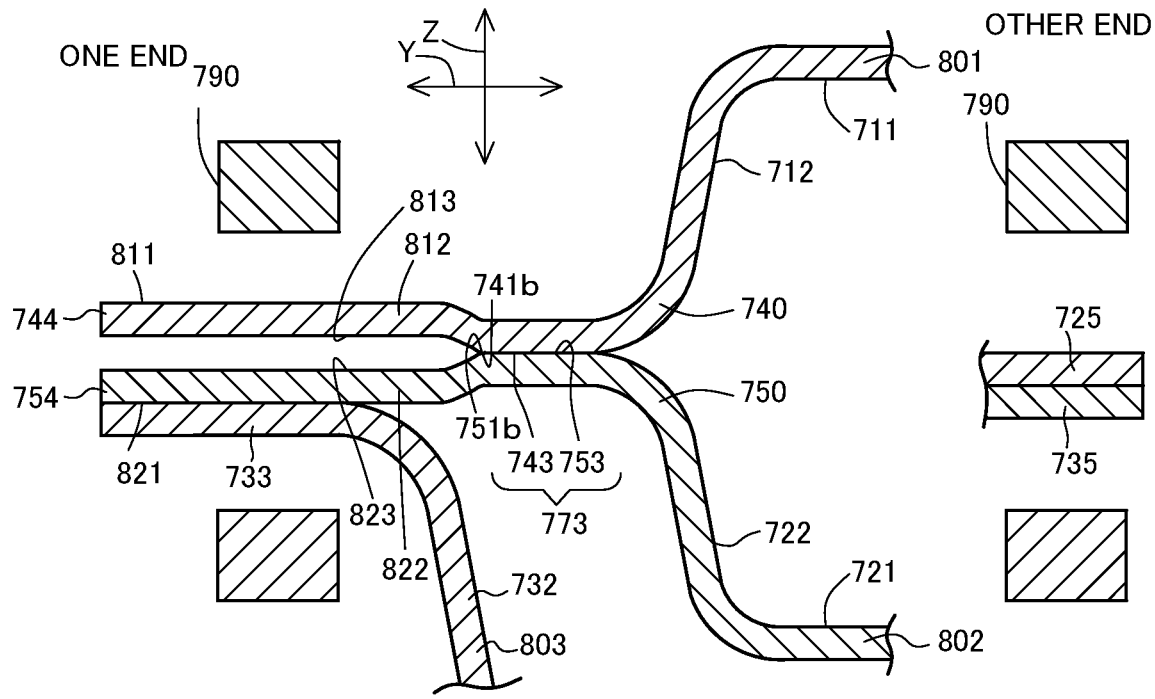
FIG. 23(A) and FIG. 23(B) are schematic cross-sectional diagrams for describing a process for joining a first flange of the vehicle body to a second flange in the third embodiment.
Figure 23B:
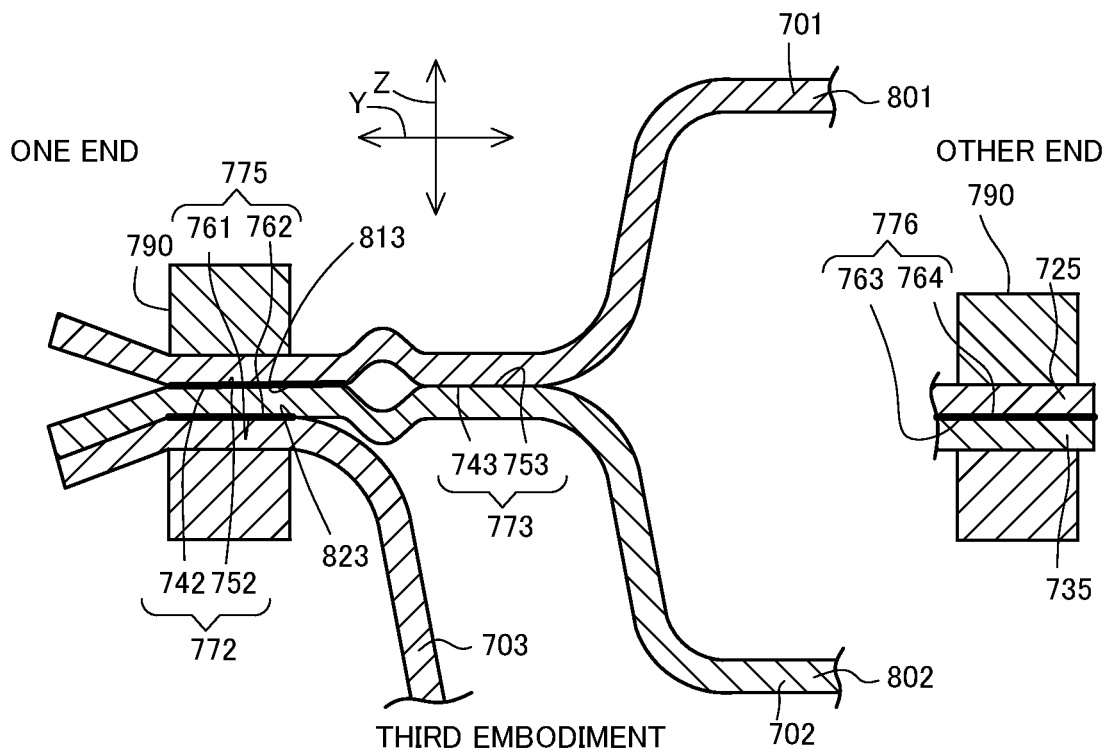

FIG. 23(A) and FIG. 23(B) are schematic cross-sectional diagrams for describing a process for joining the first flange 713 of the vehicle body 800 to the second flange 723 in the second embodiment. When joining the first flange 713 to the second flange 723, first, a first flange starting material 801, a second flange starting material 802, and a third flange starting material 803 that are illustrated in FIG. 23(A) are prepared. The first flange starting material 801 is the starting material of the first flange 713, the second flange starting material 802 is the starting material of the second flange 723, and the third flange starting material 803 is the starting material of the third flange 733.

The first flange starting material 801 is formed in approximately the same shape as the panel 701 except that a portion of the first flange 713 which is located on the one end side in the width direction Y from the intermediate portion of the panel-side gap forming portion 741 is formed in a flat shape. That is, the first flange starting material 801 has the panel main body 711, the panel vertical wall 712, and a first planned flange portion 811. The first planned flange portion 811 has the panel curved portion 740, the panel-side contact portion 743, the other end 741b of the panel-side gap forming portion 741, and a panel flat sheet portion 812 extending to the one end side in the width direction Y from the intermediate portion of the panel-side gap forming portion 741. A panel recess 813 is formed by the other end 741b of the panel-side gap forming portion 741 and the panel flat sheet portion 812. The panel recess 813 is a portion at which the first flange starting material 801 and the second flange starting material 802 are separated from each other when the first flange starting material 801 and the second flange starting material 802 are butted against each other.

Similarly, the second flange starting material 802 is formed in approximately the same shape as the first half portion 702 except that a portion of the second flange 723 which is located on the one end side in the width direction Y from the intermediate portion of the first gap forming portion 751 is formed in a flat shape. That is, the second flange starting material 802 has the first main body 721, the pair of first vertical walls 722 and 724 (the first vertical wall 724 is not illustrated in FIG. 23(A) and FIG. 23(B)), a second planned flange portion 821, and the other second flange 725. The second planned flange portion 821 has the first curved portion 750, the first contact portion 753, the other end 751b of the first gap forming portion 751, and a first flat sheet portion 822 extending to the one end side in the width direction Y from the intermediate portion of the first gap forming portion 751. A first recess 823 is formed by the other end 751b of the first gap forming portion 751 and the first flat sheet portion 822. The first recess 823 is a portion at which the first flange starting material 801 and the second flange starting material 802 are separated from each other when the panel-side contact portion 743 of the first flange starting material 801 and the first contact portion 753 of the second flange starting material 802 are butted against each other.

The third flange starting material 803 has the same shape as the third flange 733. That is, the third flange starting material 803 has the second main body 731, the pair of second vertical walls 732 and 734, and the pair of third flanges 733 and 735. Note that, illustration of the second main body 731 and the second vertical wall 734 is omitted from FIG. 23(A) and FIG. 23(B).

After preparing the first flange starting material 801, the second flange starting material 802, and the third flange starting material 803, the panel-side contact portion 743 of the first flange starting material 801 and the first contact portion 753 of the second flange starting material 802 are positioned to oppose each other. At such time, the flat sheet portions 812 and 822 are arranged in parallel with each other, or are arranged non-parallel to each other so that a clearance therebetween expands toward the side of the corresponding edge parts 744 and 754. In addition, the flat sheet portion 822 of the second flange starting material 802 and one third flange 733 of the third flange starting material 803 are positioned to oppose each other, and the other second flange 725 of the second flange starting material 802 and the third flange 735 of the third flange starting material 803 are positioned to oppose each other.

Subsequently, by abutting the first flange starting material 801 and the second flange starting material 802 against each other at the places where the recesses 813 and 823 are arranged, the recesses 813 and 823 are deformed, as illustrated in FIG. 23(B). Specifically, the clamp of a spot welding gun 790 sandwiches the first flange starting material 801, the second flange starting material 802, and the third flange starting material 803. That is, the spot welding gun 790 sandwiches the flange starting materials 801, 802, and 803 so that the places in the recesses 813 and 823 that are to serve as the panel joint portion 772 contact each other. By this means, the portions of the flange starting materials 801 and 802 which become the panel joint portion 772 are abutted, and by joining the abutted portions by spot welding or the like, the panel joint portion 772 and the half-portion joint portion 775 are formed. At such time, at the panel contact portion 773 which is at a position that is separated from the panel joint portion 772, as a result of deformation of the flat sheet portions 812 and 822, the panel-side contact portion 743 and the first contact portion 753 are slidably pressed against each other.

In this way, the flange starting materials 801 and 802 are formed so that clearances (recesses 813 and 823) can be formed in the vicinity of portions which become the panel joint portion 772 prior to spot welding, and joining is performed while forcibly causing the flange starting materials 801 and 802 to come in contact with each other while sandwiching the flange starting materials 801 and 802 using the spot welding gun 790. By this means, the panel-side contact portion 743 and the first contact portion 753 firmly come in contact at the panel contact portion 773 which is a place other than the panel joint portion 772.

By the above process, the first flange 713 is formed and the second flange 723 is formed, and furthermore, the first flange 713 and the second flange 723 are joined to each other at the panel joint portion 772. Further, the second and third flanges 723 and 733 are joined to each other at the half-portion joint portion 775, and the flanges 725 and 735 are joined to each other at the half-portion joint portion 776. Note that, either one of the recess 813 of the flange starting material 801 and the recess 823 of the flange starting material 802 need not be provided. The planned flange portion of the flange starting material in which a recess is not provided is formed in a flat shape.

As described above, according to the present embodiment, by the simple operation of performing joining while sandwiching the recesses 813 and 823 with the clamp of the spot welding gun 790, the panel joint portion 772 and the panel contact portion 773 which is capable of attenuating vibration energy can be formed.

Further, in the present embodiment, because the panel joint portion 772 and the half-portion joint portion 775 are formed at a place where the first flange 713, the second flange 723 and the third flange 733 are superimposed on one another, the panel joint portion 772 and the half-portion joint portion 775 are arranged overlapping each other in the thickness direction of the panel 701. According to this configuration, the panel recess 813 of the first flange starting material 801, the first recess 823 of the second flange starting material 802, and the third flange 733 of the third flange starting material 803 can be superimposed on one another and sandwiched with the spot welding gun 790. Hence, a joining operation to join the first flange 713 and the second flange 723, and a joining operation to join the second flange 723 and the third flange 733 can be performed together at one time.

Note that, although a form in which the panel contact portion 773 is provided at one end of the curved portions 740 and 750 has been described as an example in the above embodiment, the form in which the panel contact portion 773 is provided may be different from the above example. Hereinafter, structures which are different from the foregoing embodiment will be mainly described, and structures which are the like in the foregoing embodiment are denoted by the like reference numerals in the drawings and a detailed description thereof may be omitted.

Figure 24A:
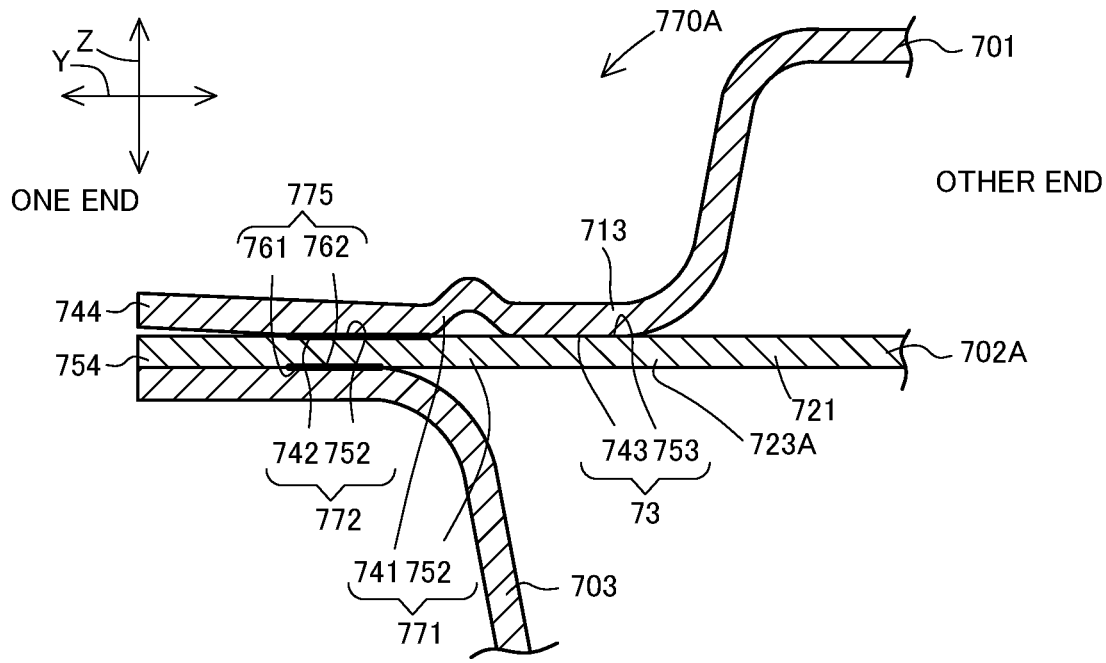
FIG. 24(A) is a view illustrating a first modification of the third embodiment, and shows a cross section as viewed from the longitudinal direction.

FIG. 24(A) is a view illustrating a first modification of the third embodiment, and shows a cross section as viewed from the longitudinal direction X. Although the foregoing second embodiment was described by taking a configuration in which a curved portion (second curved portion 752) is formed in the first half portion 702 as an example, a different configuration may also be adopted. As illustrated in FIG. 24(A), a first half portion 702A in which a curved portion is not provided may be provided instead of the first half portion 702. A second flange 723A of the first half portion 702A is formed, for example, in a flat shape. Further, in the aforementioned second embodiment a second clearance forming portion 752 of the second flange 723 is formed in a U-shape as viewed from the longitudinal direction X. On the other hand, in a joining structure 770A of the first modification, a second gap forming portion 752 of the second flange 723A of the first half portion 702A is formed in a flat shape that extends straight along the width direction Y.

Figure 24B:
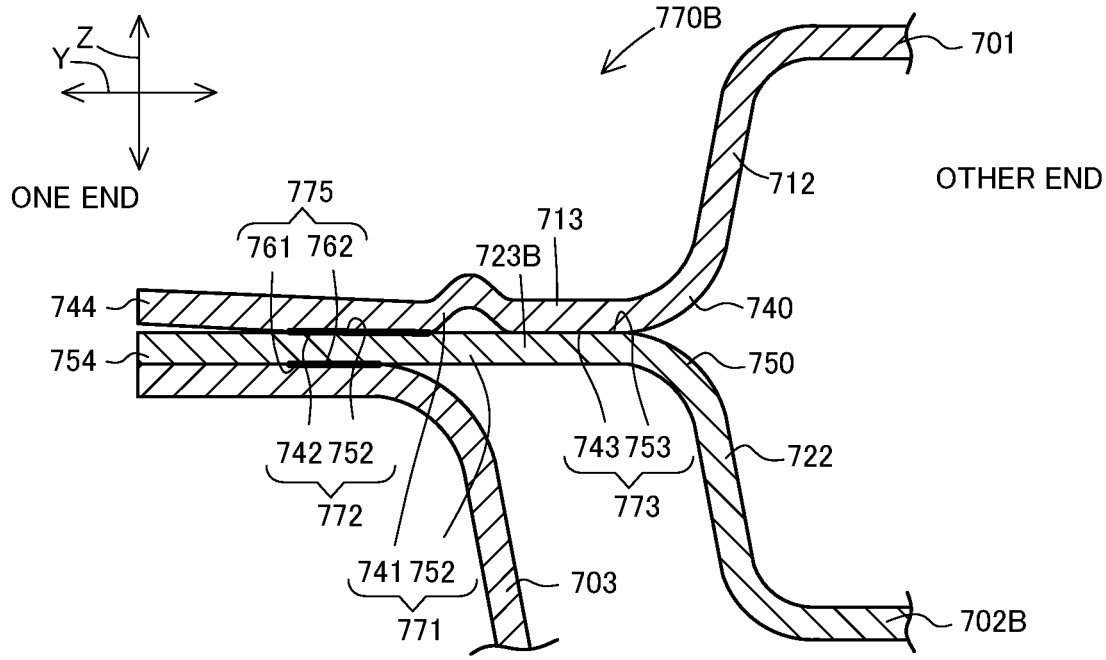
FIG. 24(B) is a view illustrating a second modification of the third embodiment, and shows a cross section as viewed from the longitudinal direction.

FIG. 24(B) is a view illustrating a second modification of the third embodiment, and shows a cross section as viewed from the longitudinal direction X. In the aforementioned first modification, a curved portion is not provided in the second flange 723A. In contrast, in a joining structure 770B of the present second modification, the first curved portion 750 and the first vertical wall 722 are provided in a second flange 723B.

Figure 25A:
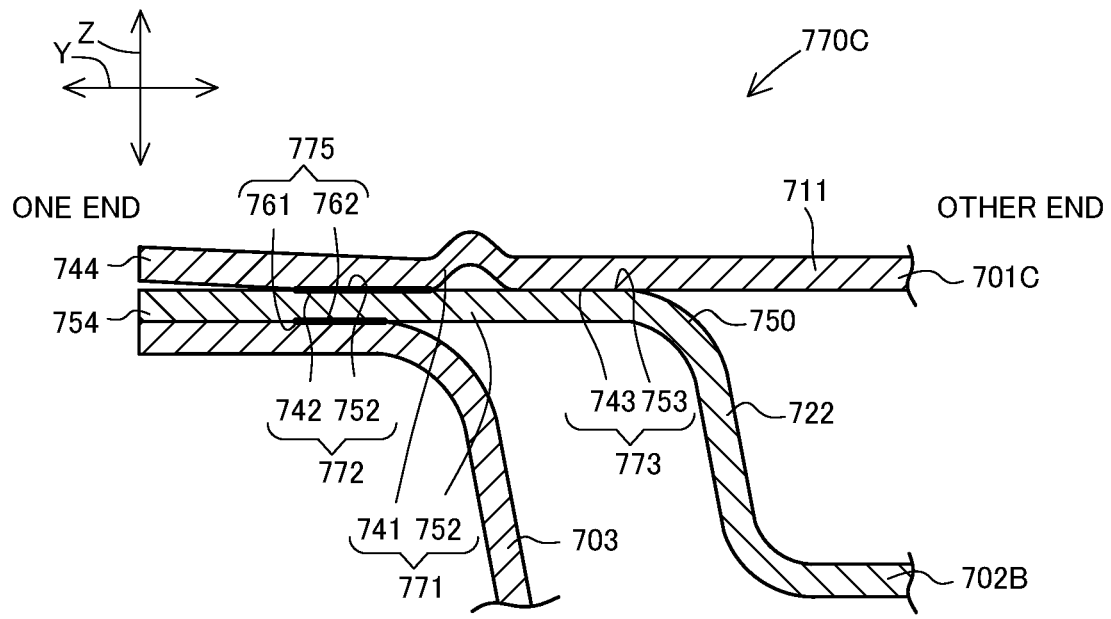
FIG. 25(A) is a view illustrating a third modification of the third embodiment, and shows a cross section as viewed from the longitudinal direction.

FIG. 25(A) is a view illustrating a third modification of the third embodiment, and shows a cross section as viewed from the longitudinal direction X. Although in the second modification a form in which the panel curved portion 740 and the panel vertical wall 712 are provided in the panel 701 is described as an example, a different configuration may also be adopted. As illustrated in FIG. 25(A), a panel 701C in which a curved portion and a vertical wall are not provided may be provided instead of the panel 701. In this joining structure 770C, the panel main body 711 of the panel 701C is directly continuous with the panel-side contact portion 743.

Figure 25B:
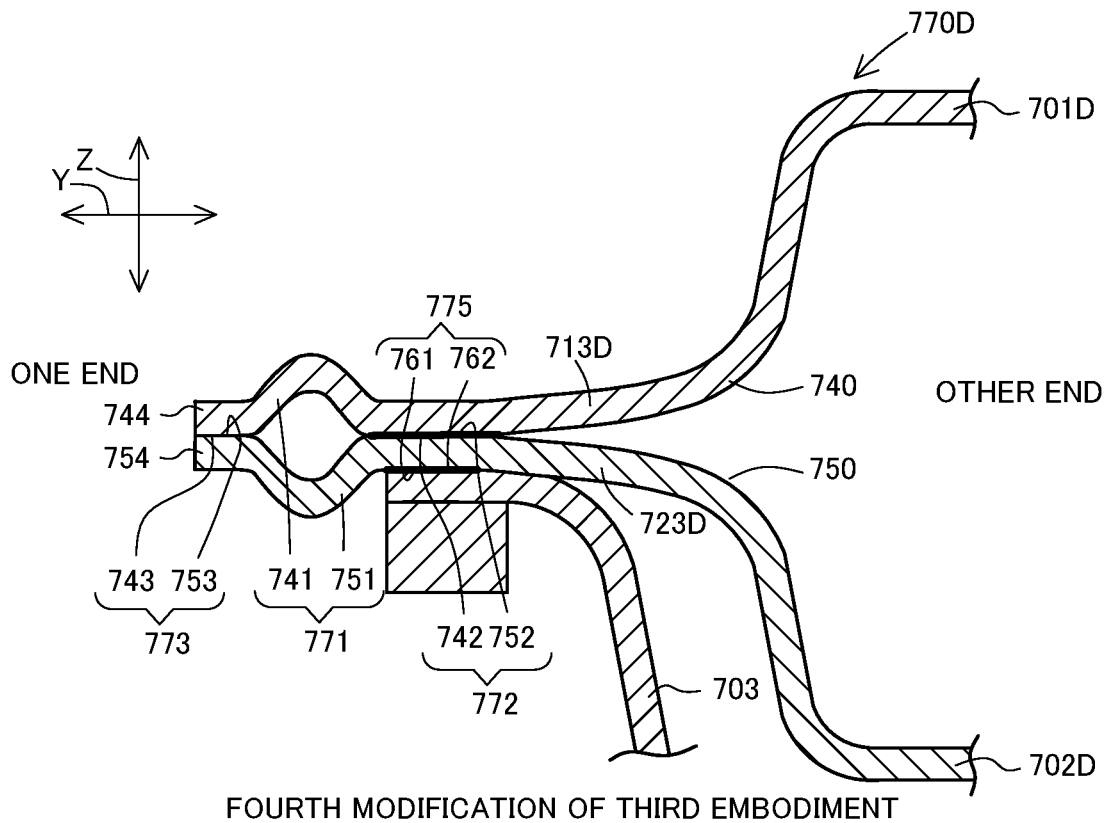
FIG. 25(B) is a view illustrating a fourth modification of the third embodiment, and shows a cross section as viewed from the longitudinal direction.

FIG. 25(B) is a view illustrating a fourth modification of the third embodiment, and shows a cross section as viewed from the longitudinal direction X. In the embodiment described above, the curved portions 740 and 750, the panel contact portion 773, the panel gap forming portion 771, and the panel joint portion 772 are arranged in that order from the other end to the one end along the width direction Y. However, a different configuration may also be adopted. In a joining structure 770D of the fourth modification illustrated in FIG. 25(B), the curved portions 740 and 750, the panel joint portion 772, the panel gap forming portion 771, and the panel contact portion 773 are arranged in that order from the other end to the one end along the width direction Y. In this fourth modification, the panel contact portion 773 is arranged at the edge parts 744 and 754 of flanges 713D and 723D. The length of the panel contact portion 773 in the width direction Y is appropriately set according to the pressure for the target frictional resistance force between the panel-side contact portion 743 and the first contact portion 753 and the like. Further, the panel joint portion 772 is arranged between the panel contact portion 773 and the curved portions 740 and 750.

The above is the schematic configuration of the fourth modification of the third embodiment. Next, an example of a method for producing the fourth modification will be described.

Figure 26A:
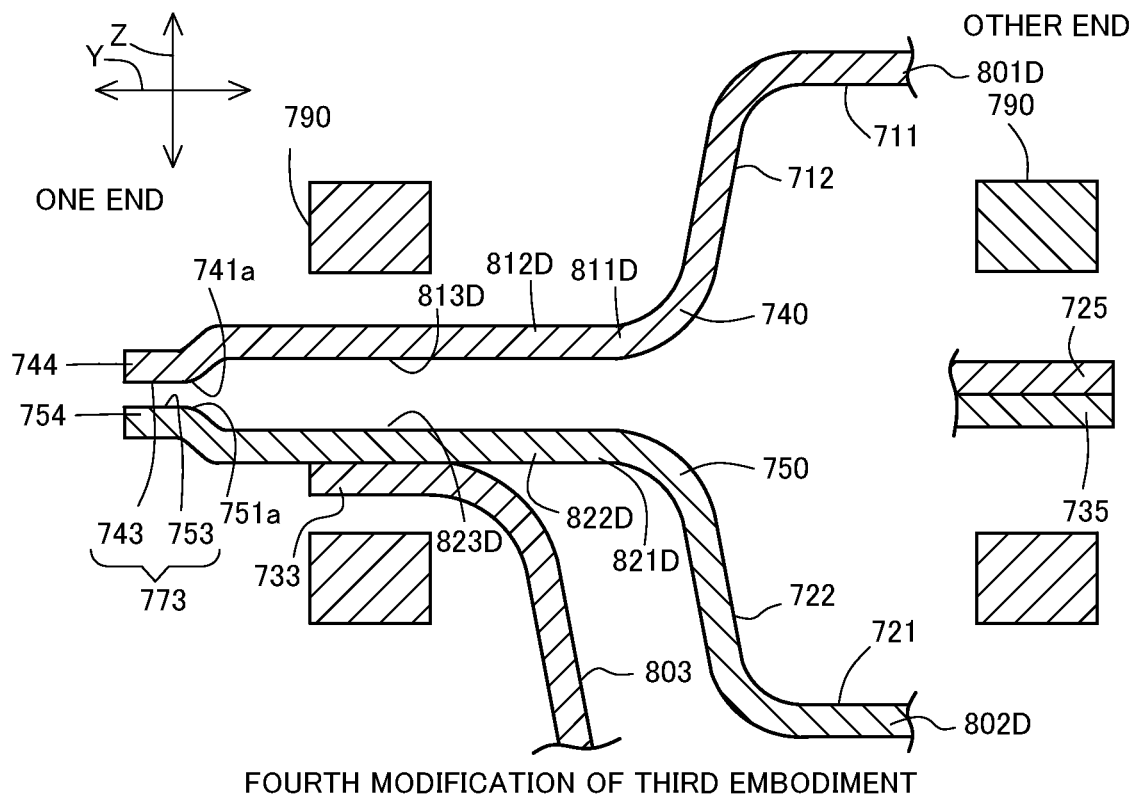
FIG. 26(A) and FIG. 26(B) are schematic cross-sectional diagrams for describing a process for joining a first flange to a second flange in the fourth modification of the third embodiment.
Figure 26B:
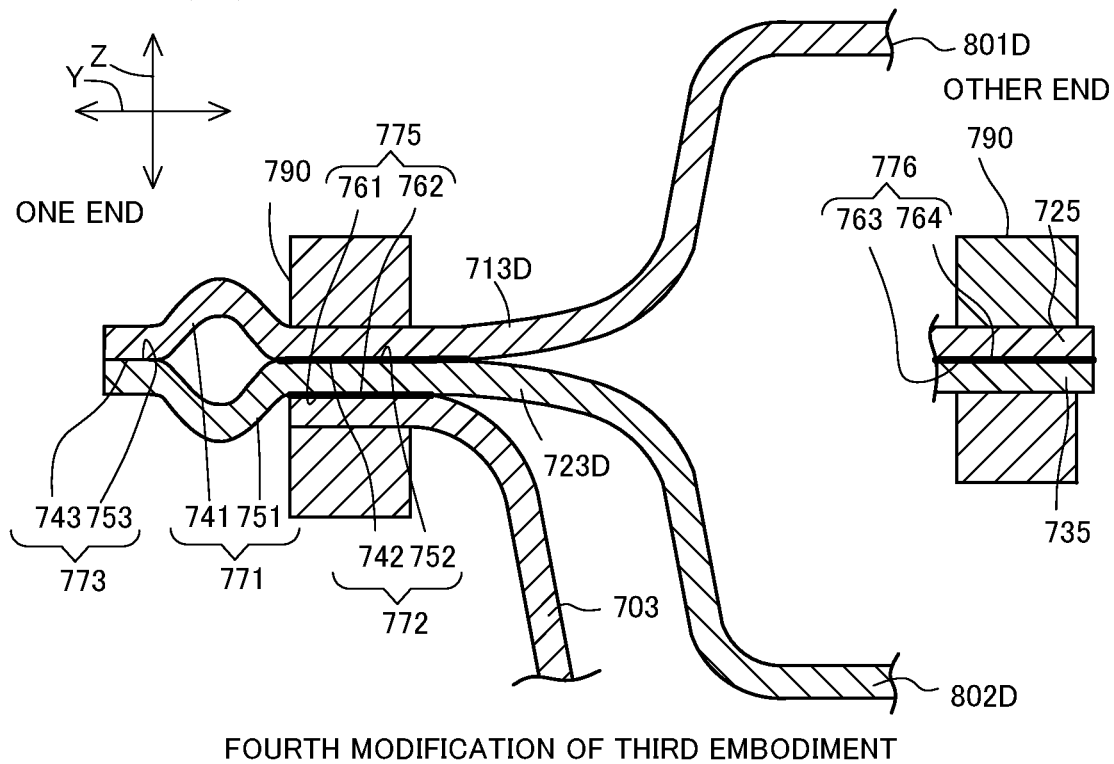

FIG. 26(A) and FIG. 26(B) are schematic cross-sectional diagrams for describing a process for joining a first flange 713D to the second flange 723D. When joining the first flange 713D to the second flange 723D, first, a first flange starting material 801D, a second flange starting material 802D, and the third flange starting material 803 that are illustrated in FIG. 26(A) are prepared.

The first flange starting material 801D is the starting material of the first flange 713D, and the second flange starting material 802D is the starting material of the second flange 723D. The first flange starting material 801D is formed in the same shape as a panel 701D except that a portion of the first flange 713D from the intermediate portion of the panel-side gap forming portion 741 to the panel curved portion 740 is formed in a flat shape. That is, the first flange starting material 801D has the panel main body 711, the panel vertical wall 712, and a first planned flange portion 811D. The first planned flange portion 811D has the one end 741a of the panel-side gap forming portion 741, the panel-side contact portion 743 formed at the one end 741a (panel edge part 744), a panel flat sheet portion 812D extending to the other end side in the width direction Y from the intermediate portion of the panel-side gap forming portion 741, and the panel curved portion 740. A panel recess 813D is formed by the one end 741a of the panel-side gap forming portion 741 and the panel flat sheet portion 812D. The panel recess 813D is a portion at which the first flange starting material 801D and the second flange starting material 802D are separated from each other when the first flange starting material 801D and the second flange starting material 802D are butted against each other.

Similarly, the second flange starting material 802D has the same shape as a first half portion 702D except that a portion of the second flange 723D from the intermediate portion of the first gap forming portion 751 to the first curved portion 750 is formed in a flat shape. That is, the second flange starting material 802D has the first main body 721, the pair of first vertical walls 722 and 724, a second planned flange portion 821D, and the other second flange 725 (illustration of the first vertical wall 724 is omitted from FIG. 26(A) and FIG. 26(B)). The second planned flange portion 821D has the one end 751*a* of the first gap forming portion 751, the first contact portion 753 formed at the one end 751*a* (second edge part 754), a first flat sheet portion 822D extending to the other end side in the width direction Y from the intermediate portion of the first gap forming portion 751, and the first curved portion 750. A first recess 823D is formed by the one end 751*a* of the first gap forming portion 751 and the first flat sheet portion 822D. The first recess 823D is a portion at which the first flange starting material 801D and the second flange starting material 802D are separated from each other when the first flange starting material 801D and the second flange starting material 802D are butted against each other.

After preparing the first flange starting material 801D, the second flange starting material 802D, and the third flange starting material 803, the panel-side contact portion 743 of the first flange starting material 801D and the first contact portion 753 of the second flange starting material 802D are positioned to oppose each other. At such time, the flat sheet portions 812D and 822D are arranged in parallel with each other, or are arranged non-parallel to each other so that a clearance therebetween narrows toward the side of the corresponding edge parts 744 and 754, or are arranged in a state such that a curved portion is formed in the vicinity of the edge parts 744 and 754. In addition, the flat sheet portion 822D of the second flange starting material 802D and one third flange 733 of the third flange starting material 803 are positioned to oppose each other, and the other second flange 725 of the second flange starting material 802D and the third flange 735 of the third flange starting material 803 are positioned to oppose each other.

Subsequently, by abutting the first flange starting material 801D and the second flange starting material 802D against each other at the places where the recesses 813D and 823D are arranged, the recesses 813D and 823D are deformed, as illustrated in FIG. 26(B). Specifically, the clamp of the spot welding gun 790 sandwiches the flange starting materials 801D, 802D, and 803 so as to contact each other at the places that are to serve as the panel joint portion 772. By this means, the portions of the flange starting materials 801D and 802D which become the panel joint portion 772 are abutted, and by subjecting the abutted portions to spot welding, the panel joint portion 772 and one half-portion joint portion 775 are formed. At this time, at the panel contact portion 773 which is at a position that is separated from the panel joint portion 772, the first flange starting material 801D and the second flange starting material 802D are slidably pressed against each other.

In this way, the flange starting materials 801D and 802D are formed so that clearances (clearances of the recesses 813D and 823D) can be formed in the vicinity of portions which become the panel joint portion 772 prior to spot welding, and joining is performed while forcibly causing the flange starting materials 801D and 802D to come in contact with each other while sandwiching the flange starting materials 801D and 802D using the spot welding gun 790. By this means, the panel-side contact portion 743 and the first contact portion 753 firmly come in contact at a place that is other than the panel joint portion 772.

By the above process, the first flange 713D is formed and the second flange 723D is formed, and furthermore, the first flange 713D and the second flange 723D are joined to each other at the panel joint portion 772. Further, the second and third flanges 725 and 735 are joined to each other at the half-portion joint portions 775 and 776. Note that, either one of the recess 813D of the flange starting material 801D and the recess 823D of the flange starting material 802D need not be provided. The planned flange portion of the flange starting material in which a recess is not provided is formed in a flat shape.

Figure 27A:
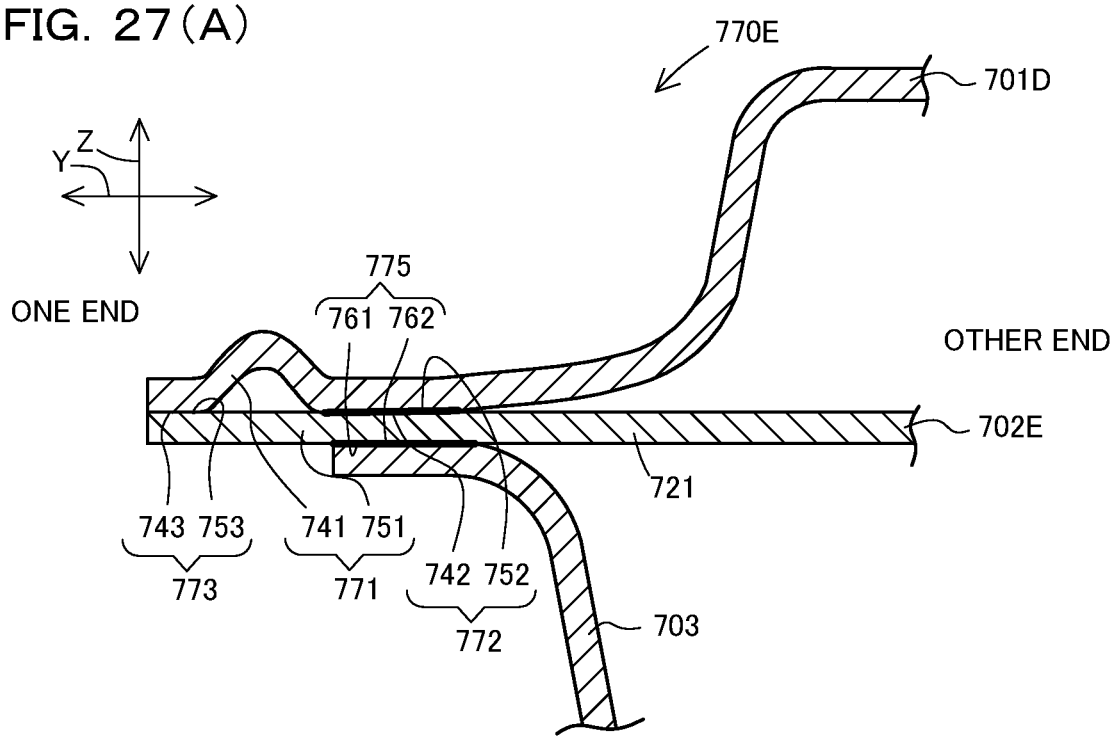
FIG. 27(A) is a view illustrating a fifth modification of the third embodiment, and shows a cross section as viewed from the longitudinal direction.

FIG. 27(A) is a view illustrating a fifth modification of the third embodiment, and shows a cross section as viewed from the longitudinal direction X. Although the foregoing fourth modification was described by taking a configuration in which a curved portion (first curved portion 750) is formed in the first half portion 702D as an example, a different configuration may also be adopted. As illustrated in FIG. 27(A), a first half portion 702E having a flat shape in which a curved portion is not provided may be provided in a joining structure 770E, instead of the first half portion 702D.

Figure 27B:
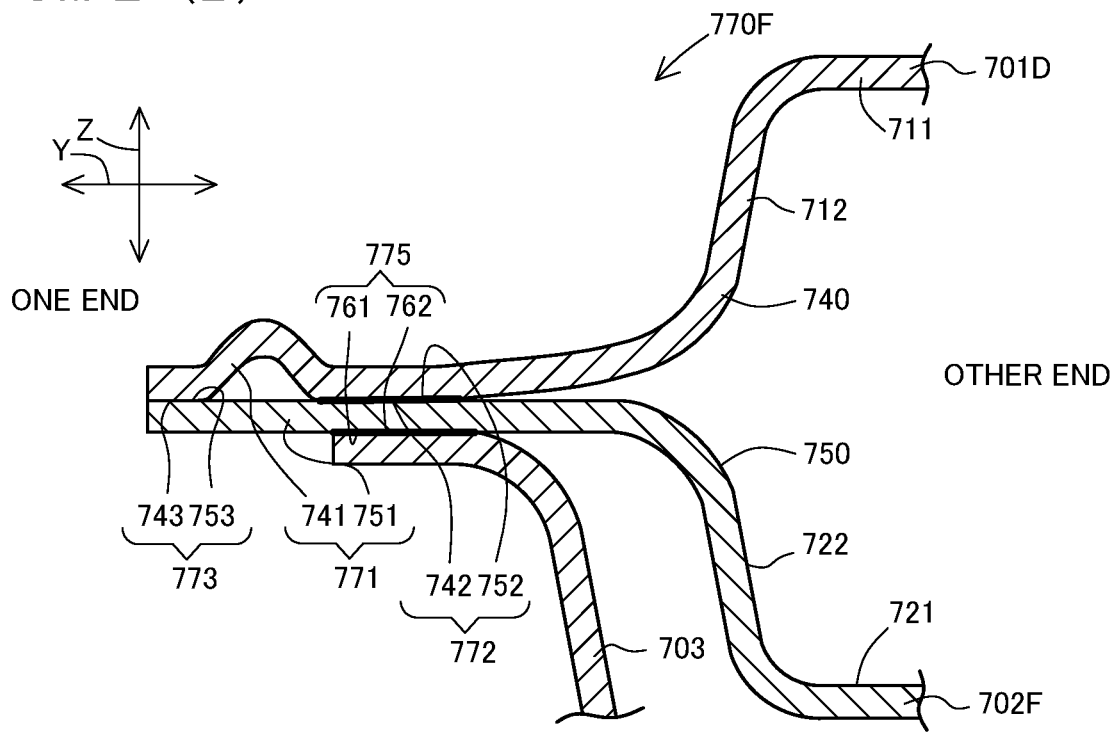
FIG. 27(B) is a view illustrating a sixth modification of the third embodiment, and shows a cross section as viewed from the longitudinal direction.

FIG. 27(B) is a view illustrating a sixth modification of the third embodiment, and shows a cross section as viewed from the longitudinal direction X. In the foregoing fifth modification, the first half portion 702E is a flat member in which a curved portion and a vertical wall are not formed. On the other hand, in a first half portion 702F of a joining structure 770F of the sixth modification, the first curved portion 750 and the first vertical wall 722 are provided.

Figure 28:
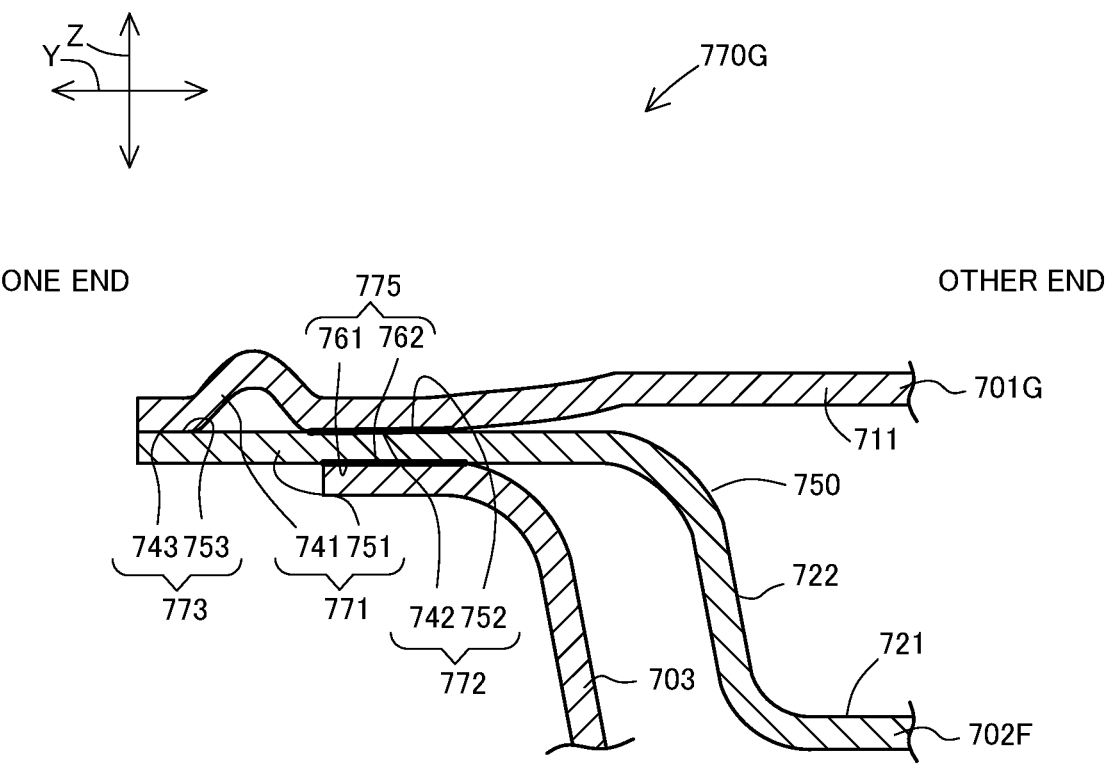
FIG. 28 is a view illustrating a seventh modification of the third embodiment, and shows a cross section as viewed from the longitudinal direction.

FIG. 28 is a view illustrating a seventh modification of the third embodiment, and shows a cross section as viewed from the longitudinal direction X. In the foregoing sixth modification, the panel 701D has the panel curved portion 740 and the panel vertical wall 712. On the other hand, a curved portion and a vertical wall are not provided in a panel 701G of a joining structure 770G of the seventh modification. In the panel 701G, on the other end side of the panel-side joint portion 742, an inclined portion that rises slightly to one side in the height direction Z as it advances toward the other end side along the width direction Y is formed, and the panel main body 711 is continuous with the other end of the inclined portion.

FIG. 29 is a view illustrating an eighth modification of the third embodiment, and shows a cross section as viewed from the width direction Y. FIG. 30 is a schematic perspective view for describing a process for joining a first flange 713H to a second flange 723H. Referring to FIG. 29 and FIG. 30, in the eighth modification of the third embodiment, a joining structure 770H is provided instead of the joining structure 770. The joining structure 770H is formed by providing a plurality of embossed-shape portions having shapes that are symmetrical with each other in the first flange 713H and the second flange 723H, and narrowing the clearances between the embossed-shape portions to join the flanges 713H and 723H. Note that, a panel 701H, a first half portion 702H and a second half portion 703H illustrated in FIG. 29, and a first flange starting material 801H, a second flange starting material 802H, and a third flange starting material 803H illustrated in FIG. 30 have a similar shape to each other, respectively, except for the structure on the first flange 713H side (structure on the left side in FIG. 30).

A vehicle body 800H has the panel 701H and a framework member 704H.

The panel 701H has the panel main body 711, the panel vertical wall 712, and the first flange 713H.

The framework member 704H has the first half portion 702H, and the second half portion 703H which is combined with the first half portion 702H.

In the present modification, the first half portion 702H has a hat-shaped cross section, and includes the first main body 721, the pair of first vertical walls 722 and 724, and a pair of second flanges 723H and 725.

In the present embodiment, the second half portion 703H has a hat-shaped cross section, and includes the second main body 731, the pair of second vertical walls 732 and 734, and a pair of third flanges 733H and 735.

The joining structure 770H has: the first flange 713H; the second flange 723H; the panel joint portion 772 which is formed by the flanges 713H and 723H; a pair of panel gap forming portions 771 and 771 which are formed by the first flange 713H and the second flange 723H and which are arranged so as to sandwich the panel joint portion 772 in the longitudinal direction X; the panel contact portion 773 which is formed by the first flange 713H and the second flange 723H; the third flange 733H, and one half-portion joint portion 775 which is formed by the second flange 23H and the third flange 33H.

The first flange 713H, the second flange 723H, and the third flange 733H extend with the longitudinal direction X as the longitudinal direction thereof, and are arranged opposing each other in the height direction Z. In this eighth modification, in the longitudinal direction X, the panel contact portion 773 is arranged between two of the panel joint portions 772 and 772. Further, the panel contact portion 773 is also arranged at the ends in the longitudinal direction X. The panel vertical wall 712 is continuous with an end of the first flange 713H in the width direction Y. Similarly, one first vertical wall 722 is continuous with an end of the second flange 723H in the width direction Y.

In the present embodiment, from the other end side to the one end side in the longitudinal direction X, the panel contact portion 773, one of the panel gap forming portions 771, the panel joint portion 772, and the other of the panel gap forming portions 771 are taken as one set, and a plurality of these sets are provided. According to this configuration, the panel contact portion 773 is arranged between two panel joint portions 772 and 772.

The first flange 713H has the panel-side contact portion 743, a pair of panel-side gap forming portions 741 and 41, and the panel-side joint portion 742 which is arranged between the panel-side gap forming portions 741 and 741.

The second flange 723H has the first contact portion 753, a pair of first gap forming portions 751 and 751, and the first joint portion 752 which is arranged between the first gap forming portions 751 and 751.

The panel joint portion 772 is formed by the first flange 713H and the second flange 723H being joined to each other in a state in which at least one of these flanges 713H and 723H is collapsed to the side of the other of these flanges 713H and 723H. In the present embodiment, the panel joint portion 772 is formed by the first flange 713H and the second flange 723H being joined to each other in a state in which the first flange 713H is collapsed to the second flange 723H side and the second flange 723H is collapsed to the first flange 713H side.

Similarly to the configuration of the embodiment, the panel-side contact portion 743 is pushed to the second flange 723H side as a result of the panel-side gap forming portion 741 being formed by deformation of the starting material. Further, the first contact portion 753 is pushed to the second flange 723H side as a result of the first gap forming portion 751 being formed by deformation of the starting material. According to this configuration, by rubbing against the first contact portion 753, the panel-side contact portion 743 converts vibration energy to thermal energy to thereby attenuate the vibration energy.

The third flange 732H has a third flange flat portion 736, and a third flange protrusion 737 which protrudes from the third flange flat portion 736 to the opposite side (lower side in FIG. 29) to the second flange 723H side.

The third flange flat portion 736 and the third flange protrusion 737 are alternately arranged in the longitudinal direction X. The third flange protrusion 737 is arranged to be separated from the second flange 723H in the height direction Z. The third flange protrusion 737 is formed in a hat shape as viewed in the width direction Y. The third flange flat portion 736 is provided at the base end of the third flange protrusion 737.

The third flange flat portion 736 extends in a flat manner along the longitudinal direction X, and has the second half-portion joint portion 762. The second half-portion joint portion 762 is arranged overlapping the first joint portion 752 of the second flange 723H in the thickness direction of the panel 701H. Further, the first half-portion joint portion 761 is provided at a place (first joint portion 752) that opposes the second half-portion joint portion 762 in the second flange 723H. In the longitudinal direction X, the second half-portion joint portion 762 in arranged between a pair of the panel gap forming portions 771.

According to the configuration described above, the second flange 723H and the third flange 733H are separated from each other at a position which is between two half-portion joint portions 775 and 775 that are adjacent to each other in the longitudinal direction X. By this means, a half-portion gap 778 is formed as a gap between the second flange 723H and the third flange 733H.

Next, one example of a method for joining the flanges 713H, 723H, and 733H (method for producing the vehicle body 800H) will be described.

FIG. 31(A) and FIG. 31(B) are schematic cross-sectional diagrams for describing a process for joining the first flange 713H to the second flange 723H in the eighth modification of the third embodiment. When joining the first flange 713H to the second flange 723H, first, the first flange starting material 801H, the second flange starting material 802H, and the third flange starting material 803H that are illustrated in FIG. 30 and FIG. 31(A) are prepared. The first flange starting material 801H is the starting material of the first flange 713H, the second flange starting material 802H is the starting material of the second flange 723H, the third flange starting material 803H is the starting material of the third flange 733H and the third flange starting material 803H is the starting material of the third flange 733H.

More specifically, the first flange starting material 801H is formed in the same shape as the panel 701H except that the portions at which the pair of panel-side gap forming portions 741 and 741 and the panel-side joint portion 742 of the first flange 713H are to be formed are recessed with respect to the panel-side contact portion 743 as a whole. That is, the first flange starting material 801H has the panel-side contact portion 743 and a panel recess 813H. The panel-side contact portion 743 and the panel recess 813H are alternately arranged in the longitudinal direction X. The panel recess 813H becomes a portion where the first flange starting material 801H and the second flange starting material 802H are separated from each other when the first flange starting material 801H and the second flange starting material 802H are butted against each other.

Similarly, the second flange starting material 802H is formed in the same shape as the first half portion 702H except that the portions at which the pair of first gap forming portions 751 and 751 and the first joint portion 752 of the second flange 723H are to be formed are recessed with respect to the first contact portion 753 as a whole. That is, the second flange starting material 802H has the first contact portion 753 and a first recess 823H. The first contact portion 753 and the first recess 823H are alternately arranged in the longitudinal direction X. The first recess 823H becomes a portion where the first flange starting material 801H and the second flange starting material 802H are separated from each other when the first flange starting material 801H and the second flange starting material 802H are butted against each other.

The third flange starting material 803H has a similar shape to the third flange 733H except that the second half-portion joint portions 762 and 764 are separated from the first half-portion joint portions 761 and 763.

After preparing the first flange starting material 801H, the second flange starting material 802H, and the third flange starting material 803H, these flange starting materials 801H, 802H and 803H are aligned in the height direction Z.

Subsequently, the first flange starting material 801H and the second flange starting material 802H are abutted against each other at the places where the recesses 813H and 823H are arranged. By this means, the recesses 813H and 823H are deformed, as illustrated in FIG. 31(B). Specifically, the clamp of the spot welding gun 790 sandwiches the first flange starting material 801H, the second flange starting material 802H, and the third flange starting material 803H. At such time, the clamp sandwiches the flange starting materials 801H and 802H so that, the places in the recesses 813H and 823H that are to serve as the panel joint portion 772 contact each other. By this means, the portions of the flange starting materials 801H and 802H which become the panel joint portion 772 are abutted, and by joining the abutted portions by spot welding or the like, the panel joint portion 772 and the half-portion joint portion 775 are formed. At such time, at the panel contact portion 773 which is at a position that is separated from the panel joint portion 772, the first flange starting material 801H and the second flange starting material 802H are slidably pressed against each other.

In this way, the flange starting materials 801H and 802H are formed so that clearances (recesses 813H and 823H) can be formed in the portions which become the panel joint portion 772 prior to spot welding, and joining is performed while forcibly causing the flange starting materials 801H and 802H to come in contact with each other while sandwiching the flange starting materials 801H and 802H using the spot welding gun 790. By this means, the panel-side contact portion 743 and the first contact portion 753 firmly come in contact at a place (panel contact portion 773) other than the panel joint portion 772.

By the above process, the first flange 713H is formed and the second flange 723H is formed, and furthermore, these flanges 713H and 723H are joined to each other at the panel joint portion 772. In addition, the second and third flanges 723H and 733H as one set are joined to each other at the half-portion joint portion 775, and the second and third flanges 725 and 735 as another set are joined to each other at the other half-portion joint portion 776.

Note that, in the above eighth modification, the panel joint portion 772 may be formed over the entire area in the width direction Y, or the panel joint portion 772 may be formed only at one part in the width direction Y. In a case where the panel joint portion 772 is formed at one part of the flanges 713H and 723H in the longitudinal direction X, when joining the first flange starting material 801H and the second flange starting material 802H using the spot welding gun 790, only a part of each of the recesses 813H and 823H in the longitudinal direction X is deformed and joined.

Thus, according to the eighth modification of the third embodiment, between the two half-portion joint portions 775 and 775, the half-portion gap 778 is formed between the second flange 723H and the third flange 733H. According to this configuration, at the half-portion joint portion 775 which joins the first half portion 702H and the second half portion 703H, the second flange 723H and the third flange 733H can be joined in a state in which the first half-portion joint portion 761 and the second half-portion joint portion 762 are caused to more firmly contact with each other.

Note that, two or more types of structures of the above embodiments and modifications may be combined.

Further, in the above embodiments and modifications, a case where the present invention is applied to the vehicle body of an automobile is described as an example. However, the present invention is not limited to this example. The present invention may also be applied to the vehicle body of another vehicle, such as the vehicle body of a railroad vehicle.

Note that, two or more types of structures of the above embodiments and modifications may be combined.

Further, in the above embodiments and modifications, a case where the present invention is applied to the vehicle body of an automobile is described as an example. However, the present invention is not limited to this example. The present invention may also be applied to a structure other than an automobile, such as a railroad vehicle and an exterior member of a building or the like.

INDUSTRIAL APPLICABILITY

The present invention can be widely applied as a joining structure, a method for producing a joining structure, and a vehicle body.

REFERENCE SIGNS LIST 13, 13D, 13H, 513, 513A, 513E, 713, 713D, 713H First Flange
23, 23A, 23B, 23D, 23H, 523, 523A, 523E, 723, 723B, 723D, 723H Second Flange
30, 30A, 30B, 30C, 30D, 30E, 30F, 30G, 30H, 570, 770, 770A, 770B, 770C, 770D,
770E, 770F, 770G, 770H Joining Structure
32, 572, 772 Joint Portion
33, 573, 773 Contact Portion
34, 574, 774 Gap
41, 540, 740 First Curved Portion (Curved Portion)
43, 544, 744 First Edge Part (Edge Part of First Flange)
61, 61D, 61H, 601, 601A, 601E, 801, 801D, 801H First Flange Starting Material
62, 62D, 62H, 602, 602A, 602E, 802, 802D, 802H Second Flange Starting Material
73, 73D, 73H, 613, 813, 813D, 813H First Recess (Recess)
83, 83D, 83H, 823, 823D, 823H Second Recess (Recess)
502, 502A, 502C, 502E, 702, 702A, 702B, 702D, 702E, 702F, 702H First Half Portion
503, 503A, 503B, 503D, 503E, 703, 703H Second Half Portion
533, 533D, 533E, 533F, 733, 733H Third Flange
575, 775 Half-Portion Joint Portion
778 Half-Portion Gap

The invention claimed is:
1. A joining structure, comprising:
a first flange,
a second flange arranged opposing the first flange;
a joint portion formed by the first flange and the second flange being joined to each other in a state in which at least one of the first flange and the second flange is stamped to a side of the other of the first flange and the second flange; and a contact portion where the first flange and the second flange contact each other at a position that is separated from the joint portion;

wherein:

each of the first flange and the second flange extends in a predetermined longitudinal direction, and when viewed in cross section in the longitudinal direction, free ends of the first flange and the second flange are made on an one end side from the joint portion, the first flange and/or the second flange continues to have a hat-shaped cross-sectional structure on the other end side from the joint portion and, at a position between the joint portion and the contact portion, the first flange and the second flange are separated from each other and a gap is formed between the first flange and the second flange.

2. The joining structure according to claim 1, wherein:
the first flange includes a curved portion which extends so that a distance from the second flange increases as a distance from the contact portion increases, and
the contact portion is provided at one end of the curved portion.

3. The joining structure according to claim 1, wherein:
the contact portion is arranged at an edge part of the first flange.

4. The joining structure according to claim 3, wherein:
the first flange includes a curved portion which extends so that a distance from the second flange increases as a distance from the contact portion increases, and
the joint portion is arranged between the contact portion and the curved portion.

5. The joining structure according to claim 1, wherein:
the contact portion is arranged between two of the joint portions.

6. A method for producing a joining structure, comprising:
a first flange,
a second flange arranged opposing the first flange;
a joint portion formed by the first flange and the second flange being joined to each other in a state in which at least one of the first flange and the second flange is stamped to a side of the other of the first flange and the second flange; and
a contact portion where the first flange and the second flange contact each other at a position that is separated from the joint portion;

wherein:

each of the first flange and the second flange extends in a predetermined longitudinal direction, and when viewed in cross section in the longitudinal direction, free ends of the first flange and the second flange are made on an one end side from the joint portion, the first flange and/or the second flange continues to have a hat-shaped cross-sectional structure on the other end side from the joint portion and, at a position between the joint portion and the contact portion, the first flange and the second flange are separated from each other and a gap is formed between the first flange and the second flange, the method comprising:

preparing the first flange starting material as a starting material of the first flange, and the second flange starting material as a starting material of the second flange, wherein:

in at least one of the first flange starting material and the second flange starting material, a recess is provided which is a portion where the first flange starting material and the second flange starting material are separated when the first flange starting material and the second flange starting material are butted against each other, the recess is deformed by abutting the first flange starting material and the second flange starting material against each other at abutted portions at the recess, and the joint portion is formed by joining the abutted portions, and the first flange starting material and the second flange starting material are caused to contact at the contact portion that is at a position which is separated from the joint portion.

7. A vehicle body, comprising:
the joining structure according to claim 1,
a panel in which the first flange is provided, and
a framework member in which the second flange is provided.

8. The vehicle body according to claim 7,
wherein the framework member has:
a first half portion in which the second flange is provided;
a second half portion which has a third flange arranged opposing the second flange, and which is combined with the first half portion; and
a half-portion joint portion which is formed by the second flange and the third flange being joined to each other, and which restricts relative sliding of the second flange and the third flange.

9. The vehicle body according to claim 8, wherein:
by the joint portion and the half-portion joint portion being formed at a place where the first flange, the second flange, and the third flange are superimposed on each other, the joint portion and the half-portion joint portion are arranged overlapping each other in a thickness direction of the panel.

10. The vehicle body according to claim 8, wherein:
each of the flanges extends in a predetermined longitudinal direction; and
by the second flange and the third flange being separated from each other at a position between two of the half-portion joint portions, a half-portion gap is formed as a gap between the second flange and the third flange.

* * * * *